United States Patent
Pham et al.

(10) Patent No.: US 12,355,042 B2
(45) Date of Patent: Jul. 8, 2025

(54) LONG LIFE SEALED ALKALINE SECONDARY BATTERIES

(71) Applicant: FORM ENERGY, INC., Somerville, MA (US)

(72) Inventors: Ai Quoc Pham, Louisville, CO (US); Sandeep Nijhawan, Louisville, CO (US); Aswin K. Manohar, Louisville, CO (US); Kevin Van Galloway, Louisville, CO (US); Chenguang Yang, Louisville, CO (US); Eric E. Benson, Louisville, CO (US); Lang Mchardy, Louisville, CO (US); Tim Rackers, Louisville, CO (US)

(73) Assignee: FORM ENERGY, INC., Somerville, MA (US)

( * ) Notice: Subject to any disclaimer, the term of this patent is extended or adjusted under 35 U.S.C. 154(b) by 0 days.

(21) Appl. No.: 18/755,136

(22) Filed: Jun. 26, 2024

(65) Prior Publication Data
US 2025/0030073 A1  Jan. 23, 2025

Related U.S. Application Data

(63) Continuation of application No. 18/182,776, filed on Mar. 13, 2023, now Pat. No. 12,155,047, which is a
(Continued)

(51) Int. Cl.
*H01M 10/00* (2006.01)
*H01M 4/24* (2006.01)
(Continued)

(52) U.S. Cl.
CPC ......... *H01M 10/526* (2013.01); *H01M 4/248* (2013.01); *H01M 4/5815* (2013.01);
(Continued)

(58) Field of Classification Search
CPC ............ H01M 4/24; H01M 4/58; H01M 4/62; H01M 10/24; H01M 10/42; H01M 50/116
See application file for complete search history.

(56) References Cited

U.S. PATENT DOCUMENTS 5,780,184 A * 7/1998 Coco .................... H01M 4/621
429/223

\* cited by examiner

*Primary Examiner* — Anca Eoff
*Assistant Examiner* — Monique M Wills
(74) *Attorney, Agent, or Firm* — The Marbury Law Group, PLLC

(57) ABSTRACT

In an aspect, provided is an alkaline rechargeable battery comprising: i) a battery container sealed against the release of gas up to at least a threshold gas pressure, ii) a volume of an aqueous alkaline electrolyte at least partially filling the container to au electrolyte level; iii) a positive electrode containing positive active material and at least partially submerged in the electrolyte, iv) an iron negative electrode at least partially submerged in the electrolyte, the iron negative electrode comprising iron active material; v) a separator at least partially submerged in the electrolyte provided between the positive electrode and the negative electrode; vi) an auxiliary oxygen gas recombination electrode electrically connected to the iron negative electrode by a first electronic component, ionically connected to the electrolyte by a first some pathway, and exposed to a gas headspace above the electrolyte level by a first gas pathway.

18 Claims, 7 Drawing Sheets

Related U.S. Application Data continuation of application No. 16/957,917, filed as application No. PCT/US2018/067662 on Dec. 27, 2018, now Pat. No. 11,611,115.

(60) Provisional application No. 62/611,946, filed on Dec. 29, 2017.

(51) Int. Cl.
| | |
|---|---|
| *H01M 4/58* | (2010.01) |
| *H01M 4/62* | (2006.01) |
| *H01M 10/24* | (2006.01) |
| *H01M 10/42* | (2006.01) |
| *H01M 10/52* | (2006.01) |
| *H01M 50/116* | (2021.01) |
| *H01M 4/02* | (2006.01) |

(52) U.S. Cl.
CPC ............ *H01M 4/623* (2013.01); *H01M 10/24* (2013.01); *H01M 10/4242* (2013.01); *H01M 50/116* (2021.01); *H01M 2004/027* (2013.01); *H01M 2004/028* (2013.01)

LONG LIFE SEALED ALKALINE SECONDARY BATTERIES

CROSS REFERENCE TO RELATED APPLICATIONS

This application claims the benefit of and priority to U.S. application Ser. No. 18/182,776, filed on Mar. 13, 2023, which claims the benefit of and priority to U.S. application Ser. No. 16/957,917, filed on Jun. 25, 2020, which claims priority to International Application No. PCT/US2018/067662, filed on Dec. 27, 2018, which claims priority to U.S. Provisional Patent Application No. 62/611,946, filed Dec. 29, 2017, the contents of all of which are hereby incorporated by reference in their entirety to the extent not inconsistent herewith.

FIELD

This invention generally relates to alkaline batteries and in some embodiments more particularly to gas recombination methods and apparatus in sealed alkaline secondary batteries.

SUMMARY OF THE INVENTION

Provided herein are systems and methods for batteries and components thereof, for example, sealed batteries, such as sealed alkaline rechargeable batteries, providing enhanced performance including longer battery life, increased discharge and cycling performance and enhanced battery safety. In some embodiments, the battery systems and methods utilize auxiliary electrodes for the recombination of gas generated during charging or discharging, for example, by chemical combustion of stoichiometric quantities of oxygen and hydrogen, by electrochemical reduction of oxygen gas and/or by electrochemical oxidation of hydrogen gas.

Multiple auxiliary electrodes may be included in some embodiments for the recombination of different gases generated during charging or discharging of the electrochemical cell. The systems and methods are versatile and may be used with a variety of electrode, separator and electrolyte components and compositions, including alkaline rechargeable batteries, such as iron-containing batteries including nickel-iron batteries.

In some embodiments, the systems and methods further include batteries, such as sealed alkaline rechargeable batteries, incorporating one or more auxiliary electrodes that are capable of depolarizing the negative or positive electrode, for example, in a manner that avoids, or minimizes, the loss of certain electrode additives, such as a sulfide species. In some embodiments, the systems and methods further include batteries, such as sealed alkaline rechargeable batteries, characterized by an arrangement of the positive electrode, negative electrode or both provided in uniform contact with a separator so as to eliminate, or minimize, spaces or structures in which gas bubbles may form, accumulate or travel, for example, in a manner to cause any gases formed to efficiently interact with the counter-electrode so as to encourage direct recombination, such as direct recombination of oxygen gas on the negative electrode. In some embodiments, the systems and methods further include batteries, such as sealed alkaline rechargeable batteries, incorporating a positive electrode and/or negative electrode containing a hydrophobic polymer for enhancing transport of gases generated upon charging or discharging the battery to a counter electrode or auxiliary gas recombination electrode.

In an aspect, provided is an alkaline rechargeable battery comprising: i) a battery container sealed against the release of gas up to at least a threshold gas pressure, ii) a volume of an aqueous alkaline electrolyte at least partially filling the container to an electrolyte level; iii) a positive electrode containing positive active material and at least partially submerged in the electrolyte; iv) an iron negative electrode at least partially submerged in the electrolyte, the iron negative electrode comprising iron active material; v) a separator at least partially submerged in the electrolyte provided between the positive electrode and the negative electrode; vi) an auxiliary oxygen gas recombination electrode electrically connected to the iron negative electrode by a first electronic component, ionically connected to the electrolyte by a first ionic pathway, and exposed to a gas headspace above the electrolyte level by a first gas pathway.

In some embodiments, the iron negative electrode further comprises one or more sulfide compounds, the one or more sulfide compounds being soluble in the electrolyte. In some embodiments, the sulfide compound comprises one or more metal sulfides. In some embodiments, the one or more metal sulfides comprise an iron sulfide, such as FeS, ZnS, CuS, MnS in powder or granular form added to the electrode, or iron sulfide (e.g., FeS, $Fe_3S_4$, $Fe_2S_3$ and/or other forms) generated in situ as a reaction product or intermediary upon cycling the battery. In some embodiments, the one or more metal sulfides is iron sulfide. In embodiments, the auxiliary oxygen gas recombination electrode electrochemically reduces oxygen gas in the gas headspace. In embodiments, while electrochemically reducing oxygen gas in the gas headspace the auxiliary oxygen gas recombination electrode depolarizes the negative electrode potential and thereby prevents loss of the sulfide compound (e.g., one or more metal sulfides or a solid solution including sulfide) by keeping the negative electrode potential less-negative than a reduction potential of the metal sulfide.

Auxiliary electrodes may also be useful in combination with the positive electrode, for example, for recombination of hydrogen gas. In embodiments, the alkaline rechargeable battery further comprises an auxiliary hydrogen gas recombination electrode electrically connected to the positive electrode by a second electronic component ionically connected to the electrolyte by a second ionic pathway, and exposed to a gas headspace above the electrolyte level by a second gas pathway, which may be shared with the first gas pathway in some embodiments. In an embodiment, for example, the auxiliary hydrogen gas recombination electrode electrochemically oxidizes hydrogen gas in the gas headspace. In an embodiment, the system is configured to provide for a larger $O_2$ recombiner than $H_2$. In embodiments, the auxiliary oxygen gas recombination electrode has a greater specific activity than the auxiliary hydrogen gas recombination electrode, for example, where a ratio of specific activity of the auxiliary oxygen gas recombination electrode to specific activity of the auxiliary hydrogen gas recombination electrode is at least about 1.1, 1.2, 1.5, 2, 3, or more.

In embodiments, the second electronic component is configured to limit electric potential of the auxiliary hydrogen gas recombination electrode to a potential more negative than an oxygen evolution potential of the auxiliary hydrogen gas recombination electrode. In an embodiment, for example, the second electronic component is a diode.

Various positions of the auxiliary electrodes will be advantageous in certain battery systems, which may depend on the compositions of the electrodes and electrolyte, the amount of electrolyte relative the electrodes, the geometry of the battery and other design factors. In an embodiment, the auxiliary hydrogen gas recombination electrode or the auxiliary oxygen gas recombination electrode floats on the electrolyte surface. In an embodiment, the auxiliary hydrogen gas recombination electrode or the auxiliary oxygen gas recombination electrode is positioned in the battery container above a surface of the electrolyte and wherein the first or second ionic pathway comprises a wicking element partially submerged in the electrolyte and extending to the auxiliary hydrogen gas recombination electrode or the auxiliary oxygen gas recombination electrode.

In embodiments, the auxiliary oxygen gas recombination electrode is physically separated from the negative electrode or the auxiliary hydrogen gas recombination electrode is physically separated from the positive electrode. In an embodiment, for example, the auxiliary oxygen gas recombination electrode is at least partially submerged in the electrolyte and the gas pathway comprises a hydrophobic element. In an embodiment, the positive electrode and the negative electrode are each in uniform contact with the separator. In embodiments, for example, the positive electrode, separator, and negative electrode are compressed against one another by a compressive pressure equal to or greater than a threshold compressive pressure. In embodiments, the threshold compressive pressure is at least 0.5 PSI, 1 PSI, or 2 PSI.

In embodiments, one of or both the negative electrode and the positive electrode contain a hydrophobic polymer binder, for example, poly-tetrafluoroethylene (PTFE), fluorinated ethylene propylene (FEP), or perfluoroalkoxy alkanes (PFA). In some embodiments, the PTFE, FEP, or PFA is fibrillated.

In an embodiment, for example, the negative electrode extends into the headspace above the electrolyte level and the positive electrode is entirely submerged in the electrolyte. In an embodiment, for example, both the positive electrode and the negative electrode extend into the headspace above the electrolyte level. In embodiments, the volume of electrolyte is equal to or greater than a cumulative total pore volume of the positive electrode, the negative electrode, and the separator. In embodiments, the auxiliary oxygen gas recombination electrode is entirely submerged in the electrolyte and the gas pathway is a hydrophobic element or a PTFE element.

In embodiments, the first electronic component is configured to limit electric potential of the auxiliary oxygen gas recombination electrode to a potential below a hydrogen evolution potential of the auxiliary oxygen gas recombination electrode. In embodiments, for example, the first electronic component is a diode.

In an embodiment, the auxiliary hydrogen gas recombination electrode is physically separated from the positive electrode. In an embodiment, the auxiliary hydrogen gas recombination electrode shares at least a portion of a substrate with the positive electrode. In an embodiment, the threshold gas pressure is equal to or greater than 10 PSIG, 20 PSIG, 30 PSIG, 40 PSIG, or 50 PSIG.

In an embodiment, for example, the auxiliary oxygen gas recombination electrode is also electrically connected to the positive electrode, and further comprising at least one switch configured to open and close circuits between the oxygen gas recombination electrode and the positive electrode, and between the auxiliary oxygen gas recombination electrode and the negative electrode.

In an aspect, provided is an alkaline rechargeable battery comprising: i) a battery container sealed against the release of gas up to at least a threshold gas pressure, ii) a volume of an aqueous alkaline electrolyte at least partially filling the container to an electrolyte level; iii) a positive electrode containing positive active material and at least partially submerged in the electrolyte; iv) an iron negative electrode at least partially submerged in the electrolyte, the iron negative electrode comprising iron active material; v) a separator at least partially submerged in the electrolyte provided between the positive electrode and the negative electrode; and vi) an auxiliary hydrogen gas recombination electrode electrically connected to the positive electrode by a first electronic component, ionically connected to the electrolyte by a first ionic pathway, and exposed to a gas headspace above the electrolyte level by a first gas pathway.

In an aspect, provided is an alkaline rechargeable battery comprising: i) a battery container sealed against the release of gas up to at least a threshold gas pressure, ii) a volume of an aqueous alkaline electrolyte at least partially filling the container to an electrolyte level; iii) a positive electrode containing positive active material and at least partially submerged in the electrolyte; iv) an iron negative electrode at least partially submerged in the electrolyte, the iron negative electrode comprising iron active material; v) a separator at least partially submerged in the electrolyte provided between the positive electrode and the negative electrode; and vi) an auxiliary oxygen gas recombination electrode electrically connected to the iron negative electrode by a first electronic component, ionically connected to the electrolyte by a first ionic pathway, and exposed to a gas headspace above the electrolyte level by a first gas pathway; wherein the positive electrode and the negative electrode are in uniform contact with one another through the separator.

In an embodiment, the positive electrode, separator, and negative electrode are compressed against one another by a compressive pressure equal to or greater than a threshold compression, for example, a threshold compression is selected over the range of 1 PSI and 10 PSI, 1 PSI to 40 PSI, 10 PSI to 40 PSI, or greater than or equal to 40 PSI.

In an aspect provided is an alkaline rechargeable battery comprising: i) a battery container sealed against the release of gas up to at least a threshold gas pressure, ii) a volume of an aqueous alkaline electrolyte at least partially filling the container to an electrolyte level; iii) a positive electrode containing positive active material and at least partially submerged in the electrolyte; iv) an iron negative electrode at least partially submerged in the electrolyte, the iron negative electrode comprising iron active material and a metal sulfide compound; v) a separator at least partially submerged in the electrolyte provided between the positive electrode and the negative electrode; and vi) a sulfide reservoir containing a sulfide-source material operationally coupled to the electrolyte for delivering a quantity of sulfide ions to the electrolyte at a rate slower than a rate of dissolution of the sulfide-source material in the electrolyte. In some embodiments, the sulfide compound is soluble in the electrolyte. In some embodiments, the sulfide compound comprises one or more metal sulfides. In some embodiments, the one or more metal sulfides comprise an iron sulfide. In some embodiments, the one or more metal sulfides is iron sulfide or a solid-solution comprising iron sulfide. The solid sulfide-source material may be soluble in said electrolyte and is characterized by its dissociation into at least dissolved sulfide ions upon its dissolution in said electrolyte.

A sulfide-source material being "operationally coupled" or "operationally connected" to an electrolyte refers to the sulfide-source material being connected to, exposed to, or in fluid communication with the electrolyte such that the sulfide-source material may contribute dissolved sulfide ions to the electrolyte via dissociation of the sulfide-source material. For example, an operational coupling between a sulfide-source material and the electrolyte may be constant and/or intermittent. Similarly, a counter ion-source material being "operationally coupled" or "operationally connected" to an electrolyte refers to the counter ion-source material being connected to, exposed to, or in fluid communication with the electrolyte such that the counter ion-source material may contribute dissolved counter ions to the electrolyte via dissociation of the counter ion-source material. For example, an operational coupling between a counter ion-source material and the electrolyte may be constant and/or intermittent. Dissolution or dissociation of a material, such as a sulfide-source material, refers to dissolution or dissociation, respectively, of any fraction or portion of the material. The terms "operationally coupled" and "operationally connected" may be used interchangeably.

In an embodiment, the alkaline rechargeable battery further comprises an auxiliary oxygen gas recombination electrode electrically connected to the iron negative electrode by a first electronic component, ionically connected to the electrolyte by a first ionic pathway, and exposed to a gas headspace above the electrolyte level by a first gas pathway, wherein the auxiliary oxygen gas recombination electrode electrochemically reduces oxygen gas in the gas headspace, and while electrochemically reducing oxygen gas in the gas headspace depolarizes the negative electrode potential and thereby prevents loss of the sulfide compound. In embodiments, the auxiliary oxygen gas recombination electrode comprises a sulfide compound (such as a metal sulfide or a solid solution comprising a metal sulfide) that is soluble in the electrolyte and is positioned at least partially in the headspace above the electrolyte level.

Encapsulation and/or shield materials may be included to provide a controlled release of the sulfide reservoir to ensure that sulfide is available within the reservoir for a longer period of time. In embodiments, for example, the sulfide reservoir comprises sulfide-source material encapsulated in an encapsulation material that dissolves in the electrolyte at a slower rate than the sulfide-source material. In an embodiment, the encapsulation material comprises a metal oxide, for example, one or more of zinc oxide, aluminum oxide, bismuth oxide, and copper oxide. In embodiments, the encapsulation material comprises one or more of silicon oxide, silicon dioxide, a polymer, polyvinyl alcohol, and polyethylene.

In an embodiment, the sulfide reservoir comprises a sulfide-source material contained within a shield material that is entirely insoluble in the electrolyte. In embodiments, the shield material comprises stainless steel or a polymer impervious to the electrolyte. In embodiments, the sulfide reservoir comprises a sulfide-source material sealed within a bag made of an anion exchange membrane submerged in the electrolyte.

In some embodiments, the sulfide reservoir is submerged in the electrolyte. In some embodiments, the sulfide reservoir is positioned in the headspace and joined to the electrolyte by an ionic pathway. In some embodiments, the sulfide reservoir is placed directly within the negative electrode. In some embodiments, the sulfide reservoir is electrically connected to the positive electrode by an intermittently-openable electrical connection. In embodiments, for example, the intermittently-openable electrical connection comprises a switch operated by a controller, a temperature-sensitive switch, an electronic oscillator or any combination thereof.

In some embodiments, the battery further comprises a closed-loop automatic control system, wherein said control system comprises a sulfide detector configured to detect an event or condition; and wherein said control system comprises an actuator configured to deliver or expose said sulfide-source material to said electrolyte upon detection of said event or condition by said sulfide detector. In some embodiments, the event or condition is selected from the group consisting of a sulfide ion concentration, a battery performance metric threshold or change thereof, a temperature threshold, or any combination thereof.

In an aspect, provided is an alkaline rechargeable battery comprising: i) a battery container sealed against the release of gas up to at least a threshold gas pressure, ii) a volume of an aqueous alkaline electrolyte at least partially filling the container to an electrolyte level; iii) a positive electrode containing positive active material and at least partially submerged in the electrolyte; iv) an iron negative electrode at least partially submerged in the electrolyte, the iron negative electrode comprising iron active material and a sub-oxide of a sulfide compound; and v) a separator at least partially submerged in the electrolyte provided between the positive electrode and the negative electrode. In some embodiments, the sulfide compound comprises one or more metal sulfides. In some embodiments, the one or more metal sulfides comprise an iron sulfide. In some embodiments, the one or more metal sulfides is iron sulfide or a solid solution comprising an iron sulfide.

In an aspect, provided is a method of operating a battery to maintain a sulfide compound in a negative iron electrode, comprising: i) charging and discharging a battery comprising a positive electrode and an iron negative electrode containing a sulfide compound; and ii) preventing the negative electrode from ever being charged to a state-of-charge greater than 50%, 60%, or 70%. In some embodiments, the sulfide compound comprises one or more metal sulfides. In some embodiments, the one or more metal sulfides comprise an iron sulfide. In some embodiments, the one or more metal sulfides is iron sulfide or a solid solution comprising an iron sulfide.

In embodiments, for example, decreasing the voltage applied to the negative electrode comprises making the negative electrode half-cell potential less negative than −1.5V, −1.2V, −1.15V, or −1.1V vs. a Hg/HgO (mercury/mercury oxide, or "MMO") reference.

In an aspect, provided is a battery comprising a positive electrode containing positive electrode active material and a negative electrode comprising an iron active material and a sulfide compound, wherein at least 5%, 10%, or 20% of the iron active material is an iron hydroxide for all states of charge of the battery. In some embodiments, the sulfide compound comprises one or more metal sulfides. In some embodiments, the one or more metal sulfides comprise an iron sulfide. In some embodiments, the one or more metal sulfides is iron sulfide or a solid solution comprising an iron sulfide.

In an aspect, provided is a metal-iron battery comprising a positive electrode and a negative electrode comprising an iron active material, wherein at least 5%, 10%, or 20% of the iron active material is iron hydroxide when the positive electrode is fully charged.

In an aspect, provided is a metal-iron battery comprising: i) a positive metal electrode comprising positive electrode active material; ii) a negative electrode comprising iron active material and a sulfide compound; iii) the positive and negative electrodes contained within a housing sealed to prevent escape of gasses from the housing; and iv) a gas recombination device connected to the positive electrode. In some embodiments, the sulfide compound comprises one or more metal sulfides. In some embodiments, the one or more metal sulfides comprise an iron sulfide. In some embodiments, the one or more metal sulfides is iron sulfide or a solid solution comprising an iron sulfide.

In embodiments, for example, at least 5%, 10%, or 20% of the iron active material is iron hydroxide at all states of charge. In an embodiment, the battery further comprises a sulfide reservoir. In an embodiment, the sulfide reservoir comprises a sulfide-source material, the sulfide reservoir delivering a quantity of sulfide ions to the electrolyte at a rate slower than a rate of dissolution of the sulfide-source material in the electrolyte.

In an aspect, provided is a battery comprising: i) a positive electrode having a quantity of positive active material defining a positive electrode capacity; ii) a negative electrode having a quantity of iron active material defining a negative electrode capacity that is at least 10% greater than the positive electrode capacity; iii) the positive and negative electrodes contained within a housing sealed to prevent escape of gasses from the housing; and iv) a gas recombination device within the battery container and electrically connected to at least one of the positive electrode and the negative electrode.

In embodiments, for example, the negative electrode capacity is at least 1.5 times, at least 2 times, or at least 2.5 times greater than the positive electrode capacity. In an embodiment, the negative capacity and the positive capacity are defined as end-of-formation capacity. In an embodiment, the negative capacity and the positive capacity are defined as rated capacity. In an embodiment, the negative capacity and the positive capacity are defined as theoretical capacity.

In an aspect, provided is a battery comprising a positive electrode comprising a positive electrode active material and a negative electrode comprising an iron active material and a sulfide compound, wherein at least 5% of the iron active material is in a discharged state at all states of charge of the positive electrode. In some embodiments, the sulfide compound comprises one or more metal sulfides. In some embodiments, the one or more metal sulfides comprise an iron sulfide. In some embodiments, the one or more metal sulfides is iron sulfide or a solid solution comprising an iron sulfide.

In some embodiments, the battery comprises a solid sulfide-source material operationally connected to the electrolyte. In some embodiments, the solid sulfide-source material is soluble in said electrolyte and is characterized by its dissociation into at least dissolved sulfide ions and dissolved counter-ions upon its dissolution in said electrolyte. In some embodiments, a total concentration of dissolved counter-ions in the electrolyte is greater than a concentration of said dissolved counter-ions derived from dissolution of said solid sulfide-source material. In some embodiments, a ratio of total concentration of said dissolved counter-ions in the electrolyte to concentration of said dissolved sulfide ions in the electrolyte is greater than the stoichiometric ratio of counter-ions to sulfide ions in said solid sulfide-source material. In some embodiments, the battery further comprises a solid counter-ion source material exposed to the electrolyte and configured to limit a concentration of said dissolved sulfide ions in the electrolyte to less than or equal to a threshold concentration; said threshold concentration being less than a solubility limit of the solid sulfide source material in an identical electrolyte free from exposure to said solid counter-ion source material; said solid counter-ion source material being soluble in said electrolyte and being characterized by its dissociation into at least said dissolved counter-ions upon its dissolution in said electrolyte. In some embodiments, a concentration of dissolved sulfide ions in said electrolyte is less than or equal to a threshold concentration; said threshold concentration being less than a solubility limit of the solid sulfide source material in the electrolyte at a temperature corresponding to the temperature of the electrolyte. In some embodiments, the iron negative electrode comprises the solid sulfide-source material. In some embodiments, a concentration of sulfide ions in the electrolyte is greater than zero and less than 700 µM. In some embodiments, a ratio of total moles of dissolved and undissolved counter-ions in the battery to total moles of dissolved and undissolved sulfur species (i.e., sulfide-source materials, sulfide ions, sulfites, and sulfates) in the battery is greater than the stoichiometric ratio of counter-ions to sulfide ions in said solid sulfide-source material. In some embodiments, the solid sulfide-source material is a metal sulfide other than iron sulfide. In some embodiments, the counter-ion is a metal ion other than iron. In some embodiments, the battery comprises an excess concentration of counter-ions in the electrolyte sufficient to depress the concentration of dissolved sulfide ions below a solubility limit of the solid sulfide-source material in an otherwise identical electrolyte without the excess concentration of counter-ions. In some embodiments, the electrolyte contains dissolved counter-ions capable of forming a sulfide compound with dissolved sulfide ions; and wherein the counter-ions are present in a concentration sufficient to depress a solubility of the solid sulfide-source material below its solubility limit in a counter-ion free electrolyte otherwise identical to the electrolyte at a temperature corresponding to the temperature of the electrolyte.

Generally, when a concentration of a first species in an electrolyte is compared to a solubility limit of the first species or of a second species in the electrolyte, the value of the solubility limit corresponds to that in an electrolyte having a temperature that is substantially equivalent to the electrolyte temperature in which the first species is dissolved. For example, if a concentration of a first species in an electrolyte is said to be 10% less than its solubility limit in the electrolyte, then the concentration of the first species in the electrolyte having an instantaneous or average temperature of X° C. is 10% less than its solubility limit in the electrolyte having an instantaneous or average temperature of the same X° C., where is a X numerical value corresponding to a temperature.

In an aspect, a battery comprises: a battery container; a liquid electrolyte at least partially filling the container to an electrolyte level; a positive electrode containing positive active material and at least partially submerged in the electrolyte; an iron negative electrode at least partially submerged in the electrolyte, the iron negative electrode comprising an iron active material and a solid sulfide compound that is soluble in the electrolyte; wherein a concentration of sulfide ions in the electrolyte is greater than zero and less than 700 µM.

In an aspect, a battery comprises: a battery container; a liquid electrolyte at least partially filling the container to an electrolyte level; a positive electrode containing positive active material and at least partially submerged in the electrolyte; an iron negative electrode at least partially submerged in the electrolyte, the iron negative electrode comprising an iron active material; and a solid sulfide-source material operationally connected to the electrolyte; the solid sulfide-source material being soluble in said electrolyte and being characterized by its dissociation into at least dissolved sulfide ions and dissolved counter-ions upon its dissolution in said electrolyte; wherein a ratio of total moles of dissolved and undissolved counter-ions in the battery to total moles of dissolved and undissolved sulfur species in the battery is greater than the stoichiometric ratio of counter-ions to sulfide ions in said solid sulfide-source material, and in some embodiments wherein the counter-ion is a metal ion other than iron.

In an aspect, a battery comprises: a battery container; a liquid electrolyte at least partially filling the container to an electrolyte level; a positive electrode containing positive active material and at least partially submerged in the electrolyte; an iron negative electrode at least partially submerged in the electrolyte, the iron negative electrode comprising an iron active material; a solid sulfide-source material operationally connected to the electrolyte; the solid sulfide-source material being soluble in said electrolyte and being characterized by its dissociation into at least dissolved sulfide ions and dissolved counter-ions upon its dissolution in said electrolyte; and an excess concentration of counter-ions in the electrolyte sufficient to depress the concentration of dissolved sulfide ions below a solubility limit of the sulfide-source material in an otherwise identical electrolyte without the excess concentration of counter-ions. In some embodiments, the excess concentration of counter-ions corresponds to a concentration greater than a concentration of said dissolved counter-ions derived only from dissolution of said solid sulfide-source material. In some embodiments, the electrolyte comprises an excess concentration of counter-ions prior to a first charge-discharge cycle. In some embodiments, the battery is an alkaline rechargeable battery and wherein the electrolyte is an aqueous alkaline electrolyte.

In an aspect, a battery comprises: a battery container; a liquid electrolyte at least partially filling the container to an electrolyte level; a positive electrode containing positive active material and at least partially submerged in the electrolyte; an iron negative electrode at least partially submerged in the electrolyte, the iron negative electrode comprising an iron active material; and a solid sulfide-source material operationally connected to the electrolyte; the solid sulfide-source material being soluble in said electrolyte; the electrolyte containing dissolved counter-ions capable of forming a sulfide compound with dissolved sulfide ions; and wherein the counter-ions are present in a concentration sufficient to depress a solubility of the solid sulfide-source material below its solubility limit in a counter-ion free electrolyte otherwise identical to the electrolyte at a temperature corresponding to the temperature of the electrolyte.

In any embodiment, the iron negative electrode may comprise the solid sulfide-source material. In some embodiments, the iron electrode comprises an incorporated sulfide compound formed during formation cycling. In some embodiments, prior to a first charge-discharge cycle, the iron electrode is free of a sulfide compound. In some embodiments, the iron electrode further comprises a sulfide-additive prior to a first charge-discharge cycle. In some embodiments, the battery comprises a sulfide reservoir prior to and/or after a first charge-discharge cycle. In some embodiments, a counter-ion solution is added to the electrolyte after a first charge-discharge cycle. In some embodiments, a counter-ion solution is added to the electrolyte before a first charge-discharge cycle.

In some embodiments, the battery comprises a solid counter-ion source material exposed to the electrolyte; said solid counter-ion source material being soluble in said electrolyte and being characterized by its dissociation into at least said dissolved counter-ions upon its dissolution in said electrolyte.

In some embodiments, the total concentration of dissolved counter-ions in the electrolyte is at least 10% greater, at least 20%, at least 30%, at least 40%, at least 50%, at least 60%, at least 70%, at least 100%, at least 150%, at least 200%, at least 400%, at least 500%, at least 700%, at least 900%, or for some applications at least 1,000% or more greater than a concentration of dissolved sulfide ions in the electrolyte. In some embodiments, the total concentration of dissolved counter-ions in the electrolyte is at least 10% greater, at least 20%, at least 30%, at least 40%, at least 50%, at least 60%, at least 70%, at least 100%, at least 150%, at least 200%, at least 400%, at least 500%, at least 700%, at least 900%, or for some applications at least 1,000% or more greater than a concentration of dissolved counter-ions derived from dissolution of said solid sulfide-source material during at least 1% of the charge-discharge cycles throughout the lifetime of said battery.

In some embodiments, the total concentration of dissolved counter-ions in the electrolyte is at least 1%, at least 5%, at least 10%, at least 20%, at least 30%, at least 40%, at least 50%, at least 60%, at least 70%, at least 100%, at least 150%, at least 200%, at least 400%, at least 500%, at least 700%, at least 900%, or for some applications at least 1,000% or more greater than a concentration of dissolved counter-ions derived from dissolution of said solid sulfide-source material during at least 1%, at least 2%, at least 5%, at least 10%, at least 20%, at least 50%, at least 75%, at least 80%, at least 90%, at least 95%, or preferably for some applications at least 99% of the charge-discharge cycles throughout the lifetime of said battery. In some embodiments, the ratio of total concentration of dissolved counter-ions in the electrolyte to concentration of dissolved sulfide ions in the electrolyte is at least 10% greater than the stoichiometric ratio of counter-ions to sulfide ions in said solid sulfide-source material during at least 1% of the charge-discharge cycles throughout the lifetime of said battery. In some embodiments, the ratio of total concentration of dissolved counter-ions in the electrolyte to concentration of dissolved sulfide ions in the electrolyte is at least 1%, at least 5%, at least 10%, at least 20%, at least 30%, at least 40%, at least 50%, at least 60%, at least 70%, at least 100%, at least 150%, at least 200%, or preferably for some applications at least 210% greater than the stoichiometric ratio of counter-ions to sulfide ions in said solid sulfide-source material during at least 1%, at least 2%, at least 5%, at least 10%, at least 20%, at least 50%, at least 75%, at least 80%, at least 90%, at least 95%, or preferably for some applications at least 99% of the charge-discharge cycles throughout the lifetime of said battery.

In some embodiments, the threshold concentration is at least 10% less than the solubility limit of the sulfide-source material in an identical electrolyte free from exposure to said solid counter-ion source material during at least 1% of the charge-discharge cycles throughout the lifetime of said battery. (For example, a threshold concentration 10% less than the solubility limit of the sulfide-source material in an electrolyte corresponds to a threshold concentrations that is 90% of the solubility limit of the sulfide-source material in the electrolyte.) In some embodiments, the threshold concentration is at least 1%, at least 5%, at least 10%, at least 20%, at least 30%, at least 40%, at least 50%, at least 60%, at least 70%, at least 80%, at least 90%, or preferably for some applications substantially 95% less than the solubility limit of the sulfide-source material in an identical electrolyte free from exposure to said solid counter-ion source material during at least 1%, at least 2%, at least 5%, at least 10%, at least 20%, at least 50%, at least 75%, at least 80%, at least 90%, at least 95%, or preferably for some applications at least 99% of the charge-discharge cycles throughout the lifetime of said battery.

In some embodiments, the threshold concentration is substantially 1 µM during at least 1% of the charge-discharge cycles throughout the lifetime of said battery. In some embodiments, the threshold concentration is substantially equal to $1 \times 10^{-3}$ M, substantially equal to $1 \times 10^{-4}$ M, substantially equal to $1 \times 10^{-5}$ M, substantially equal to $1 \times 10^{-6}$ M, or substantially equal to $1 \times 10^{-7}$ M at 20° C. during at least 1%, at least 2%, at least 5%, at least 10%, at least 20%, at least 50%, at least 75%, at least 80%, at least 90%, at least 95%, or preferably for some applications at least 99% of the charge-discharge cycles throughout the lifetime of said battery. In some embodiments, the dissolved sulfide ion concentration in the electrolyte is substantially less than or substantially equal to 1 µM during at least 1% of the charge-discharge cycles throughout the lifetime of said battery. In some embodiments, the dissolved sulfide ion concentration in the electrolyte is substantially less than or substantially equal to $1 \times 10^{-3}$ M, substantially less than or substantially equal to $1 \times 10^{-4}$ M, substantially less than or substantially equal to $1 \times 10^{-6}$ M, substantially less than or substantially equal to $1 \times 10^{-6}$ M, or substantially less than or substantially equal to $1 \times 10^{-7}$ M at 20° C. during at least 1%, at least 2%, at least 5%, at least 10%, at least 20%, at least 50%, at least 75%, at least 80%, at least 90%, at least 95%, or preferably for some applications at least 99% of the charge-discharge cycles throughout the lifetime of said battery. In some embodiments, the solid sulfide-source material is a first sulfide-source material characterized by its dissociation into at least dissolved sulfide ions and dissolved first counter-ions upon its dissolution in said electrolyte; said battery further comprising a second sulfide-source material operationally connected to the electrolyte; said second sulfide-source material being soluble in said electrolyte and characterized by its dissociation into at least dissolved sulfide ions and dissolved second counter-ions upon its dissolution in said electrolyte; and wherein a solubility product constant ("$K_{sp}$") of said first solid sulfide-source material is greater than a Ksp of said second solid sulfide-source material.

In some embodiments, a concentration of dissolved sulfide ions in the electrolyte is greater than a solubility limit of CuS, $Bi_2S_3$, or CdS in an identical electrolyte otherwise free of dissolved sulfide ions and less than a solubility limit of ZnS, FeS, or MnS in an identical electrolyte otherwise free of dissolved sulfide ions. In some embodiments, the solid sulfide-source material is sparingly soluble in the electrolyte. In some embodiments, the ratio of total moles of dissolved and undissolved counter-ions in the battery to total moles of dissolved and undissolved sulfur species in the battery is at least 1%, at least 5%, at least 10%, at least 20%, at least 30%, at least 40%, at least 50%, at least 60%, at least 70%, at least 100%, at least 150%, at least 200%, or preferably for some applications at least 210% than the stoichiometric ratio of counter-ions to sulfide ions in said solid sulfide-source material during at least 1%, at least 2%, at least 5%, at least 10%, at least 20%, at least 50%, at least 75%, at least 80%, at least 90%, at least 95%, or preferably for some applications at least 99% of the charge-discharge cycles throughout the lifetime of said battery. In some embodiments, the sulfide ion concentration is substantially less than or substantially equal to 0.1%, substantially less than or substantially equal to 0.2%, substantially less than or substantially equal to 0.5%, substantially less than or substantially equal to 1%, substantially less than or substantially equal to 5%, or substantially less than or substantially equal to 10% of the solubility limit of the sulfide-source material in an identical electrolyte free of excess dissolved counter-ions. In some embodiments, a concentration of dissolved sulfide ions in the electrolyte is selected from the range of 0.1 µM to 700 µM, selected from the range of 0.1 µM to 300 µM, greater than 0 and less than 1 µM, or selected from the range of 0.1 µM to 1 µM. In some embodiments, a concentration of dissolved sulfide ions in the electrolyte is selected from the range of 0.1 µM to 700 µM, selected from the range of 0.1 µM to 300 µM, greater than 0 and less than 1 µM, or selected from the range of 0.1 µM to 1 µM during at least 1%, at least 2%, at least 5%, at least 10%, at least 20%, at least 50%, at least 75%, at least 80%, at least 90%, at least 95%, or preferably for some applications at least 99% of the charge-discharge cycles throughout the lifetime of said battery. In some embodiments, the sulfide compound is incorporated sulfide, additive sulfide, or reservoir sulfide. In some embodiments, the sulfide-source material is incorporated sulfide, additive sulfide, or reservoir sulfide. In some embodiments, the sulfide compound is a solid sulfide-source material.

In some embodiments, the solid sulfide-source material is selected from the group consisting of one or more metal sulfides, one or more sub-oxides of one or more metal sulfides, a solid solution of one or more metal sulfides and one or more oxides or hydroxides, one or more sulfosalt minerals, one or more metalloid sulfides, one or more nonmetal sulfides, and any combination thereof. In some embodiments, the one or more metal sulfides are selected from the group consisting of bismuth sulfide, iron sulfide, iron disulfide, iron-copper sulfide, zinc sulfide, manganese sulfide, tin sulfide, copper sulfide, cadmium sulfide, silver sulfide, titanium disulfide, lead sulfide, molybdenum sulfide, nickel sulfide, antimony sulfide, any polymorph of these, and any combination thereof. In some embodiments, the counter-ion source material is selected from the group consisting of one or more oxides, one or more hydroxides, and any combination thereof. In some embodiments, chemical equation of the solid sulfide-source material comprises Zn and S, and wherein chemical equation of the solid counter-ion source material comprises Zn.

In some embodiments, the counter-ion source material is encapsulated in an encapsulation material, for example, an encapsulation material that dissolves in the electrolyte at a slower rate than the dissolution rate of the counter-ion source material in the electrolyte. In some embodiments, the solid sulfide-source material is contained within a sulfide reservoir. In some embodiments, the solid-sulfide source material is at least partially encapsulated by or bound within a binder material. In some embodiments, the solid-sulfide source material is substantially encapsulated by or bound within a binder material. In some embodiments, the solid-sulfide source material is at least partially sandwiched between at least two electrically insulating layers, such as electrically non-conductive polymer(s). In some embodiments, the solid-sulfide source material is substantially sandwiched between at least two electrically insulating layers. In some embodiments, the sulfide reservoir is in the form of a sheet comprising a non-conductive binder or encapsulant at least partially encapsulating the solid-sulfide source material. In some embodiments, the battery is an alkaline rechargeable battery and wherein the electrolyte is an aqueous alkaline electrolyte.

The term "substantially" refers to a property or condition that is within 20%, within 10%, within 5%, within 1%, or is equivalent to a reference property or condition. The term "substantially equal", "substantially equivalent", or "substantially unchanged", when used in conjunction with a reference value describing a property or condition, refers to a value or condition that is within 20%, within 10%, optionally within 5%, optionally within 1%, optionally within 0.1%, or optionally is equivalent to the provided reference value or condition. For example, a concentration is substantially equal to $1\times10^{-6}$ M if the value of the concentration is within 20%, within 10%, optionally within 5%, optionally within 1%, or optionally equal to $1\times10^{-6}$ M. For example, a sulfide-source material is substantially encapsulated (an exemplary condition) if at least 80%, at least 90%, at least 95%, at least 99%, or optionally 100% of the sulfide-source material is encapsulated. The term "substantially greater", when used in conjunction with a reference value or condition describing a property or condition, refers to a value that is at least 2%, optionally at least 5%, at least 10%, or optionally at least 20% greater than the provided reference value or condition. The term "substantially less", when used in conjunction with a reference value or condition describing a property or condition, refers to a value or condition that is at least 2%, optionally at least 5%, optionally at least 10%, or optionally at least 20% less than the provided reference value. For example, a concentration is substantially less than $1\times10^{-6}$ M if the value of the concentration is at least 20% less than, at least 10% less than, at least 5% less than, or at least 1% less than $1\times10^{-6}$ M.

Also disclosed herein are batteries comprising any one or any combination of embodiments of the batteries disclosed herein. Also disclosed herein are methods of making batteries and methods of operating batteries comprising any one or any combination of embodiments of the batteries disclosed herein.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

The following detailed description sets forth illustrative embodiments with reference to the accompanying drawings, of which.

DETAILED DESCRIPTION

Introduction and Definitions

Figure 1:
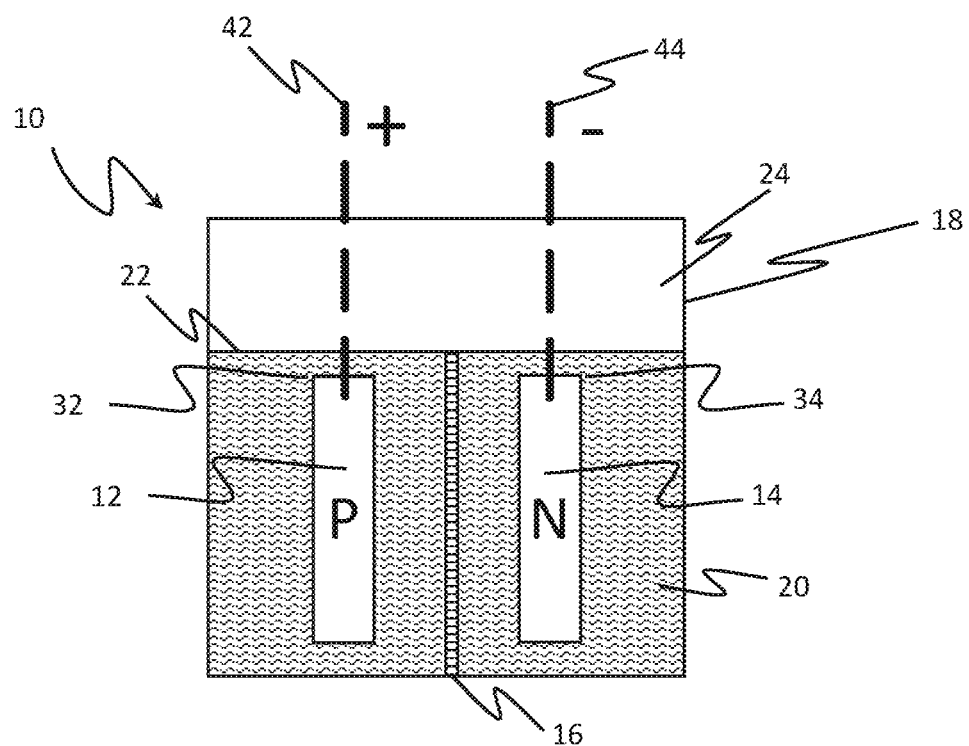
FIG. 1 is a schematic illustration of a flooded sealed battery.

The various embodiments will be described in detail with reference to the accompanying drawings. References made to particular embodiments, examples, or implementations are for illustrative purposes, and are not intended to limit the scope of the claims. The following disclosure relates to batteries and battery components.

As used herein, the term "battery" refers to an energy-storing electrochemical device comprising at least one electrochemical cell in a battery container. For example, a battery may include only one electrochemical cell (i.e., at least one positive electrode and at least one negative electrode joined by an ion-transfer medium) in a battery container. In other examples, a battery may include a bipolar stack or other arrangement of two or more electrochemical cells in one battery container. The term "battery pack" will generally be used herein to refer to units made up of two or more batteries electrically joined to one another to perform as a collective unit.

The term "electrochemical cell" used herein refers to devices and/or device components that convert chemical energy into electrical energy and/or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, and secondary batteries. General cell and/or battery construction is known in the art, see e.g., U.S. Pat. Nos. 6,489,055, 4,052,539, 6,306,540, Seel and Dahn J. Electrochem. Soc. 147 (3) 892-898 (2000).

The term "electrode" used herein refers to an electrical conductor where ions and electrons are exchanged with electrolyte and an outer circuit. The terms "positive electrode" and "cathode" are used synonymously in the present description and refer to the electrode having the higher electrode potential in an electrochemical cell (i.e. a more positive potential than the negative electrode). The terms "negative electrode" and "anode" are used synonymously in the present description and refer to the electrode having the lower electrode potential in an electrochemical cell (i.e. a potential less positive than the positive electrode). The terms "cathodic reduction" or "electrochemical reduction" refer to a gain of electron(s) of a chemical species, and the terms "anodic oxidation" or "electrochemical oxidation" refer to the loss of electron(s) of a chemical species.

The term "electrolyte" refers to an ionic conductor which can be in the solid state, the liquid state (most common) or more rarely a gas (e.g., plasma). Liquid electrolytes may include aqueous solutions, non-aqueous solutions, ionic liquids, molten salts, or others.

Most batteries with aqueous liquid electrolytes generate gas as a result of side-reactions which may occur during charging, discharging, or during open-circuit stand. The particular gas-generating side reactions generally depend on the battery's chemistry and operating conditions such as charge rates and/or discharge rates, temperature, and other factors.

Example gas generation reactions (also referred to as "gas evolution" or "electrolysis" reactions) are described below, but other gas-generation and/or hydrolysis reactions may occur instead of or in addition to these in various embodiments.

Hydrogen gas ($H_2$) may be generated on a negative electrode according to:

Hydrogen Evolution Reaction: $2H_2O + 2e^- \rightarrow H_2 + 2OH^-$

Hydrogen gas may also be generated by self-discharge of an iron negative electrode according to.

Iron Self-Discharge Reaction: $Fe + 2H_2O \rightarrow Fe(OH)_2 + H_2$

Oxygen gas ($O_2$) may be evolved during charging according to:

Oxygen Evolution Reaction: $4OH^- \rightarrow O_2 + 2H_2O + 4e^-$

For example, lead-acid batteries tend to electrolyze water from the aqueous acidic electrolyte, particularly during over-charging. Over-charging is defined as continuing to apply a charging current to a battery after one or both battery electrodes have reached a fully-charged capacity (i.e., all available chemical species having been converted to an energy-storing form). Similarly, nickel cadmium batteries tend to electrolyze water from the alkaline aqueous electrolyte. In general, batteries with aqueous electrolytes tend to generate oxygen at the positive electrode during charging and may also produce hydrogen at the negative electrode. The quantity of each gas produced will tend to vary for different electrode materials, electrolyte compositions, and other properties and operating characteristics of a battery and its components. For example, hydrogen generation from a cadmium negative electrode can generally be avoided by preventing the negative cadmium electrode from being over-charged.

In some cases, the produced gases are simply vented out of the battery to the surrounding atmosphere. However, continued electrolysis of electrolyte water into gas causes the electrolyte level to drop and changes the electrolyte composition, requiring regular topping-up of water. Such maintenance may be costly and burdensome, and failure to perform adequate water additions at the correct times may cause the battery to quickly degrade and fail.

Additionally, any efficiency mis-match between the positive and negative electrodes may require taking the battery out of service for regular rebalancing operations or other maintenance operations. These problems may generally be avoided by sealing a battery to prevent the release of produced gases.

However, to utilize a gas-producing battery in a sealed configuration, the production of gas is preferably minimized or avoided and/or the produced hydrogen and/or oxygen gases is preferably recombined into water or other species that may ultimately return the hydrogen and oxygen atoms to a form usable by the battery. Without recombination of gases, internal pressure within a sealed battery container will continue to rise, eventually causing the container to release the gases, and possibly to explode.

As used herein, the term "recombine" refers to chemical or electrochemical reactions in which hydrogen gas, oxygen gas, or both are converted into water, a water-soluble form (e.g., a hydroxide ion) or a solid compound on a battery electrode such as in the form of a metal oxide or a metal hydroxide.

Example gas recombination reactions are described below, but other gas recombination reactions may occur instead of, or in addition to these in various embodiments.

Stoichiometric (2:1) mixtures of hydrogen and oxygen gases may be re-combined by combustion to form water. In some cases, catalysts may be used to lower the temperature at which hydrogen-oxygen combustion occurs spontaneously.

Hydrogen-Oxygen Combustion Reaction: $2H_2 + O_2 \rightarrow 2H_2O$

Oxygen may be electrochemically reduced with water to form soluble hydroxide (OH) ions according to:

Oxygen Reduction Reaction (ORR): $O_2 + 2H_2O + 4e^- \rightarrow 4OH^-$

Hydrogen gas may be oxidized to soluble hydrogen ($H^+$) ions according to:

Hydrogen Oxidation Reaction (HOR): $H_2 \rightarrow 2H^+ + 2e^-$

So-called "recombinant" lead-acid batteries are configured to perform gas recombination internally so that they may be sealed with a valve to release gas when pressure exceeds a pre-set value. In order to simplify the gas management problem, recombinant lead-acid batteries tend to have negative electrodes with larger capacities than positive electrodes so as to substantially prevent the negative electrodes from being over-charged, thereby substantially preventing generation of hydrogen. This leaves predominantly only produced oxygen to be managed.

A similar approach is taken in nickel-cadmium batteries designed to operate primarily or solely on an oxygen cycle. The main solution in the case of nickel-cadmium batteries has been to use a "starved" configuration in which a battery contains only a very small quantity of electrolyte, typically relying on capillary action to absorb electrolyte into pores of the electrodes and/or separator. By reducing the quantity of electrolyte in the battery, substantial portions of the negative electrode are left exposed to the produced oxygen. This configuration encourages recombination of oxygen on exposed portions the negative electrode. In the case of both recombinant lead-acid and recombinant nickel cadmium batteries, the quantity of hydrogen produced is expected to be small by design, thereby eliminating or substantially reducing the need to recombine hydrogen gas.

Therefore, existing "sealed" or "recombinant" batteries are generally engineered to simplify the gas recombination problem to a narrow set of conditions. That is, many batteries are designed such that the need for hydrogen recombination can be nearly or entirely ignored, and oxygen recombination can reliably be expected to occur on the negative battery electrode. Alternatively, some batteries are designed to operate on the hydrogen cycle, minimizing any need for oxygen recombination while performing hydrogen recombination internally.

On the other hand, these simplifications are in some instances not compatible with a fully or partially-flooded alkaline battery system such as a nickel-iron battery, a nickel-zinc battery, or a manganese dioxide-iron battery (among others). In such cases, oxygen may still tend to be generated at the positive electrode, particularly during overcharging of the positive electrode. In the same system, hydrogen may be generated at the negative electrode during all stages of charging, but especially during over-charging and high-rate charging.

In some batteries, such as those with iron or zinc negative electrodes, hydrogen may also be generated through self-discharging reactions. In fact, iron negative electrodes may generally produce hydrogen at any state-of-charge, while charging, discharging, or at open-circuit as long as metallic iron is present. In a nickel-iron battery, significant quantities of both hydrogen and oxygen will tend to be produced during each charging cycle, thereby uniquely complicating the objective of producing a sealed recombinant battery.

The constraints placed on recombinant lead-acid and recombinant nickel cadmium batteries also substantially limit their longevity as well as their robustness to operation in extreme conditions. Starved-electrolyte batteries are generally incapable of cycle lives longer than several hundred cycles because the limited quantity of electrolyte eventually dries out, leaving insufficient electrolyte to support electrochemical reactions. Limited quantities of electrolyte may also reduce the charging and discharging rate capabilities of starved batteries.

Flooded batteries and semi-flooded batteries, which contain a larger volume of electrolyte relative to the electrodes, are generally capable of much longer lives and are less susceptible to thermal runaway. As used herein, the term "flooded" or "flooded electrolyte" may broadly refer to any battery system in which a volume of electrolyte is sufficient to fill a battery container to a level at least as high as the top-most portion of at least one battery electrode such that the electrode is entirely submerged in the electrolyte. As used herein, the expression "entirely submerged in the electrolyte" refers to a configuration wherein all external surfaces of a structure or device component, such as an electrode, are surrounded by the electrolyte, including configurations wherein all portions of the structure or device component, such as an electrode, are provided below the electrolyte level.

In various situations, a battery may be "flooded" or "semi-flooded" with respect to a specific electrode or with respect to all electrodes within the battery. For example, a battery may be "flooded" with respect to a particular electrode if that electrode is entirely submerged below the electrolyte level within the battery container. A battery may be "semi-flooded" or "partially flooded" with respect to a particular electrode if some portion of that electrode extends above the electrolyte level in the battery container such that only a portion of the electrode is submerged in the electrolyte. Flooded and semi-flooded batteries may be distinguished from so-called "starved" cells which contain a very small quantity of liquid or gel electrolyte present only within pores of the electrodes and/or absorbed into a separator. Nonetheless, any of the embodiments described herein may be applied to batteries or cells in flooded, semi-flooded, or starved electrolyte configurations.

Some batteries may be configured to operate in a particular orientation relative to gravity such that the battery's "top" is the region furthest from the center of the gravitational field holding the electrolyte "down." The terms and definitions used herein generally assume that the orientation of the battery used to define a "flooded" or "semi-flooded" electrolyte quantity is the same as an orientation in which the battery is operated.

If a flooded or semi-flooded battery can be sealed, then several improvements may be achieved compared to starved or vented batteries. A sealed flooded battery may be capable of a substantially longer life, increased safety resulting from decreased release of flammable gas, and decreased maintenance in the form of water or electrolyte additions. These benefits may allow for long-term use of such batteries in applications or locations in which regular replacement or maintenance of batteries is impractical, costly, or impossible.

In some battery systems it may be possible to simplify the gas recombination problem by configuring and/or operating a battery to increase predictability of the composition and/or rate of gas production. For example, in some systems it may be possible to control the battery's operation and/or construction such that very little hydrogen is produced, thereby requiring predominantly only oxygen recombination. In other systems, it may be possible to control the battery's operation and/or construction such that only stoichiometric quantities of hydrogen and oxygen are produced, thereby requiring only a combustion reaction to form water.

However, in some battery systems, up to three different gas conditions may occur, each of which may require a different recombination approach. These gas conditions include a "stoichiometric" condition, an oxygen-rich condition, and a hydrogen-rich condition. In a stoichiometric condition, the quantity of hydrogen gas molecules is approximately twice the quantity of oxygen gas molecules, i.e., in a ratio roughly equal to the stoichiometric relationship of atoms in water: $H_2O$. In an oxygen-rich condition, the quantity of oxygen gas substantially exceeds the quantity of hydrogen gas (if any hydrogen gas is present at all). Similarly, a gas condition may be hydrogen-rich if the quantity of hydrogen gas substantially exceeds the quantity of oxygen, if any.

In order to provide a robust, long-lived battery system, a flooded or semi-flooded sealed battery may be capable of handling any of these three gas conditions with a high degree of reliability and at a minimum of cost and complexity. In some cases, a combination of multiple gas management approaches may be desirable in order to produce a robust battery system. Therefore, in various embodiments, any one or more of the technologies described herein for gas evolution mitigation, direct recombination, auxiliary electrode recombination, oxygen/hydrogen combustion, or external fuel cell recombination may be combined with one or more others to form a robust sealed battery system. All such combinations are intended to fall within the scope of this disclosure.

For some applications, approaches to gas management may be organized into six groups: (1) minimizing gas evolution; (2) direct recombination of a gas on a battery electrode; (3) auxiliary oxygen reduction electrodes; (4) auxiliary hydrogen oxidation electrodes: (5) hydrogen/oxygen combustion elements; and (6) external fuel cells.

More broadly, gas recombination may be performed either directly with active material of one or more battery electrodes, or by use of an added recombination device. As used herein, the term "recombination device" may broadly include any device component, structure or material that supports one or both of chemical and electrochemical gas recombination reactions and that exists in addition to active materials of battery electrodes. For some applications, therefore, a recombination device may be an auxiliary electrode supporting electrochemical gas oxidation and/or reduction reactions, a hydrogen/oxygen combustion element, an element supporting or catalyzing chemical oxidation and/or reduction reactions, a fuel cell, or a mass of material carried by a battery electrode for the purpose of supporting chemical or electrochemical gas recombination reactions.

The generation of gas can be minimized by controlling operating conditions of a battery, such as temperature, charging or discharging rates, depth of charging or discharging, or others. Gas generation can also be mitigated by including additives in an electrode or an electrolyte so as to make gas-generating side-reactions less likely to occur. Various examples of gas minimizing structures and operations are described herein.

Direct recombination involves chemical or electrochemical reactions between a generated gas and battery electrode active material (i.e., not an auxiliary electrode as defined herein) resulting in the gas being converted to water, a soluble species, or other compound. Direct recombination may be encouraged by structural or compositional features of electrodes, separators, electrolytes, battery containers, or other aspects of a battery. Various examples of structures and compositions that encourage direct gas recombination on one or more battery electrodes are described herein.

As used herein, the term "auxiliary electrode" generally includes any electrochemically active material that is distinct from, or in addition to, the active material of the battery electrodes performing primary energy storage operations (e.g., the positive and negative electrodes). In some embodiments, for example, an auxiliary electrode may be electrically connected (or connect-able via a switch, diode, or other electronic component) to a battery electrode or other structure or element imparting an electric potential to the auxiliary electrode. In some cases, an auxiliary electrode may also support or catalyze chemical oxidation, reduction, or combustion reactions.

For example, some auxiliary electrodes may comprise an auxiliary active material carried by a substrate that is physically separated (e.g., not in physical contact with) and independent of the battery positive and negative electrode current collectors and active materials. In other examples, an auxiliary electrode may comprise a battery electrode current collector or other battery electrode structure coated with an auxiliary active material. In further examples, an auxiliary electrode may comprise an auxiliary active material added to a section of a battery electrode active material or other material or structure within the battery container. In one example, an auxiliary electrode may comprise an auxiliary active material supported by or applied to a portion of a battery container interior wall.

As the term is used herein, "active material" of a battery electrode includes a material having a primary function in a battery to undergo oxidation or reduction in order to store or deliver energy. Similarly, "auxiliary active material" may include a material or catalyst whose primary function is to catalyze or otherwise support electrochemical gas recombination reactions.

As used herein, the term "auxiliary oxygen reduction electrode" refers to an auxiliary electrode that supports or catalyzes electrochemical reactions involving the reduction of oxygen, such as reduction of molecular oxygen gas ($O_2$). Similarly, the term "auxiliary hydrogen oxidation electrode" refers to an auxiliary electrode that supports or catalyzes electrochemical reactions involving the oxidation of hydrogen, such as oxidation of molecular hydrogen gas ($H_2$). In some embodiments, a single auxiliary electrode structure may support both reactions, while in other embodiments, separate auxiliary electrode structures may be used to provide for oxidation and reduction reactions separately. Various examples of auxiliary electrode structures, compositions, and methods of operation are described herein.

Hydrogen/oxygen combustion elements may generally include any material or structure that supports or catalyzes the combustion of hydrogen gas with oxygen to produce water. In some embodiments, an auxiliary electrode or a portion of a battery electrode may also act as a hydrogen/oxygen combustion element. Various examples of hydrogen/oxygen combustion structures are described herein, although the examples described herein are not necessarily exhaustive.

In some embodiments, gasses may be vented or otherwise extracted from a battery container to a separate space in which the gases may be chemically or electrochemically recombined. In some embodiments, such separate spaces may be used to combine gasses produced from multiple batteries or from multiple battery packs. In some embodiments, chemical or electrochemical gas recombination may be performed using one or more fuel cell devices within the battery container or external to the battery container to oxidize hydrogen and/or reduce oxygen.

Also disclosed herein are batteries having any one or any combination of embodiments of batteries disclosed herein. Also disclosed herein are methods having any one or any combination of embodiments of methods and batteries disclosed herein. For example, also disclosed herein are methods for making batteries according to any one or any combination of embodiments disclosed herein. Also disclosed herein are methods for charging or discharging batteries according to any one or any combination of embodiments disclosed herein.

Battery Structures and Direct Recombination

FIG. 1 illustrates a secondary (rechargeable) battery system 10 comprising a positive electrode 12, a negative electrode 14, and a separator 16 within a battery container 18 filled with electrolyte 20 to a level 22 at least as high as the tops 32, 34 of the electrodes 12, 14. The space above the electrolyte level 22 may be referred to as the headspace 24. The positive electrode 12 may be electrically connected to the battery's positive terminal 42 and may contain active material that may undergo reduction reactions during discharging and oxidation reactions during charging. The negative electrode 14 may be electrically connected to the battery's negative terminal 44 and may contain active material that may undergo oxidation reactions during discharging and reduction reactions during charging of the battery 10.

In various embodiments, the positive electrode 12 active material may include metals or metal oxides such as one or more of nickel oxide, nickel hydroxide, manganese dioxide, silver, or other metals or metal oxides. In some embodiments, the positive electrode may also include one or more additives for enhancing conductivity, performance, limiting gas production, or other objectives. Examples of such additives may include carbon, graphite, zinc, manganese, manganese dioxide, yttrium, cobalt-containing additives such as cobalt hydroxide, cobalt oxyhydroxide or cobalt oxides, or others. Additives may include oxides, hydroxides, salts, or other compounds of these or other metals. Additives may include non-metals such as carbon black, graphite, or inert materials (e.g., polymers or ceramics) coated with metals, metal oxides, or metal hydroxides. In various embodiments, any combination of these or other materials may be used as positive electrode additives.

In some embodiments, the positive electrode and/or the negative electrode may comprise a binder material for binding active material particles and additive particles to one another and/or to a substrate (e.g., a current collector). Various binder materials may be used in either or both electrodes. For example, various polymers, alcohols (e.g., polyvinyl alcohol), rubbers (e.g., styrene butadiene rubber or others), ethyl cellulose, methyl cellulose, latex, epoxide resins. In some embodiments, a hydrophobic polymer binder may beneficially assist in transporting gas produced by an electrode out of the electrode to the headspace.

For example, a battery with hydrophobic material both a positive electrode and an iron-containing negative electrode may aid the transport of oxygen gas produced on the positive electrode across the separator and into the negative electrode where the oxygen may be recombined by reaction with the iron active material.

In various embodiments, other hydrophobic materials (e.g., in addition to or instead of PTFE) may be used as a binder or as a hydrophobic additive in positive and/or negative electrodes Examples of other hydrophobic materials may include fluorinated ethylene propylene (FEP), or perfluoroalkoxy alkanes (PFA), acrylics, amides, imides, carbonates, dienes, esters, ethers, fluorocarbons, olefins, styrenes, vinyl acetals, vinyl and vinylidene chlorides, vinyl esters, ketones, vinylpyridine polymers, and vinypyrrolidone polymers, among others. Further hydrophobic and superhydrophobic materials and treatment processes are described in "Superhydrophobic Polymers" by Mélanie Wolfs, Thierry Darmanin, and Frédéric Guittard, published online in the Encyclopedia of Polymer Science and Technology on 12 Jul. 2013. Such materials and/or treatments, or combinations thereof, may also be used in electrodes described herein.

In some embodiments, a hydrophobic polymer such as PTFE may be fibrillated by application of a shear force prior to or during fabrication of an electrode. Fibrillating shear forces may be applied by spinning PTFE powder particles in a speedmixer, by passing PTFE particles (optionally mixed with other electrode active materials and/or additives) through compression rollers or otherwise compressing the PTFE particles.

In some embodiments, a negative or positive electrode may contain a conductive polymer additive such as polyaniline, polycyclic aromatic compounds, polypyrrole, a polyacetylene, polyindole, or others.

The negative electrode 14 active material may include metal or metal oxides such as iron, zinc, cadmium, or other metals and/or oxides or hydroxides of these or other metals. In some embodiments, the iron negative electrode active material may include iron provided as elemental iron and/or as an iron-containing material, such as an iron-containing alloy or an iron-containing compound, such as an iron oxide, iron mixed oxide, iron hydroxide, iron sulphate, iron carbonate, iron sulfide, or any combination of these. In some embodiments, iron negative electrode active materials may include purified or refined iron materials such as carbonyl iron or electrolytic iron, or iron ores such as magnetite, maghemite, iron carbonate, hematite, goethite, limonite, or other iron materials.

In some embodiments, the iron negative electrode active material further comprises one or more negative electrode additives. In some embodiments, negative electrode additives may include a sulfide compound (e.g., bismuth sulfide, iron sulfide, iron disulfide, iron-copper sulfide, zinc sulfide, manganese sulfide, tin sulfide, copper sulfide, cadmium sulfide, silver sulfide, titanium disulfide, lead sulfide, molybdenum sulfide, nickel sulfide, antimony sulfide, dimethylsulfide, carbon dislulfide, etc.) and/or a bismuth-containing compound (e.g., bismuth sulfide or bismuth oxide). In some embodiments, one or more sub-oxides of iron sulfide of the form $FeS_{1-x}O_x$ and/or one or more solid solutions of iron sulfide and iron hydroxide of the form $FeS_x(OH)_y$ may be included as an iron negative electrode additive.

In some embodiments, an iron negative electrode may contain carbonyl iron or other iron active material (e.g., magnetite, hematite, or other iron oxides or iron hydroxides) and two or more soluble metal sulfide additives in amounts from about 0.01 weight percent (as a percent of the weight of carbonyl iron) to 10 weight percent or more. For example, an iron negative electrode may contain an iron active material, an iron sulfide additive in an amount from about 0.01% to about 10% by weight of the iron active material, and a second sulfide compound (e.g., bismuth sulfide, iron sulfide, iron disulfide, iron-copper sulfide, zinc sulfide, manganese sulfide, tin sulfide, copper sulfide, cadmium sulfide, a sub-oxide of iron sulfide, silver sulfide, titanium disulfide, lead sulfide, molybdenum sulfide, nickel sulfide, antimony sulfide, dimethylsulfide, carbon dislulfide, or others) in an amount from about 0.01% to about 10% by weight of the iron active material.

In some embodiments, a negative electrode may include one or more additive materials selected for enhancing conductivity, inhibiting gas evolution, improving discharge rate capability, or other battery performance enhancing objectives. Some examples of such additives may include metals such as copper, cobalt, nickel, tin, antimony, bismuth, indium, silver, gold, lead, or cadmium. Additives may include oxides, hydroxides, sulfides, salts, or other compounds of these or other metals, or elemental materials such as elemental sulfur. Additives may include non-metals such as carbon black, graphite, or inert materials (e.g., polymers or ceramics) which may be coated with metals, metal oxides, or metal hydroxides. In various embodiments, any combination of two or more these or other materials may be used as negative electrode additives. Suitable negative electrode materials and fabrication processes are described in U.S. Pat. No. 9,577,298 and US Patent Application Publication 2015/086884, both of which are incorporated herein by reference.

While examples and embodiments are described herein with reference to nickel positive active materials and iron negative active materials, the various embodiments may also be used in combination with other active materials or combinations of active materials.

In various embodiments, the electrodes 12, 14 may be made by any suitable process, such as sintering, hot-pressing, cold-pressing, wet-paste lamination, dry pressing, slurry coating. PTFE based process, roll bonding, tape casting (blade coating), or combinations of these or any other suitable process. In various embodiments, the electrodes may also include additive materials, pore formers, binders, current collectors, conductivity-enhancing additives, or other materials.

Pore formers may include particulate materials that may be included in an electrode during construction and that may be removed by a later step such as soaking in water, electrolyte, or other solvent and/or by sintering the constructed electrode (also referred to as an "as-made" electrode). Pore formers may include materials soluble in water or electrolyte such as polyvinyl alcohols, sodium bicarbonate, camphor, starches, or electrolyte-soluble metal oxides or hydroxides (e.g., tin oxide, zinc oxide, lead oxide, copper oxide, manganese oxide).

In some embodiments, a positive or negative electrode may be made by pressing active materials (hot, cold, wet, or dry) into or onto a substrate or "current collector" material. Such current collectors may include perforated metal sheets, solid metal sheets, sheets of woven metal fibers, metal mesh, metal foam, fibrous metal wool structures, or other conductive metal substrates. Metal substrates may be made of steel, nickel, iron, copper, titanium, silver, nickel ferrite, cobalt ferrite, spinel-coated materials, or combinations of these or other metals (e.g., steel or iron coated with nickel, copper, or other metals). In some embodiments, a current collector substrate may comprise an inert material coated with a conductive material, such as metal-coated polymers or metal-coated ceramics.

Positive and/or negative electrodes may undergo "formation" processing (or "formation cycling") in order to cause micro-structural, morphological and/or electrochemical changes in the material of the electrode relative to an "as-made" electrode. The term "as-made electrode" refers to a fabricated electrode prior to any formation processing or other electrochemical cycling. The term "formation processing" generally refers to a process in which an as-made electrode is assembled in a formation cell with a counter-electrode. The formation cell is then subjected to electrochemical cycling by charging and discharging the cell until a desired endpoint. In various embodiments, the endpoint of a formation process may be defined in terms of a change in capacity at the end of a discharging cycle. For example, formation may be ended when measured discharge capacity of the forming electrode changes by less than a pre-determined amount (e.g., 5%, 2%, 1%, 0.5%) from one discharge cycle to the next. An average capacity of some number of final formation cycles is generally referred to as the "end-of-formation capacity" or simply "formation capacity" of the electrode. For example, an electrode's formation capacity may be the average discharge capacity of the final 2, 3, 4, 5 or more cycles of formation processing.

"Capacity" of a battery electrode may be defined in various ways (capacity of auxiliary gas recombination electrodes is described separately below). In general, an electrode's capacity is the total energy that may be stored in and delivered from that electrode. In practical terms, an electrode's theoretical capacity is typically larger than its "rated" capacity, which may be different than its "end-of-formation" capacity, which may be different than a measured capacity in any given cycle. A battery generally cannot spontaneously deliver more energy than is stored in the smaller (lower-capacity) electrode, so the capacity of a battery will tend to be descriptive of the lower-capacity electrode within the battery, also referred to as the "limiting" electrode.

An electrode's theoretical capacity is a measure of the electrode's capacity assuming 100% of the total active material in the electrode is capable of being charged and discharged. However, in practical terms, less than 100% of the active material will be usable due to various factors such as electrical connectivity of the particles, the formation process used, discharge rate limitations, and other factors. The term "chargeable capacity" is used herein to refer to the total amount of energy that may be stored in an electrode or battery regardless of how much may be delivered at any particular rate. Battery electrodes that are manufactured under consistent conditions are typically given a "rated" capacity that is typically a minimum capacity that a customer might expect to see. The rated capacity is often less than the end-of-formation capacity.

The term "discharge capacity" may generally refer to the quantity of energy delivered by a battery (or electrode) after the battery (or electrode) is charged to a particular "charge capacity" which may be greater or less than the theoretical, rated, or end-of-formation capacity. The magnitude of the discharge capacity divided by the magnitude of the charge capacity is referred to as the "coulombic efficiency" of the battery or electrode. Discharge capacity may also be affected by the rate of discharge. For example, some electrodes may deliver more capacity at slower discharge rates (i.e., lower current densities) than the same electrodes may deliver at faster discharge rates (i.e., higher current densities). The discharge capacity at any given rate may be referred to as the "accessible capacity" of the electrode at that rate. The term "discharge rate" refers to the current at which an electrochemical cell or battery is discharged. Discharge rate can be expressed in units of ampere. Alternatively, discharge rate can be normalized to the rated (or other) capacity of the battery, and expressed as $C/(X\ t)$, wherein C is the capacity of the electrochemical cell, X is a variable and t is a specified unit of time, as used herein, equal to 1 hour.

As the term "capacity" is used herein, it may refer to any of these or other definitions of capacity unless a particular definition is specified. When discussing a ratio of capacities, it is more important to use the same capacity definition for both electrodes in the ratio than which definition of capacity is used. Therefore, if a capacity ratio is specified herein, we assume only that both sides of the ratio use the same definition of capacity as one another.

In various embodiments, the electrolyte 20 may be an aqueous or non-aqueous alkaline, neutral, or acidic solution. For example, the electrolyte solution may contain potassium hydroxide (KOH), sodium hydroxide (NaOH), lithium hydroxide (LiOH) or combinations of these. In some embodiments, the electrolyte may contain further additives such as surfactants (e.g., Triton X-100), corrosion inhibitors, dissolved sulfides (e.g., sodium sulfide or potassium sulfide), or others. In some example embodiments, an electrolyte may contain 5 to 15M KOH and 0.1 to 2% (w/v) LiOH.

In some embodiments, a battery 10 may include a separator 16 configured to allow transfer of ions between the electrodes 12, 14 via the electrolyte. In some embodiments, a separator may be chosen based on an ability to allow selective transfer of desired molecules or materials while substantially limiting or preventing transfer of undesired molecules or materials. For example, some separator membranes are ion-selective and allow the transfer of negative (or positive) ions while substantially preventing transfer of positive (or negative) ions. In other examples, separator materials may be chosen based on an ability to allow or prevent the cross-over of gas bubbles from one side (associated with one electrode) to the opposite side (associated with the counter-electrode).

In various embodiments, a battery separator may have properties beneficial for an efficient long-life battery. Such properties may be properties of materials from which the separator is formed or properties engineered into the separators by various processing steps, additive materials, or other modifications. Examples of properties beneficial for an iron-electrode battery separator may include stability in a chosen electrolyte (e.g., an alkaline aqueous solution), hydrophilicity sufficient to allow efficient ionic transport and to substantially prevent gas bubbles from crossing through the separator, patterns of hydrophobicity for directing gas bubbles toward a desired region of the cell, a diffusion coefficient low enough to slow transport of sulfide ions but high enough to allow adequate transport of electrolyte ions such as hydroxide ions, phase-selectivity for disallowing transport of gas bubbles, and/or other properties. In some embodiments, a separator used in an iron-electrode battery may beneficially have a diffusion coefficient (for sulfide or hydroxide) of at least about $1 \times 10^{-8}$ cm$^2$/s (e.g. NAFION® or ZIRFON® separators), but less than about $1 \times 10^{-6}$ cm$^2$/s, (e.g., a compressed polyolefin membrane, a polyvinyl alcohol membrane (with or without cross-linking agents), an ethyl-cellulose or methyl-cellulose membrane, or others).

In various embodiments, a separator 16 may be made of one or more of various materials, including nylon, polyethylene (PE), polypropylene (PP), polyolefins (PO), polyamide (PA), poly(tetrafluoroethylene) (PTFE), polyvinylidine fluoride (PVdF), poly(vinyl chloride) (PVC), polysulfone (PSU), polyphenylsulfone (PPSU), polyetheretherketone (PEEK), asbestos, zirconium oxide cloth, cotton, polyvinyl alcohol or polyvinyl acetate (PVA), ethyl-cellulose, methyl-cellulose, ethylene-methacrylic acid copolymers, fluorinated polymers, sulfonated polymers, carboxylic polymers, woven or non-woven cellulose, NAFION, or others. In some embodiments, a separator material may be modified by addition of cross-linking agents or by post-treatments such as corona discharge treatments for modifying surface features of the material such as modifying a hydrophilicity or hydrophobicity of the material. In some embodiments, ceramic membranes or composite ceramic/polymer membranes may also be used.

In some embodiments, a separator may be made of a suitable material and construction so as to be substantially hydrophilic and impervious to one or more gases. In some embodiments, separators may be made of materials from the class of materials known as ionomers, including anion exchange membranes and proton exchange membranes, which may be solid non-porous materials capable of conducting ions without allowing diffusion or direct flow of liquids or dissolved species through them. Examples of ionomers include ethylene-methacrylic acid copolymers such as that produced by DUPONT under the trademarks SURLYN and NUCREL, fluoropolymer-copolymers such as that produced by DUPONT under the trademark NAFION, or others.

In some embodiments, separators may include solid-gel materials or composite materials such as the separator materials described in US Patent Application Publications US20020012848, US20020010261, US20030099872, and US20120148899, US Patents U.S. Pat. Nos. 3,953,241, 6,358,651, and 6,183,914, or European Patent EP0624283B1. For example, a composite material separator membrane may comprise a polymer membrane (e.g., made of one or more of the materials described above) impregnated with a metal oxide or metal hydroxide (e.g. oxides, dioxides, sub-oxides, or hydroxides of metals such as zirconium, aluminum, lithium, titanium, magnesium, etc.).

In some embodiments, a separator material may be treated to increase or decrease hydrophilicity or hydrophobicity as described in "Use of a Corona Discharge to Selectively Pattern a Hydrophilic/Hydrophobic Interface for Integrating Segmented Flow with Microchip Electrophoresis and Electrochemical Detection," by Laura A. Filla, Douglas C. Kirkpatrick, and R. Scott Martin in Analytical Chemistry, 2011, 83 (15), pp 5996-6003 on 1 Aug. 2011. Alternatively, US Patent Applications 2012/0328905 and 2015/0136226 describe methods for forming hydrophilic surfaces by laser treatments which may be adapted for creating hydrophobic regions in separator materials or electrode materials as described herein.

In various embodiments, separator materials may be selected or modified in order to allow or prevent oxygen or other gas to pass through the separator while maintaining electrical separation of the electrodes. For example, various microporous separator materials may allow oxygen gas to pass through. Separator materials not generally capable of allowing the transmission of oxygen gas may be made permeable to oxygen gas by perforating the material or otherwise forming pores for the transmission of gases. In some embodiments, a separator 16 may be omitted and/or replaced by another ionically conductive pathway.

In various embodiments, the battery container 18 may be made of any suitable materials and construction capable of containing the electrolyte, electrodes, and at least a minimum amount of gas pressure. For example, the battery container 18 may be made of metals, plastics, composite materials, or others. In some embodiments, the battery container 18 may be sealed so as to prevent the escape of any gases generated during operation of the battery.

In some embodiments, the battery container 18 may include a pressure relief valve to allow release of gases when a gas pressure within the battery container 18 exceeds a pre-determined threshold. In some embodiments, the threshold gas pressure for prismatic batteries may be any pressure up to about 50 PSIG or more. In some embodiments, the threshold gas pressure for prismatic batteries may be between about 10 PSIG and about 40 PSIG. In some embodiments, the threshold gas pressure for prismatic batteries may be between about 20 PSIG and about 30 PSIG. In the case of cylindrical batteries, the threshold pressure may be much higher, such as up to 500 PSIG or more.

While the electrodes 12, 14 are shown substantially spaced apart in the figures, in some embodiments the electrodes may be very close to one another or even compressed against one another with a separator 16 in between. Furthermore, although the figures may illustrate a single positive electrode 12 and a single negative electrode 14, battery systems within the scope of the present disclosure may also include two or more positive electrodes 12 and/or two or more negative electrodes 14.

In some embodiments, features may be provided at an interface between electrodes and the separator to aid in allowing gas bubbles to escape upwards rather than become trapped at an electrode/separator interface. Some embodiments of such gas-escape structures may include geographic features structured into a face of an electrode that create spaces between the separator and recessed regions of the electrode. Such geographic features may include linear shaped channels with longitudinal directions typically (though not necessarily) extending substantially vertically relative to the electrolyte level.

Other gas-escape geographic structures may include regularly-spaced, arbitrarily-spaced, or randomly-spaced peaks and valleys or corrugations (preferably with a minimum of sharp "peaks" that may puncture the separator and cause the electrodes to short-circuit) arranged such that the peaks contact the separator while the valleys create gas spaces. A suitably connected network of such peaks and valleys may create winding or meandering pathways for gas bubbles to flow upwards between the electrode and the separator.

As used herein, the term "gas-escape structures" may be defined in one or more ways. In some embodiments, gas-escape structures may be defined in terms of a minimum, maximum, average or other aggregate measure of a distance between proximal (i.e., closer to a central plane of a flattened electrode) "low-points" and distal (i.e., furthest from a central plane of a flattened electrode) "high-points."

In some embodiments, an electrode may be said to include gas-escape structures if a minimum or average distance between high points and low points is at least 100 microns or more, 1 mm or more, or 5 mm or more in other embodiments. In some embodiments, an electrode may be said to include gas-escape structures if a minimum or average distance between high points and low points is at least ten times as large as the largest particle of active material. In some embodiments, an electrode may be said to include gas-escape structures if a minimum or average distance between high points and low points is at least 10% of the electrode's thickness (where electrode thickness defined as the distance between a highest-point on one electrode face to a high-point on the opposite face.

In further embodiments, gas-escape structures may be provided as an additional layer of material interposed between an electrode and a separator Alternatively or in addition, gas-escape structures may be provided as structures formed in the separator. For example, channeled, corrugated, or net-shaped sheet structures may be interposed between an electrode and a separator. In other examples, a separator may be formed with folds, corrugations, or multiple layers with channels or other elevated structures in order to create gas-escape spaces between an electrode and the separator.

However, in some cases it may be desirable to minimize or substantially eliminate spaces or structures between an electrode and a separator in which gas bubbles may form, accumulate or travel, in which such a configuration may tend to cause gases to be forced through the separator where they may interact with the counter-electrode. Such embodiments may be particularly desirable so as to encourage direct recombination of oxygen on a negative electrode. Arrangements in which an electrode contacts a separator with a minimum of gas accumulation spaces between the electrode and the separator (i.e., arrangements that do not include any of the gas escape structures described herein) may be referred to herein as the electrode being in "uniform contact" with the separator. In an embodiment, for example, an electrode being in "uniform contact" with a separator refers to an arrangement wherein less than 0.1% of the volume, and for some applications less than 0.01% of the volume, between the electrode and the separate corresponds to spaces and/or structures in which gas bubbles may form, accumulate or travel.

In some embodiments, a layer of porous inert conductive material may be positioned between an electrode and a separator for the purpose of recombining gas that crosses the separator before it reaches the electrode adjacent to it. Example inert materials may be "inert" in that they do not contain species that will tend to be electrochemically oxidized or reduced in the battery. For example, suitable inert materials may include carbon paper, carbon felt, inert metal meshes, perforated foils, foams, etc. Examples of such inert metals may include any of the materials described as possible current collectors, such as nickel, titanium, copper, etc.

Additionally, the number and/or cumulative capacity of positive electrodes may be unequal to the number and/or total cumulative capacity of negative electrodes. For example, in some embodiments, a battery system may have a larger total cumulative negative electrode capacity than total cumulative positive electrode capacity. On the other hand, some embodiments of a battery system may have a larger total cumulative positive electrode capacity than total cumulative negative electrode capacity. In various embodiments, providing a larger total capacity of one electrode relative to its counter-electrode may limit the opportunity of the larger-capacity electrode to be driven to an over-charge, over-discharge, or polarity reversal condition at which it may generate significant quantities of gas.

In some embodiments, a separator 16 material may be selected to have an increased permeability to hydrogen and/or oxygen gas. In some embodiments, a separator 16 may be a multi-layered separator having one or more hydrophobic gas transport layers and one or more hydrophilic ion-transport separator layers. For example, a separator may comprise at least one layer of hydrophobic material and at least one layer of a hydrophilic material, thereby allowing for both gas transfer and ion (electrolyte) transfer through the separator.

In some embodiments, portions of a separator material may be made hydrophobic or hydrophilic by treating or coating the separator material. For example, in some cases a hydrophilic material may be patterned with hydrophobic regions by a corona discharge treatment, laser treatment, chemical treatments, or others. Various hydrophobic and/or hydrophilic coatings and/or chemical treatments may also be applied to a separator to impart corresponding characteristics to the separator material in order to encourage gas transport across the separator without substantially inhibiting ionic transport.

Figure 2:
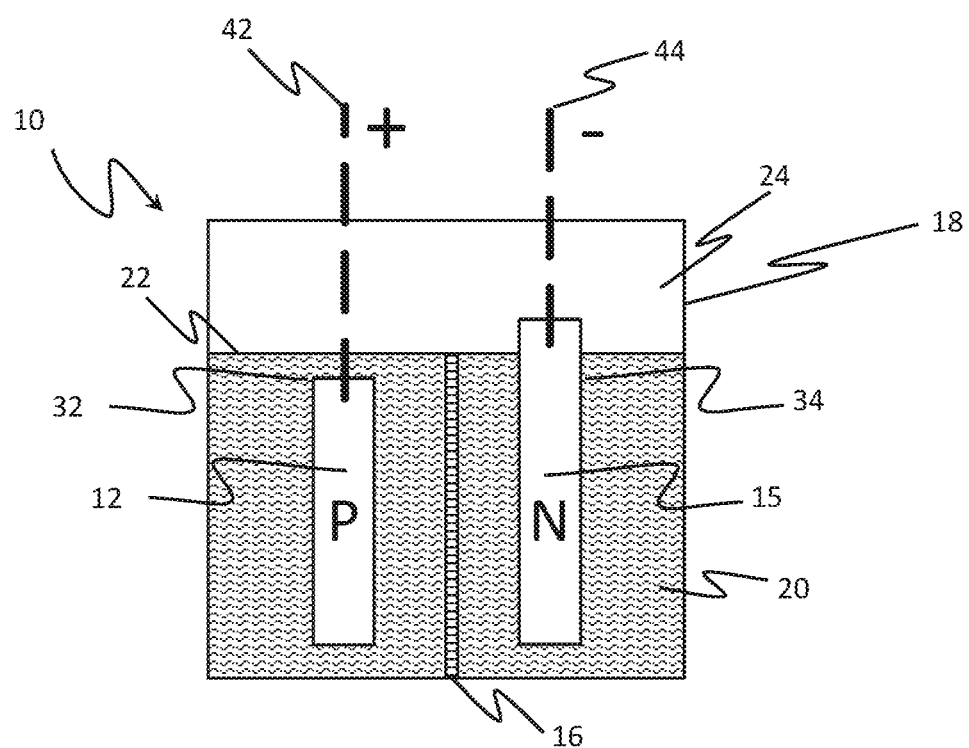
FIG. 2 is a schematic illustration of a sealed battery with a partially-flooded negative electrode extending into a headspace above an electrolyte level and a flooded positive electrode submerged in the electrolyte.

In some embodiments, as illustrated for example in FIG. 2, direct gas recombination may be aided by arranging a battery such that a portion of at least one battery electrode extends above the electrolyte level 22 into the gas headspace, thereby allowing gases to recombine by interaction with the electrode (or electrodes) exposed to the gas headspace. For example, in one embodiments a negative electrode 15 may be sized so as to be physically larger than the positive electrode 12 such that the negative electrode 15 extends into the headspace while the positive electrode 12 remains submerged in the electrolyte 20. Alternatively, a positive electrode may be sized so as to be physically larger than the negative electrode such that the positive electrode extends into the headspace while the negative electrode remains submerged in the electrolyte. In still other embodiments, a battery may be configured such that both electrodes are partially flooded and extend at least partially into the headspace.

In some embodiments, a battery containing multiple positive electrodes and multiple negative electrodes may have one or more negative electrodes or one or more positive electrodes sized larger than the remaining electrodes such that the larger (positive or negative) electrode extends into the headspace while the remaining positive and negative electrodes remain submerged in the electrolyte. In some embodiments, a portion of an electrode surface extending into the headspace may be coated with a catalyst material selected to catalyze chemical or electrochemical hydrogen oxidation or oxygen reduction reactions.

In various embodiments, electrode stacks (i.e., an assembly of at least one positive electrode, a separator and at least one negative electrode) may be arranged in various configurations such as "free-standing" and "compressed." In a free-standing configuration, the positive and negative electrodes may be spaced apart from the separator or in loose contact with the separator. In a compressed configuration, the electrodes may be in tight contact with the separator, where the tight contact is maintained by a structure forcing the stack components against the separator(s). In some embodiments, a compressed electrode stack may be held in a compressed state by a spring shim or other structure interposed between a wall of a battery container (whether cylindrical or prismatic) and a portion of the battery stack. In some embodiments, a compression pressure may be applied by a battery container structure configured to apply a compressive pressure to the battery stack. For example, a prismatic or cylindrical battery container may include compression bolts, screws, or other structures configured for applying a compressive pressure to the electrode stack. In various embodiments, an applied compression pressure may be at least 1 PSI, 10 PSI, 20 PSI, 25 PSI, or more. In some embodiments, the compression pressure may be at least partially applied by expansion (or "swelling" of the battery electrodes) being restrained by a housing, can, or other enclosure containing the electrodes and electrolyte.

Long Life Iron Electrodes

Without wishing to be bound by any particular theory, there may be discussion herein of beliefs or understandings of underlying principles relating to the devices and methods disclosed herein. As also noted earlier, it is reiterated that inventors recognize that regardless of the ultimate correctness of any mechanistic explanation or hypothesis, an embodiment of the invention can nonetheless be operative and useful.

The presence of sulfide compounds such as iron sulfide in an iron electrode may impact rate capability; the ability of the electrode to be discharged at relatively high rates (e.g., see U.S. Pat. No. 9,577,298 and US Patent Application Publication 2015/086884, which are incorporated herein by reference). Incorporation of electronically conductive sulfide compounds such as iron sulfides in an iron negative electrode may counter passivation caused by the discharge product, iron (II) hydroxide, which is an electronic insulator. Sulfide compounds are believed to maintain the electronic conductivity at the interfaces between adjacent iron particles and/or iron hydroxide particles and at interfaces between iron (or iron hydroxide) particles and a current collector, allowing the discharge reaction to be sustained at high rates. Many electrolyte-soluble sulfide compounds may be used as a source-material for sulfide incorporation by an iron electrode.

Sulfide ions in an electrolyte solution (e.g., from a dissolved sulfide additive or other sulfide source) may be incorporated into an iron electrode during formation cycling. The exact chemical composition and solid-state phase of sulfide compounds incorporated into an iron electrode through formation cycling may vary and/or be unknown, but may include one or more compounds of sulfur with iron, oxygen, and/or hydrogen (e.g., an iron sulfide phase, a solid solution of iron sulfide and iron hydroxide, a sub-oxide of iron sulfide, or others). Sulfide incorporated into an iron electrode during formation cycling may be referred to herein as "incorporated sulfide."

A sulfide-source material (e.g., a soluble metal sulfide) added into an as-made iron electrode may be referred to herein as a "sulfide additive." A sulfide-source material added to the electrolyte without being electrically connected to the iron electrode may be referred to herein as a "sulfide reservoir" or "reservoir sulfide."

As used herein, the term "sulfide-source material" refers to any material or substance that may deliver sulfide ions into electrolyte by any mechanism, including dissolution, electrochemical reduction or oxidation, mechanical injection, or otherwise. Various examples of sulfide-containing or sulfur-containing materials are described herein, any of which may be a sulfide-source material within the broad meaning of the term. A "solid soluble sulfide-source material" is a sulfide-source material in solid form that is at least slightly soluble in an electrolyte solution.

The term "sulfide compound" refers to a chemical species comprising sulfide ion(s) or a chemical species which may dissociate into sulfide ion(s) upon dissolution in an electrolyte. A sulfide compound may refer to an incorporated sulfide compound, an additive sulfide compound, a sulfide-source material in a sulfide reservoir, or all of these. The term "sulfide ion" refers to $S^{2-}$ or an ion comprising $S^{2-}$. A sulfide ion may be present in solid form as part of a solid compound (e.g., a solid ionic compound). A sulfide ion may be a dissolved sulfide ion, such as a sulfide ion dissolved in an electrolyte. The term "sulfide" may refer to a sulfide ion or a sulfide ion-containing compound. In some embodiments, the term "sulfide" refers to sulfide ion(s).

Incorporated sulfide may be irretrievably lost from the iron electrode by multiple mechanisms under various conditions. Incorporated or additive sulfide may be "lost" from the iron electrode by entering the electrolyte solution via electrochemical reduction and/or by dissolution. Once in solution, sulfide may be "consumed" by being irretrievably converted to (dissolved or solid) sulfur species such as sulfites or sulfates.

The rate of electrochemical reduction of sulfide (incorporated or electrically-connected additive) may substantially increase as the electrode becomes more highly polarized. In other words, as the potential of the iron electrode becomes more negative (i.e., as the negative electrode is charged to higher states-of-charge), sulfide may be increasingly lost from the iron electrode into the electrolyte solution. As sulfide is lost from the electrode and consumed without being replaced, performance of the battery will increasingly degrade.

A key element to producing a long-life Ni—Fe battery lies in the ability to retain sulfide in the iron negative electrode throughout charging and discharging cycles.

Sulfide may be added to an iron electrode at any stage. For example, a solid electrolyte-soluble sulfide-source material such as iron sulfide, bismuth sulfide, tin sulfide, zinc sulfide, manganese sulfide, a sub-oxide of iron sulfide, or others, may be included as an additive in powder or other particulate form into a negative electrode active material mix during fabrication of an as-made iron electrode. Additionally or alternatively, sulfide may be added to an iron electrode during formation processing by adding a sulfide-containing solution (e.g., sodium sulfide or potassium sulfide) into an electrolyte in which formation cycling will occur. In further embodiments, sulfide may be added to the electrolyte by placing a soluble solid sulfide-source material in the electrolyte, but electrically isolated from the iron electrode.

The dissolved sulfide ions in the electrolyte will tend to be taken up by the iron electrode, typically by forming an in-situ incorporated sulfide compound in the iron electrode through chemical reactions with species in the iron electrode such as iron, iron oxide, and/or iron hydroxide.

In some embodiments, a negative electrode may contain a metal sulfide additive with large particles (e.g., 100 microns or greater) in addition to a metal sulfide additive of smaller particles (e.g., less than 100 microns). In various embodiments, "small particles" may be those smaller than 50 microns while "large particles" may be those larger than 50 microns.

In some embodiments, sulfide may be provided in an iron electrode by coating a current collector substrate with a sulfide material. For example, a current collector substrate may be pre-treated to form a metal sulfide on the current collector prior to pressing or otherwise adhering active material onto the current collector.

Regardless of how sulfide is incorporated into the electrode, incorporated sulfide and sulfide additives, may leave (e.g., dissociate; e.g., dissolve) the iron electrode into the electrolyte solution by multiple mechanisms.

For example, iron sulfide and other metal sulfides may be electrochemically reduced to metallic iron and dissolved sulfide ions when charging the iron electrode. The rate of electrochemical reduction of iron sulfide may occur to some extent at all charging potentials, but increases substantially at more negative potentials, especially during over-charging of the negative electrode. Other incorporated sulfide species may also be electrochemically reduced to release sulfide ions into solution Independent of charge or discharge potential, some amount of sulfide may simply dissolve in the electrolyte due to dissolution thermodynamics. Both mechanisms release sulfide ($S^{2-}$) ions into solution.

Some sulfide ions in solution may migrate (e.g., by diffusion or other mechanisms) to the positive electrode where they will tend to be oxidized to produce various sulfur-containing species such as sulfites or sulfates. Sulfide ions in solution may also react with oxygen bubbles or dissolved oxygen and may be similarly converted into sulfite or sulfate compounds. Oxygen may be produced by electrolysis side-reactions at the positive electrode and may migrate across to the negative electrode in dissolved or gaseous form. The conversion of sulfide to such oxidized species is irreversible in that they cannot be easily converted back into sulfides in-situ within a battery. Because the conversion of sulfide to sulfites or sulfates is considered a one-way process, sulfide that is converted to a sulfite or sulfate will be referred to herein as having been "consumed."

Sulfide that is lost from the iron electrode into solution and consumed may be replaced in the iron electrode by additional sulfide ions available in the electrolyte. For example, if un-incorporated additive sulfide or reservoir sulfide enters the electrolyte (e.g., is dissolved or electrochemically reduced), that sulfide may become available for incorporation into the iron electrode by reacting with iron hydroxide or other species in the iron electrode. Therefore, if a rate of sulfide consumption exceeds a rate at which unincorporated sulfide enters solution, there will be a net loss of sulfide from the cell.

The net consumption of sulfide from the iron electrode may degrade performance over time. Additionally, the produced sulfite or sulfate compounds may themselves interfere with operation of the positive electrode, and in a sealed cell, sufficient oxidation of sulfide by the positive electrode and/or by oxygen produced at the positive electrode may lead to an imbalance in the states-of-charge of the positive and negative electrodes.

When the quantity of sulfide in the iron electrode falls too low, the accessible capacity of the iron electrode tends to drop precipitously, particularly for higher discharge rates, but eventually at all practicable rates.

Figure 3A:
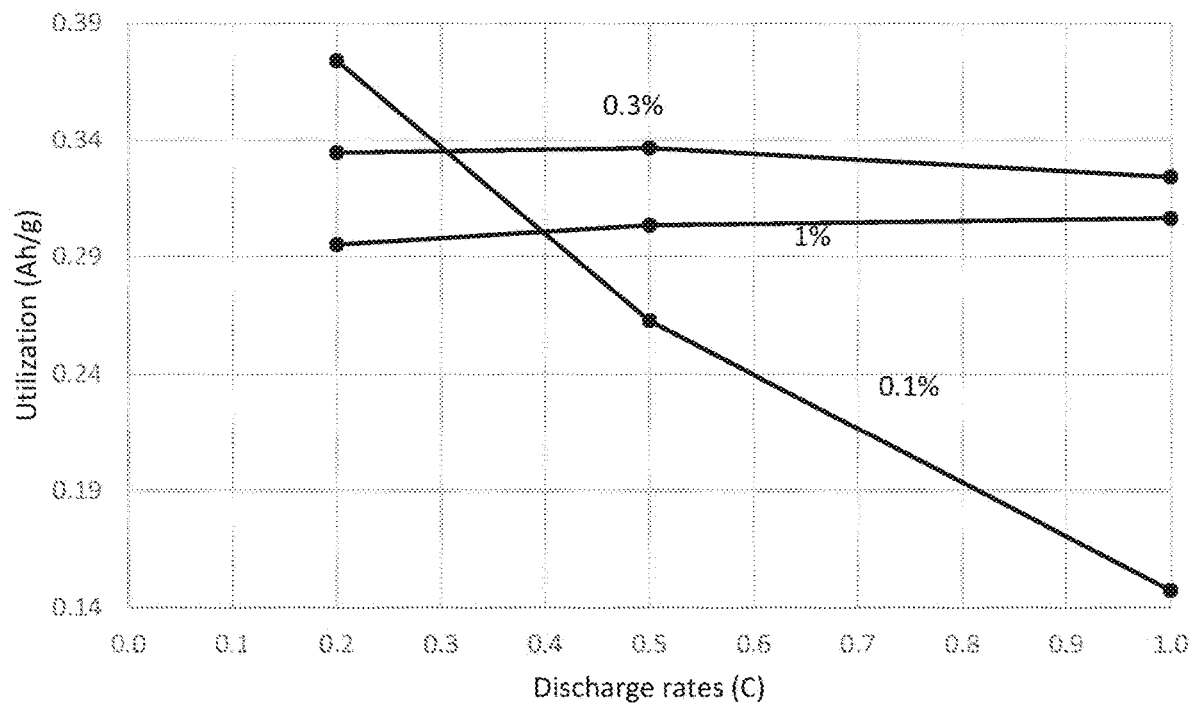
FIG. 3A is a schematic chart illustrating a relationship between sulfide content and discharge rate capability of an iron electrode.

FIG. 3A illustrates discharge rate performance for three electrodes containing different quantities of an iron sulfide additive. The chart of FIG. 3 illustrates electrode utilization (discharge capacity per unit mass of active material) vs discharge rate (where a rate of "1C" is the rate at which the electrode's end-of-formation capacity may be discharged in one hour). The electrode containing 0.1% iron sulfide additive by weight of iron exhibits considerably lower utilization at higher discharging rates compared to slower discharge rates. The electrode containing 0.3% iron sulfide additive by weight of iron exhibits slightly lower utilization at a 1C discharge rate compared to a C/2 discharge rate. By contrast, the electrode containing 1% iron sulfide additive by weight of iron exhibits about the same utilization at discharge rates of C/5, C/2, and C.

Figure 3B:
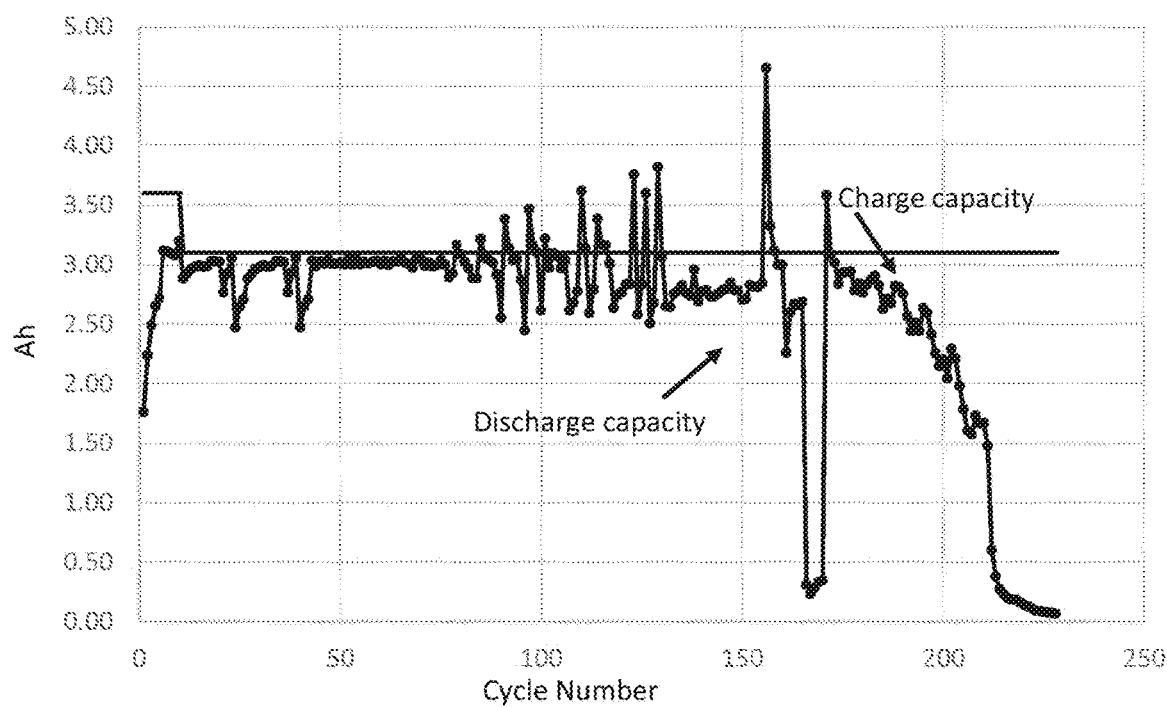
FIG. 3B is a schematic chart illustrating loss of discharge capacity of a nickel-iron battery with a small quantity of sulfide in the iron electrode.

FIG. 3B illustrates charge/discharge cycling of an iron electrode containing 0.3% iron sulfide additive by weight of iron. As can be seen at about 175 cycles, the discharge capacity drops, eventually falling to essentially zero. After the electrode failed, it was disassembled and the inventors determined that the iron electrode had lost substantially all of the iron sulfide additive.

Preventing Net Loss of Incorporated Sulfide by Avoiding High Potentials

Without wishing to be bound by any particular theory, there may be discussion herein of beliefs or understandings of underlying principles relating to the presence, composition, reactions and/or function of incorporated sulfide, additive sulfide and/or reservoir sulfide in electrochemical systems, and components thereof, disclosed herein. The present inventors have discovered that the rate of electrochemical sulfide compound, such as iron sulfide, reduction substantially increases as the negative electrode becomes more highly polarized (i.e., reaches more negative potentials). In particular, sulfide loss from the iron electrode appears to increase substantially when the electrode reaches potentials more negative than about −1.0 V. In other words, as the potential of the iron electrode becomes more negative (i.e., as the negative electrode is charged to higher states-of-charge), sulfide may be increasingly lost and consumed, thereby increasingly degrading performance of the battery.

Figure 3C:
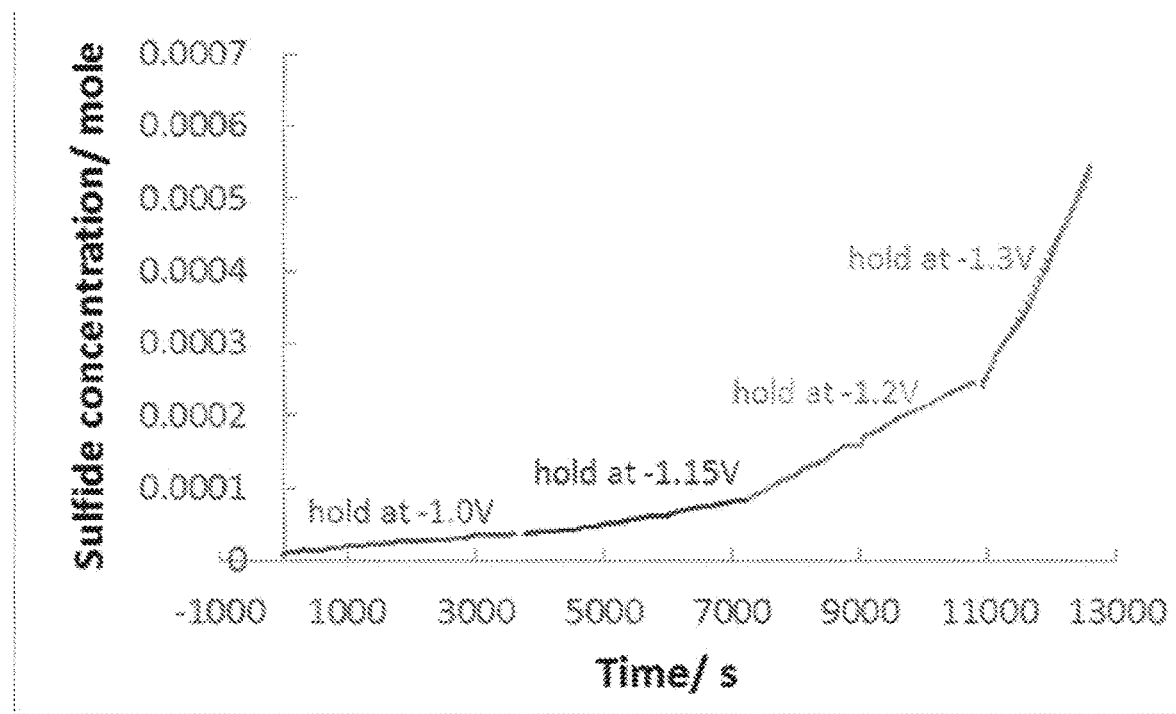
FIG. 3C is a schematic chart illustrating increasing rates of sulfide loss from an iron negative electrode at more negative potentials.

FIG. 3C is a chart plotting the quantity of sulfide measured in the electrolyte with a sulfide-ion-selective electrode vs. time for iron electrodes (containing sulfide compound, such as iron sulfide) held at various specified electric potentials. As sulfide is lost from the electrode, the quantity of sulfide detectable in the electrolyte increases and is detected as a potential with the sulfide-selective electrode calibrated to correlate detected voltages to sulfide quantities. As shown, when an electrode is held at −1.0 V, the rate of increase of sulfide in the electrolyte is very slow. As electrodes are held at higher potentials, the slope of increasing sulfide in the electrolyte becomes increasingly steep indicating rapidly rising rates of sulfide leaving the electrode at more negative potentials.

In some embodiments, for example, minimizing the rate at which sulfide is permanently lost from an iron electrode and consumed is important to producing an efficient, high-rate and long-life iron electrode. Stated differently, it is important to maintain a quantity of sulfide in the iron negative electrode in order to allow for an efficient, high-rate, long-life iron-electrode battery such as a nickel-iron battery.

In some embodiments, for example, sulfide ions in the electrolyte may react with iron hydroxide in the iron electrode to re-form or incorporate sulfide compounds, such as iron sulfides (e.g., FeS, $Fe_3S_4$ or other iron sulfide compounds or solid solutions containing sulfide), in the iron electrode. As a result, the presence of available iron hydroxide in the iron electrode active material may substantially slow or even stop the net loss of sulfide from the electrode. This is because, as long as enough iron hydroxide is available, any dissolved or reduced sulfide proximate to a portion of iron hydroxide may be quickly converted back to sulfide compound(s) before being irretrievably converted to a sulfite or sulfate. In some embodiments, therefore, by maintaining at least a minimum iron hydroxide reserve in the electrode at all times, a desired minimum amount of sulfide compound(s) may be retained in the iron electrode for as long as sulfide remains available.

As used herein, the term "iron hydroxide" refers to any hydroxide-containing iron compound, including $Fe(OH)_2$, $Fe(OH)_3$, anhydrous iron hydroxide such as $FeO(OH)$, or hydrated forms of iron hydroxide of the form $FeO(OH) \cdot nH_2O$ (where n is a number of water molecules in a hydrated iron hydroxide molecule), and any polymorphs of these or other forms.

When an iron electrode is charged, iron hydroxide is reduced to metallic iron. Therefore, in order to maintain a reserve of iron hydroxide, charging of the iron electrode must be prevented from converting all of the iron hydroxide to iron. In general, this may be achieved by retaining a reserve chargeable capacity in the negative electrode. As used herein, the term "chargeable capacity" refers to a portion of the electrode's active material that may be converted from a "discharged" species to a "charged" species.

Stated differently, sulfide may be retained in an iron negative electrode by avoiding charging the iron negative electrode to a 100% state-of-charge, where the "state-of-charge" (or "SOC") of an electrode is defined as the percent of electrode active material that has been converted from a "discharged" species to a "charged" species. As used herein, the SOC of a battery will be defined as the SOC of the electrode with a lower total capacity compared to its counter-electrode. The lower-capacity electrode in a battery will generally be referred to as the "limiting electrode."

In some embodiments sulfide may be retained in an iron negative electrode by never charging the iron electrode to an SOC greater than a threshold SOC. In various embodiments, a threshold SOC may be up to about 99%. In some particular embodiments, a threshold SOC may be between about 50% and about 90%. In various specific embodiments, a threshold SOC may be about 50%, 55%, 60%, 65%, 70%, 75%, 80%, 85%, 90%, 95%, or SOC values in between these.

In some embodiments, this may be achieved by coupling a positive electrode with an iron negative electrode that has a greater capacity than the positive electrode. Assuming the overcharging of the positive electrode can be minimized, and assuming the positive and negative electrodes remain balanced (i.e., one coulomb of charge is added to the negative electrode for each coulomb of charge added to the positive electrode and one coulomb of charge is removed from the negative electrode for each coulomb of charge removed from the positive electrode) this excess negative electrode capacity may ensure that the negative electrode is never charged to a higher state-of-charge than the capacity ratio of the electrodes. In other words, (with the above assumptions) if a battery has a negative-to-positive electrode capacity ratio of 130% (i.e., the total negative electrode capacity is 130% of the total positive electrode capacity), then when all active material in the positive electrode has been converted to a "charged" species (i.e., starting with both electrodes at a 0% SOC, the positive electrode is charged to a 100% SOC), only about 77% of the negative electrode active material will have been converted to a "charged" species.

In various embodiments, a battery with an iron negative electrode may have a negative-to-positive capacity ratio of between about 101% to 200% or more. In particular embodiments, a negative-to-positive capacity ratio may be 110%, 115%, 120%, 125%, 130%, 135%, 140%, 145%, 150%, 155%, 160%, 165%, 170%, 175%, 180%, 185%, 190%, 195%, 200%, 205%, 210%, 215%, 220%, 225%, 230%, 235%, 240%, 245%, 250%, 255%, 260%, 265%, 270%, 275%, 280%, 285%, 290%, 295%, 300% or more.

However, if the positive electrode is less efficient than the negative iron electrode (i.e., if parasitic gas-producing side reactions steal some charge from the positive electrode while charging), then during each charge cycle the negative electrode state-of-charge will tend to increase more than the positive electrode state-of-charge. Eventually, the negative electrode will reach a 100% state-of-charge at which point all of the iron active material will have been charged to metallic iron, leaving no iron hydroxide to recapture sulfide ions from the electrolyte. Once the negative electrode reaches top-of-charge, subsequent cycles will tend to overcharge the negative electrode, further accelerating the net loss of sulfide from the negative electrode.

By incorporating gas recombination systems that return charge to the battery electrodes (i.e., direct recombination and/or recombination with auxiliary electrodes connected to battery electrodes), any state-of-charge imbalance created by gas evolution reactions may be reversed, thereby returning balance to the states-of-charge of the electrodes and maintaining a desired capacity ratio between the electrodes. This is explained in more detail in the following paragraphs.

In some embodiments of a Nickel-Iron battery, the charging reactions are given by the equations:

Iron charging reaction: $Fe(OH): +2e^- \rightarrow Fe+2OH^-$

Nickel charging reaction: $Ni(OH)_2+OH^- \rightarrow NiOOH+H_2O+e^-$

The discharging reactions are the reverse of these. In various embodiments, other charging and/or discharging reactions may occur instead of or in addition to the above charging reactions. Whatever the exact reactions, the state-of-charge (SOC) of each electrode increases as a charging reaction for that electrode occurs, and decreases as a discharging reaction for that electrode occurs.

However, when a gas evolution reaction occurs on an electrode, a quantum of charge that would otherwise have increased the SOC of that electrode is instead diverted to the gas evolution reaction. If that same quantum of charge increases the SOC of the counter-electrode, then the electrodes become un-balanced by an SOC difference equal to the diverted quantum of charge. As gas evolution reactions continue over time, the magnitude of such an SOC imbalance may increase.

An SOC imbalance may be reversed in one of two ways. Either the SOC of the electrode on which the gas evolution reaction occurred may be increased by the quantum of charge diverted to gas generation, or the SOC of the counter-electrode may be decreased by that quantum of charge.

Conveniently, each molecule of gas that is evolved represents the exact quantum of charge diverted when evolving that gas molecule. Therefore, when that gas molecule is recombined at the counter-electrode (or an auxiliary electrode electrically connected to the counter-electrode), the recombination reaction will drive a discharge reaction in the counter-electrode equal to the quantum of charge represented by the gas molecule, thereby reversing the SOC imbalance caused by evolution of that gas molecule.

Even if the loss of sulfide compound(s) via electrochemical reduction is slowed as described above, the loss of sulfide to sulfite or sulfate may be inevitable due to dissolution of incorporated sulfide as well as any remaining electrochemical reduction. Some free sulfide ions in the electrolyte may be converted to other species before encountering any iron hydroxide even if "enough" iron hydroxide is generally available in the electrode. This means that over time, a nickel-iron battery may experience a net loss of sulfide compounds from the iron electrode unless a source of sulfide ions is provided to replace sulfide that is lost and consumed.

Replacing Consumed Sulfide

In some embodiments, the consumption of sulfide may be addressed by periodically adding a quantity of a make-up electrolyte solution containing dissolved sulfide (e.g., a solution containing an alkali sulfide such as sodium sulfide). Alternatively, an entire volume of electrolyte may be periodically replaced in order to restore a desired quantity of sulfide. However, both of these approaches may tend to cause the positive and negative electrode states-of-charge to be out of balance, eventually requiring a rebalancing procedure to return the electrode states-of-charge to a desired balance.

One might assume that providing a large quantity of soluble sulfide in the electrode or electrolyte would be adequate to replace any consumed sulfide. However, high concentrations of sulfide in the electrolyte may cause corrosion or other detrimental effects on the iron electrode, reducing its performance. In fact, the inventors have discovered that detrimental effects occur at dissolved sulfide concentrations far lower than previously understood.

Therefore, it is desirable to maintain an available quantity of sulfide in the electrolyte within an ideal "goldilocks" range of at least enough available sulfide for the iron electrode to operate efficiently and to replace that which is irretrievably consumed, but not so much dissolved sulfide that corrosion or other detrimental effects occur. The inventors have determined that the lower boundary of the desired sulfide concentration range may exist below the name-plate detection limit (e.g., approximately 1 µM) of conventionally available in-situ measurement techniques (e.g., the sulfide-selective electrode described above), and is therefore not necessarily accurately known. In some embodiments, the upper boundary of the desired sulfide concentration may also lie below the 1 µM detection limit.

The inventors have also determined that the minimum amount of sulfide required to efficiently operate an iron electrode (i.e., the lower boundary of the desired range) is greater than the solubility limits (in alkaline electrolyte) of highly insoluble metal sulfides such as CuS, $FeS_2$ (pyrite), and $Bi_2S_3$. On the other hand, the inventors have discovered that detrimental effects of sulfide are seen at concentrations lower than the next-least-soluble metal sulfides (e.g., ZnS, FeS, MnS). The inventors have further found an approximately three orders-of-magnitude gap between these "highly insoluble" metal sulfides and the next-least-soluble metal sulfides in alkaline electrolytes, at least among commonly available and environmentally safe metal sulfides. Some metal sulfides with solubility limits within the desirable range may exist and may be used (e.g., CdS may have a solubility limit within the desired range). However, in addition to maintaining a sulfide concentration within the desired range, it is also desirable to minimize (or preferably eliminate) the presence of environmentally unsafe heavy metals such as cadmium or lead within the battery.

The solubility limit of FeS in alkaline electrolyte has been measured to be approximately 3 mM ($3\times10^{-3}$ moles/L) at about 25° C. The solubility limit of ZnS in alkaline electrolyte has been measured to be as high as approximately 0.7 mM at about 25° C. Although the solubility limits of CuS, $FeS_2$, and $Bi_2S_3$ in alkaline electrolyte are not known exactly, they are believed to be less than 0.01 µM ($1\times10-8$ moles/L), possibly less than 0.001 µM at about 25° C.

Therefore, in some embodiments, it may be desirable to maintain a sulfide concentration in the electrolyte of at least a minimum concentration, but no more than a maximum concentration, at least at an average operating temperature (e.g., at or about "room temperature" between about 20° C.+/− and about 30° C., and possibly between about 0° C. and about 60° C.). The ideal range of sulfide concentration for a particular iron-electrode battery application may be determined empirically, and may depend on factors such as a desired range of coulombic efficiency of the battery, a desired range of voltaic efficiency of the battery, an intended operating temperature range of the battery, a desired separator material, a desired counter-electrode composition, or other aspects of the battery's construction or intended application.

In some embodiments, the maximum sulfide concentration may be maintained at less than a solubility limit of zinc sulfide or manganese sulfide, and the minimum sulfide concentration may be maintained at greater than a concentration of bismuth sulfide or copper sulfide. In some embodiments, the minimum maintained sulfide concentration may at least about 0.01 µM or at least about 0.1 µM. In some embodiments, the maximum sulfide concentration may be maintained at less than about 0.7 mM (700 µM), less than about 0.1 mM (100 µM), or less than about 1 µM.

In various embodiments, the minimum desired concentration of sulfide ions dissolved in the electrolyte may be at least about 0.01 µM, at least about 0.05 µM, at least about 0.1 µM, at least about 0.15 µM, at least about 0.2 µM, at least about 0.25 µM, at least about 0.3 µM, at least about 0.35 µM, at least about 0.4 µM, at least about 0.45 µM, at least about 0.5 µM, at least about 0.55 µM, at least about 0.6 µM, at least about 0.65 µM, at least about 0.7 µM, at least about 0.75 µM, at least about 0.8 µM, at least about 0.85 µM, at least about 0.9 µM, at least about 0.95 µM, or at least about 1 µM.

In various embodiments, the maximum desired concentration of sulfide ions dissolved in the electrolyte may be less than about 700 µM, less than about 650 µM, less than about 600 µM, less than about 550 µM, less than about 500 µM, less than about 450 µM, less than about 400 M, less than about 350 µM, less than about 300 µM, less than about 250 µM, less than about 200 µM, less than about 150 µM, less than about 100 µM, less than about 90 µM, less than about 80 µM, less than about 70 µM, less than about 60 µM, less than about 50 µM, less than about 40 M, less than about 30 µM, less than about 20 µM, less than about 10 µM, less than about 5 µM, less than about 1 µM, less than about 0.5 µM, less than about 0.1 µM, less than about 0.05 µM, or less than about 0.01 µM.

Therefore, simply providing a large supply of a sulfide source to replace consumed sulfide may be counter-productive unless the concentration of sulfide in solution at any given time can be maintained within the desired range. The inventors have developed two broad approaches to controlling the concentration of sulfide in the electrolyte at any given time.

The first approach, broadly referred to herein as the "kinetic" approach, involves slowing down the rate at which sulfide is released into the electrolyte so that, on average, sulfide is not released into the electrolyte appreciably faster than it is consumed. The second approach, broadly referred to herein as the "thermodynamic" approach involves achieving a thermodynamic equilibrium at which the concentration of sulfide is thermodynamically held approximately within a desired "goldilocks" range.

Kinetic Approaches to Controlling Sulfide Concentration

Various materials, structures, and methods may be used to control the rate or timing of delivery of sulfide into the electrolyte of an iron-electrode cell in order to replace sulfide that is irretrievably consumed in the cell. Some methods may involve the periodic, timed, or event-responsive release of sulfide. Other methods may involve treating or handling sulfide-source materials so as to slow down the rate of sulfide release into the electrolyte.

In order to further extend the usable life of a nickel-iron battery requiring minimal maintenance, a long-term reservoir of soluble sulfide may be provided in the battery. As used herein, the term "sulfide reservoir" may refer to a source of sulfide ions other than an "additive sulfide" and an "incorporated sulfide," both of which are located within and electrically connected to the iron negative electrode. "Reservoir sulfide" may be located outside of but electrically connected to the iron electrode, located inside of but electrically isolated from or disconnected from the iron electrode, or both located outside of and electrically disconnected from the iron electrode. Sulfide may generally be released from a sulfide reservoir into the electrolyte by chemical reactions, electrochemical reactions, phase change reactions, and/or controlled mechanical actions (e.g., movement of a servo, piston, relay, or other electromechanical devices), or combinations of these or other mechanisms.

In some embodiments, a closed-loop automatic control system may be configured to detect a condition or an event directly or indirectly suggesting a need for a sulfide addition to the electrolyte, and upon detecting the event or condition, delivering or releasing a quantity of a sulfide source from a sulfide reservoir into the electrolyte. For example, in some embodiments a sulfide detector (e.g., a sulfide ion-selective-electrode, an optical sulfide detector, or others) may be joined to an automatic controller configured to periodically or continuously detect a sulfide concentration in the electrolyte with the sulfide detector. In response to detecting a sulfide concentration below a threshold, the control system may activate an actuator device to deliver a sulfide-source material into the electrolyte. For example, the actuator may be a pump, syringe, or plunger configured to deliver a quantity of a solid or liquid sulfide-source material into the electrolyte, for example, which may be the same amount every time or a different amount.

In other embodiments, an automatic control system may be configured to detect one or more events that may be indicative of a need for sulfide in the electrode. For example, an electronic controller may be configured to monitor cell performance and to operate an actuator to deliver a sulfide-source material to the electrolyte in response to detecting low-sulfide event. Example low-sulfide events may include a drop in coulombic efficiency greater than a threshold change, a decrease in discharge rate capability greater than a threshold amount, a substantial period of over-charge (e.g., a fixed period of time, or a predetermined quantity of overcharge in coulombs), a change in electrolyte conductivity greater than a threshold amount, or other events.

In some embodiments, low-sulfide events may be "detected" chemically and/or electrochemically in such a way as to chemically or electrochemically trigger an automatic release of sulfide. In an embodiment, for example, the system is configured such that detection or characterization of a low-sulfide event is used as a triggering event resulting in an "automatic release" of sulfide, for example, using a active or passive system or method for releasing sulfide.

In various embodiments, an actuator may be configured to release or deliver a consistent quantity of sulfide each time the actuator is triggered, or the actuator may be configured to release or deliver a quantity of sulfide in proportion to a quantitative measure of a triggering event.

In some embodiments, a sulfide reservoir may be configured to release sulfide ions into the electrolyte at a slow rate in a location within the battery adjacent to the negative electrode such that a substantial portion of the released sulfide ions will reach the iron electrode to replace consumed sulfide. In some embodiments, a sulfide-source material for a sulfide reservoir may comprise one or more soluble metal sulfides such as iron sulfide (e.g., FeS, $FeS_2$, $Fe_2S_4$ or other iron sulfide compounds or combinations thereof), zinc sulfide, manganese sulfide, lead sulfide, nickel sulfide, tin sulfide, bismuth sulfide, copper sulfide (CuS, $Cu_2S$, or other copper sulfides), or cadmium sulfide, including any polymorphs of these, or combinations of these and/or other metal sulfides. In some embodiments, a sulfide-source material for a sulfide reservoir may include one or more sub-oxides of iron sulfide of the form $FeS_{1-x}O_x$. In some embodiments, preferred materials for a sulfide reservoir may comprise sparingly soluble metal sulfides, that is metal sulfides that release no more than 10 milli-moles of sulfide ions per liter of electrolyte at temperatures up to 70° C.

In some embodiments, a sulfide reservoir may be configured to have a slow rate of release of sulfide from the reservoir into the electrolyte. The rate of release of sulfide from a sulfide reservoir may be a rate of dissolution if the reservoir is a solid sulfide source that releases sulfide by dissolution, a rate of electrochemical reduction if the reservoir is configured to release sulfide ions by electrochemical reaction (e.g., by electrochemical reduction of a solid sulfide source electrically connected to the negative electrode), a rate of injection or release of a liquid sulfide source, and/or a rate of release and/or dissolution of a gaseous sulfur source (e.g., $SO_2$ or $H_2S$).

A rate of dissolution of a solid sulfide reservoir in aqueous alkaline battery electrolyte may be a function of surface area of the sulfide reservoir exposed to the electrolyte, dissolution kinetics of a sulfide-source material, diffusion kinetics and/or dissolution kinetics of a barrier surrounding a sulfide-source material, a temperature of the electrolyte, a solubility limit (saturation limit) of the sulfide reservoir material, and a rate at which sulfide is removed from the electrolyte solution by absorption at the negative electrode or by irretrievable conversion to sulfite or sulfate, among other factors.

In some embodiments, a sulfide reservoir may be a "slow-release sulfide reservoir" in that they are configured to deliver sulfide ions to the electrolyte at a rate slower than a natural rate of dissolution of the same sulfide-source material placed directly in the electrolyte. In other words, "slow-release" sulfide reservoirs may have a rate of release of sulfide ions less than a natural dissolution rate of the sulfide-source material contained in the reservoir. Some embodiments of slow-release sulfide reservoirs may include structures and materials selected to dissolve and/or otherwise release sulfide ions at predictably slow rates under conditions expected to be experienced by the battery in operation. In some embodiments, the rate of sulfide ion release can be approximately matched with a rate of sulfide consumption (e.g., conversion to sulfate by oxygen or the positive electrode), such that an instantaneous sulfide concentration in the electrolyte at any given time or an average sulfide concentration over a period of time may be maintained within a desired range.

In some embodiments, a sulfide-source material may be enclosed, surrounded, coated, or encapsulated within a barrier material selected to slow the rate of dissolution of a sulfide source by slowing or delaying electrolyte access to the sulfide-source material. In an embodiment, the terms enclosed, surrounded, coated, or encapsulated may be used interchangeably.

In some embodiments, particles of a sulfide-source material may be at least partially encapsulated in an encapsulation material that dissolves more slowly than the sulfide-source material. In various embodiments, an encapsulation material may be selected to electrically insulate an encapsulated sulfide-source material, to substantially increase an electrical resistance of an encapsulated sulfide-source material, or both. In general, it may be desirable for electrolyte to have at least minimal access to the encapsulated material, such as via imperfections (e.g., pinholes or gaps) in an encapsulation coating, or by degradation of the encapsulation material in the electrolyte over time. If a sulfide-source material is perfectly encapsulated in electrolyte-impermeable material that does not degrade in the electrolyte, then some other mechanism (e.g., mechanical abrasion, temperature changes, etc.) may be provided to allow the electrolyte to access and dissolve the sulfide-source material.

In various embodiments, encapsulation materials may include a metal oxide layer (e.g., bismuth oxide, copper oxide, aluminum oxide, zinc oxide, or other metal oxide), a silicon oxide or silicon dioxide layer, silicone, or a polymer layer such as polyvinyl alcohol, polyethylene, polypropylene, rubbers (e.g., styrene butadiene rubber or others), ethyl cellulose, methyl cellulose, latex, epoxide resins, polymethylpentene (PMP or TPX), polyethersulfones, sulfonated tetrafluoroethylene (e.g., NAFION), other fluoropolymer copolymers (e.g., ACIPLEX, FLEMION, DOWEW, FUMAPEM F), other ionomer materials, or others. In some embodiments, encapsulation materials may comprise one or more phase-change materials configured to undergo a phase change when an iron electrode experiences an elevated temperature for sufficient time to melt the phase-change material. Such phase-change materials may include a paraffin, polyethylene glycol, solid hydrate, or a sugar alcohol tuned to melt and/or dissolve in electrolyte at a threshold temperature. In some embodiments, an encapsulation material may comprise two or more layers and/or two or more of these or other materials.

In some embodiments, sulfide-source material particles may be at least partially coated or encapsulated using any of various spray coating processes, dip-coating processes, micro-encapsulation processes, or others. For example, the paper "Coating of Metal Powders with Polymers in Supercritical Carbon Dioxide" by Glebof et. al, published in the journal of Industrial & Engineering Chemistry Research in 2001 (DOI: 10.1021/ie0100939) describes processes for coating metal particles (e.g., Al and Mg) and non-metal materials (e.g., fused silica) with polymers, such as poly (vinylidene fluoride) and poly(4-vinylbiphenyl). U.S. Pat. No. 8,486,498 describes methods of coating metal powders with curable compositions of cyanoacrylates. U.S. Pat. Nos. 4,452,861, 5,328,522, 6,416,863, and 4,994,326 describe various methods of coating metal powders with polymers and other coating materials so as to protect the particles from chemical interactions prior to melting or otherwise removing the coatings. Any of such methods may be adapted for coating or encapsulating sulfide-source material particles as described herein.

In some embodiments, encapsulated sulfide-source material particles may then be included within an iron negative electrode. In some embodiments, a quantity (e.g., about 0.1% to 10% or more by weight of iron active material) of one or more sub-oxides of iron sulfide of the form $FeS_{1-x}O_x$ may be included within an iron electrode active material mix. Such sub-oxides may have a substantially slower dissolution rate than iron sulfides or other sulfide-source materials, and may therefore release sulfide more slowly within the iron electrode.

In some embodiments, a sulfide reservoir may be provided as a slowly-dissolving composite solid submerged in the electrolyte. A sulfide reservoir may be made to dissolve more slowly by producing a "pill" of low surface area such as a single large sphere or prismatic solid. In some embodiments, one or more slow-release sulfide "pills" may be submerged in the electrolyte or otherwise positioned within a battery container and joined to the electrolyte by an ionic pathway. Such a slow-release pill may comprise multiple alternating layers of a sulfide-source material and one or more layers of a slowly-dissolving encapsulation material such as those described above. In still other embodiments a slow-release pill may be added to a battery as part of a periodic maintenance procedure.

In some embodiments, the dissolution rate of slow-release pills or other encapsulated sulfide-source materials may be determined based on a material and/or a thickness of an encapsulation material layer or layers. In some embodiments, both relatively slowly-dissolving pills or encapsulated sulfide-source materials and faster-dissolving pills or encapsulated sulfide-source materials may be included within a battery container. For example, a battery container may contain one pill with one or more layers of an encapsulation material configured to dissolve and expose an encapsulated sulfide-source material within a period of between about one year and about five years. The same battery container may also contain a pill with an encapsulation material layer (or layers) configured to dissolve and expose the encapsulated sulfide-source material within a period of between about five years and ten years and/or a pill with an encapsulation material layer (or layers) configured to dissolve in about 10 years to 20 years or more.

In some embodiments, a sulfide-source material (encapsulated or not) may be retained within a shield structure configured to provide minimal fluid communication between the sulfide source and the electrolyte. In one example, an electrolyte source material may be contained within a small-diameter tube of electrolyte-impervious shield material (e.g., stainless steel or an alkaline-electrolyte impervious polymer). The interior diameter of the tube may be selected so as to minimize diffusion of electrolyte and sulfide ions therethrough. For example, such a tube may have an interior diameter of between about 0.1 mm and about 3 mm. Alternatively, a polymer may be extruded over a sulfide-source material formed into a shape of a wire. A sulfide-source-filled tube may be coiled or otherwise shaped so as to fit within a battery container. Such units may be structured and positioned within a battery container so as to be replaceable.

In some embodiments, a sulfide-source material may be contained within a shield material through which sulfide ions will very slowly diffuse. For example, a quantity of a sulfide-source material may be sealed into a bag of Nafion or other ion-selective separator material. Nafion is generally described as excluding transport of anions like sulfide, but a small amount of anion leakage still occurs. Therefore, the rate of sulfide ion transport out of a sealed Nafion bag will tend to be very slow. Other ion selective or microporous separator materials that may allow slightly faster rates of sulfide release may also be used to form bagged sulfide structures that may be placed within a battery container submerged in the electrolyte or otherwise positioned so as to release sulfide ions into the electrolyte.

In some embodiments, a sulfide-source material (encapsulated, bagged, or not) may be positioned in a headspace within a battery container and joined to the electrolyte by an ionic pathway such as those described herein with reference to auxiliary electrodes. In particular, an electrolyte-end of an ionic pathway such as a wicking structure, a tube, or other ionic pathway conduit may be positioned adjacent to a negative electrode (as shown for example by 222 in FIG. 8).

In some embodiments, a sulfide reservoir positioned within the headspace may be electrically connected to the negative electrode. In some particular embodiments, an oxygen reduction auxiliary electrode may be formulated to include a quantity of a sulfide-source material such as iron sulfide. A sulfide-containing auxiliary electrode may be positioned in the headspace and joined to the electrolyte by an ionic pathway. The limited rate of ion transfer via the ionic pathway may slow the rate of release of sulfide ions from the auxiliary electrode into electrolyte below the natural rate of dissolution of the iron sulfide if it were submerged directly in the electrolyte.

A sulfide-containing auxiliary electrode may be connected to a negative electrode by an electronic component such as a diode selected to limit the potential of the auxiliary electrode, thereby causing the sulfide reservoir material to also be exposed to a limited negative potential, thereby limiting electrochemical reduction of sulfide from such a sulfide-containing auxiliary electrode.

In some embodiments, a sulfide-source material may be positioned in contact with the electrolyte (e.g., submerged or joined by an ionic pathway) and electrically connected to the positive electrode via a combination of conductors and electronic components. While the sulfide source is held at a positive potential of the positive electrode, the sulfide will be protected from dissolution in the alkaline electrolyte. The electrical connection joining the sulfide source to the positive electrode may then be periodically opened, leaving the sulfide source exposed to dissolution in the electrolyte for a period of time. In some embodiments, the electrical connection may be opened by operating an electromechanical switch that may be operated by a battery charge controller or battery management system. Such a controller may be configured to open the switch on a pre-determined schedule, or based on operating characteristics of the battery, such as when a decrease in discharge capacity or discharge rate capability is detected. In some embodiments, the electrical connection may be periodically opened based on other factors, such as when the electrolyte temperature exceeds or falls below a pre-determined temperature. This may be achieved with a temperature-sensitive switch that opens when exposed to a particular temperature range, or with a controller and a temperature sensor. In still other embodiments, the electrical connection may include a low frequency electronic oscillator (e.g., a relaxation oscillator or a voltage-controlled oscillator) configured to intermittently expose the sulfide reservoir to zero or negative potentials at which the sulfide source may dissolve.

In some embodiments, a sulfide reservoir may be made in the form of a sheet of a sulfide-source material encapsulated or bound with a binder material. For example, an electrically conductive or non-conductive sheet of material may be made by blade-coating (or "tape-casting") a conductive or non-conductive substrate with a mixture of sulfide-source material particles and a binder and/or a plasticizer. Example binders may include polymers, alcohols (e.g., polyvinyl alcohol), rubbers (e.g., styrene butadiene rubber or others), ethyl cellulose, methyl cellulose, latex, epoxide resins, or any other encapsulating material as described herein.

In some embodiments, a layer of a sulfide-source material may be sandwiched between two (or more) insulative polymer layers and pressed and/or heated to form a non-conductive sulfide reservoir sheet. An electrically non-conductive sulfide reservoir sheet may advantageously release sulfide due to dissolution alone (i.e., without being electrochemically reduced).

In other embodiments, a conductive sulfide reservoir sheet may be formed from a sulfide-source material by hot-pressing, blade-coating, sintering, or other processes. A conductive sulfide reservoir sheet in contact with an iron electrode may advantageously release sulfide by both dissolution and electrochemical reduction.

A sulfide reservoir sheet may be placed between two layers of an iron-electrode or between two iron electrodes which may be electrically connected to a common current-collector and/or a common tab so as to act as a single electrode.

In some embodiments, sulfide-absorbing additives may be included within an iron electrode, which may assist by absorbing and re-releasing sulfide. Alternatively, sulfide absorbing additives may be included near or in a separator on a negative-electrode side of the separator. Such additives may include copper, copper hydroxide, cadmium, cadmium hydroxide, iron hydroxide, or others.

Thermodynamic Approaches to Controlling Sulfide Concentration

In further embodiments, systems and methods for controlling a sulfide concentration may rely on one or more thermodynamic mechanisms. In this context, "thermodynamic mechanisms" for controlling sulfide concentration refers to factors affecting the tendency of a sulfide-source material to dissolve in a liquid electrolyte. For example, in some embodiments, the electrolyte of a battery may contain an additive that depresses the effective solubility of the sulfide-source material below the solubility limit of the sulfide-source material in an identical electrolyte at the same temperature without the additive. One example of such an additive is described as a "counter-ion source material." Without wishing to be bound by any particular theory, it is believed that the use of a "counter-ion source material" to depress the concentration of sulfide in an electrolyte makes use of the thermodynamic mechanism known as the "common ion effect." However, other mechanisms may also be at work. Nonetheless, regardless of the ultimate correctness of any mechanistic explanation or hypothesis, embodiments of the systems and methods described below can nonetheless be operative and useful.

The common-ion effect is a consequence of the equilibrium interaction of ions in a saturated solution. A solution is "saturated" with a particular solute when no more of the solute will dissolve in the solvent (at a particular temperature). The concentration of the solute that can be dissolved in a saturated solution is a quantity referred to as the "solubility limit" which is determined by the "solubility product" of the solute in solution. The solubility product, typically denoted by the symbol "Ksp" is the product of the concentrations of the ions resulting from dissolution of a dissolvable solid (e.g., a salt). The solubility product of many specific solids in particular electrolyte solutions have been determined and are generally available in reference tables, and the solubility of any solid material in a particular electrolyte solution may be determined empirically.

Upon dissolving in a liquid, a solid solute will typically separate into two or more ions. The "solubility product" of a compound of the for AxBy is equal to the concentration of the first ion, ("A" in this explanation) to the exponent x, multiplied by the concentration of the second ion ("B") to the exponent y."). Stated in aqueous chemical notation (using brackets to denote "concentration of"):

$$K_{sp}=[A]^x*[B]^y$$

The common ion effect states that, because Ksp must be a constant (for a particular solvent at a particular temperature), if two solids containing the same ion are dissolved in the same solvent, the effective solubility of both solids will be controlled by the ion that is "common" to both solids.

For example, when sodium chloride (NaCl) dissolves in a solvent (e.g., water), a sodium cation ($Na^+$) and a chloride anion ($Cl^-$) are released. Therefore, the solubility product of sodium chloride (NaCl) is equal to the product of the sodium and chloride ions:

$$K_{sp}(NaCl)=[Na^+]*[C^-]$$

When copper chloride (CuCl) is dissolved, a copper cation ($Cu^+$) and a chloride anion ($Cl^-$) are released. Therefore, the solubility product of copper chloride (CuCl) is equal to the product of the potassium and chloride ions:

$$K_{sp}(CuCl)=[Cu^+]*[C^-]$$

Therefore, if both NaCl and CuCl are dissolved in the same solution, the amount of both solids that can dissolve will be limited by the concentration of the chloride ($Cl^-$) in solution. In a solution containing a substantial concentration of dissolved NaCl, the concentration of chloride will be determined by the quantity of NaCl that has dissolved. If solid CuCl is added to that solution, the amount of the solid CuCl that will dissolve will be limited by the existing concentration of chloride in solution because the product of [Cu+] and [Cl–] must remain constant (i.e., equal to the Ksp for CuCl). As a result, the concentration of the copper cation ($Cu^*$) in the solution will remain very low. The ability to control the depression of CuCl solubility by the addition of a particular quantity of dissolved NaCl is made simpler by the fact that the Ksp of NaCl is multiple orders of magnitude greater than the Ksp of CuCl, meaning that a very small amount of NaCl is needed to depress the concentration of dissolved copper ions in solution.

If the Ksp values of both solids in the solvent (e.g., electrolyte) are known, then a quantity of dissolved NaCl needed to depress solubility of CuCl to a specific concentration of copper ions may be calculated. If the Ksp values are not known for a particular solvent, such as for a complex electrolyte solution containing multiple other dissolved species, then a quantity of dissolved NaCl needed to depress solubility of CuCl to a specific concentration of copper ions may be determined empirically.

This same mechanism may be used to depress the concentration of sulfide ions ($S^{2-}$) in an electrolyte solution to a concentration substantially lower than the solubility limit (or "saturation limit") of a selected sparingly soluble solid sulfide compound. For example, a low sulfide concentration may be maintained by selecting a solid sparingly soluble sulfide compound, identifying the "counter-ion" other than sulfide that is released upon dissolving the sulfide compound, and identifying a second soluble compound (i.e., a "counter-ion source material") that releases the same counter-ion as the selected sparingly soluble sulfide compound.

As used herein, a "sparingly soluble" sulfide compound is a material with a solubility limit corresponding to release of no more than 10 mM ($1 \times 10^{-2}$ mol/L) of sulfide ions. The use of a sparingly soluble sulfide compound as a target for selecting a counter-ion material may beneficially allow for more granular control of a target depressed sulfide concentration in the electrolyte.

As used herein, the term "counter-ion" refers to any ion other than sulfide released into an electrolyte solution by dissolution of a selected sparingly soluble sulfide compound, whether or not the selected sparingly soluble sulfide compound is initially present as a solid in the cell. In the case of soluble metal sulfides, the counter-ion may typically be a metal cation. In some cases, a solid sparingly soluble sulfide-source material may release two or more counter-ions, any one of which may be a counter-ion for the purposes of identifying a counter-ion source material.

In some embodiments, the selected sparingly soluble sulfide compound may be the same sulfide-source material used as a sulfide additive in an electrode or a sulfide reservoir. Alternatively, the selected sparingly soluble sulfide compound may be a different metal sulfide or non-metal sulfide compound. In some embodiments, the selected sparingly soluble sulfide compound need not even be included in the electrode.

In one example, the selected sparingly soluble sulfide compound is zinc sulfide, but the sulfide additive included in an iron electrode is iron sulfide (which has a higher Ksp than zinc sulfide). In this case, the counter-ion is $Zn^{2+}$ as that is the counter-ion released upon dissolution of zinc sulfide. The presence of enough $Zn^{2+}$ in the electrolyte may tend to cause any sulfide ions in excess of the solubility product of [$Zn^{2+}$] and [$S^{2-}$] (e.g., from dissolved iron sulfide or other sulfide-source material with a solubility limit greater than ZnS) to precipitate out of solution as zinc sulfide. In this way, the effective concentration of dissolved sulfide ions from any sulfide-source material (solid or liquid) may be depressed by including a counter-ion that will produce the selected sparingly soluble sulfide compound.

Preferred counter-ion source materials may have much higher solubility limits (e.g., two, three, four, or more orders of magnitude greater) than a selected sparingly soluble sulfide compound as well as any sulfide compounds present in an iron electrode or in a sulfide reservoir. A quantity of the counter-ion source material may be dissolved in the electrolyte in sufficient quantity to depress the solubility of the sulfide-source to or below a desired sulfide concentration.

In a complex electrolyte, such as an alkaline solution containing a substantial quantity of hydroxide ions, a counter-ion may be in equilibrium balance with one or more ions formed by reaction with the hydroxide ions. For example, in the case of zinc sulfide, the immediate counter-ion is $Zn^{2+}$, which may spontaneously react with hydroxide ions to form $Zn(OH)_4^{2-}$ (zincate) The $Zn^{2+}$ ions and zincate ions may tend to achieve an equilibrium, maintaining a consistent (though not necessarily equal) concentration of each. The formation of such additional ionic species may also increase the solubility of some materials in alkaline solutions depending on the concentration of hydroxide and/or other dissolved species.

For simplicity of explanation, formation of such additional ionic species and equilibrium states will not be described for all electrolytes and solids. For at least these reasons, it may be difficult to predict or determine the Ksp value for a particular solid in a complex electrolyte solution. In such cases, empirical methods may be used to determine the quantity of a counter-ion source material needed to depress solubility of sulfide ions to a desired concentration. The relationship between concentration of various counter-ion source materials and resulting sulfide concentrations in a particular electrolyte may also be modeled based on theoretical and/or empirically-derived information.

For example, a known quantity of a counter-ion source material (or solution) may be added to an electrolyte solution, a sulfide-source material may be added to the solution and allowed to dissolve until it reaches its solubility limit (depressed by the counter-ion) and the concentration of sulfide may be measured, such as with a sulfide-selective electrode as described above. After performing such a method for several known quantities of the counter-ion source material, a model curve may be developed. In some embodiments, the model curve may be extrapolated to un-measured points, and the extrapolated curve may be used to estimate expected sulfide concentrations even below the detection limit of the sulfide-selective electrode or other technique(s) used to measure sulfide concentration. Alternatively, a known quantity of a counter-ion source (or solution) may be added to the electrolyte of an assembled battery, which may then be cycled to determine whether cycling performance (e.g., based on efficiency metrics, discharge rates, discharge capacities, etc.) is consistent with a desired concentration of sulfide for a desired period of time.

As described elsewhere herein, solid soluble sulfide-source materials may include various metal sulfides, such as bismuth sulfide, iron sulfide, iron disulfide, iron-copper sulfide, zinc sulfide, manganese sulfide, tin sulfide, copper sulfide, cadmium sulfide, silver sulfide, titanium disulfide, lead sulfide, molybdenum sulfide, nickel sulfide, antimony sulfide, including polymorphs of these. Solid soluble sulfide-source materials may also include one or more sub-oxides of a metal sulfide, or a solid solution of a metal sulfide and an oxide or hydroxide. Solid soluble sulfide-source materials may include minerals such as a sulfosalt mineral, which is a salt of a metal (e.g., Cu, Pb, Ag, Fe, Hg, Zn, V), a semi-metal (e.g., As, Sb, Bi, Ge) and sulfur. Example sulfosalts include Pyrargyrite $Ag_3SbS_3$ and Tennantite $Cu_{12}As_4S_{13}$ In some cases (e.g., depending on an electrolyte composition or other factors), a solid soluble sulfide source may include, non-metal sulfide compound, such as dimethylsulfide, carbon dislulfide, or others.

Some example sulfide-source materials and corresponding counter-ion source materials are shown below in Table 1 in no particular order.

ion need not necessarily be the same cation as that released by dissolution of a metal sulfide additive included in an as-made electrode or a sulfide-source material in a sulfide reservoir. Therefore, in many embodiments, various combinations of sulfide-source materials and counter-ion source materials having different cations may be used. For example, electrolyte-soluble hydroxides or oxides of metals such as Ni, Mn, Cu, Zn, Pb, Cd, Sn or others may be used as counter-ion source materials for depressing solubility of different metal sulfides such as FeS, NiS, ZnS, MnS, or others.

A counter-ion source material will generally release one or more additional ions or materials other than the selected sulfide counter-ion. In some embodiments, the counter-ion source material may be selected to release an ion that has minimal (or no) deleterious effects on any other battery components, such as a negative electrode, a positive electrode, a separator, an auxiliary electrode, an electrolyte, or other cell components. For example, counter-ion source materials may include oxides or hydroxides of a counter-ion metal. When dissolved, such oxides or hydroxides may simply produce water, hydroxide ions, dissolved oxygen, or other species. In some cases, a pure metal may be insoluble in an electrolyte but may nonetheless corrode into an oxide or hydroxide that may be more soluble.

A counter-ion source material (also referred to herein as a "counter-ion additive") may be included in an electrolyte by any method as desired. For example, a solid soluble counter-ion source material may be first dissolved in a separate liquid that may be mixed with an electrolyte, or a solid soluble counter-ion source material may be dissolved directly in an electrolyte solution. In still other examples, a solution containing a counter-ion may be synthesized directly as a liquid, such as by one or more electrochemical processes. In other embodiments, a soluble counter-ion source material may be incorporated into an as-made iron electrode as an additive (e.g., as a pore-former) which may dissolve after electrolyte is added to the battery.

In some embodiments, this technique can be used to produce an alkaline electrochemical cell comprising an iron electrode and a solid soluble sulfide-source (i.e., additive sulfide, incorporated sulfide, or reservoir sulfide), wherein the concentration of sulfide in the electrolyte is less than the

TABLE 1

Example Sulfide Compounds and Counter-ion Source Materials

| Sulfide-Source Material | Example Counter-Ion Source Materials |
| --- | --- |
| bismuth sulfide | bismuth oxide, bismuth hydroxide, bismuth metal |
| magnesium sulfide | magnesium oxide, magnesium hydroxide, magnesium metal |
| zinc sulfide | zinc oxide, zinc hydroxide, zinc metal |
| tin sulfide | tin oxide, tin hydroxide, tin metal |
| manganese sulfide | manganese oxide, manganese hydroxide, manganese metal |
| copper sulfide | copper oxide, copper hydroxide, copper metal |
| lead sulfide | lead oxide, lead hydroxide, lead metal |
| nickel sulfide | nickel oxide, nickel hydroxide, nickel metal |
| pyrargyrite (a sulfosalt mineral of $Ag_3SbS_3$) | silver oxide, silver hydroxide, silver metal, antimony oxide, antimony hydroxide, antimony metal |
| titanium disulfide | titanium oxide, titanium hydroxide, titanium metal |
| cadmium sulfide | cadmium oxide, cadmium hydroxide, cadmium metal |

The examples of sulfide-source materials and counter-ion source materials shown above in Table 1 are simplified in the sense that counter-ions for particular metal sulfide sources are shown as the metal cation(s) produced by dissociation of the metal sulfide. However, as described above, the counter-solubility limit of a solid electrolyte-soluble sulfide-source material present in the cell as either a sulfide additive or a sulfide reservoir. For example, in some embodiments, a sulfide concentration may be held below 90% of the solubility limit of the solid sulfide-source material in an electrolyte of the same composition without a counter-ion additive (and at the same temperature). In various other embodiments, a sulfide concentration may be held below 80%, 70%, 60%, 50%, 40%, 30%, 20%, 10%, 5%, 1%, 0.5%, 0.1%, 0.05%, or 0.01% or less of an undepressed solubility limit of the solid sulfide-source material under the same conditions.

In other examples, a battery may comprise an iron electrode, an electrolyte, and a solid electrolyte-soluble sulfide-source material, in the iron electrode as an additive, as incorporated sulfide, or otherwise in the electrolyte as a sulfide reservoir, that dissolves into sulfide and a first counter-ion, the electrolyte also containing a dissolved quantity of a second counter-ion (which may be the same as the first counter-ion contained in the soluble sulfide-source material or a different counter-ion as described above) in a concentration sufficient to hold the concentration of sulfide in the electrolyte below a predetermined concentration at a desired temperature. For example, such a battery may contain a counter-ion concentration sufficient to depress the concentration of sulfide below $1 \times 10^{-3}$ mol/L, $1 \times 10^{-4}$ mol/L, $1 \times 10^{-5}$ mol/L, $1 \times 10^{-6}$ mol/L, or $1 \times 10^{-7}$ mol/l at 25° C. In some embodiments, the iron electrode may be un-formed (that is, in a state prior to formation cycling) when the sulfide concentration is below the above-described thresholds. In some embodiments, however, system conditions are employed to provide for $[S^{2-}]<1$ µM.

In some embodiments, a battery may comprise an iron electrode, an electrolyte, and a solid electrolyte-soluble sulfide-source material (in the iron electrode as an additive, as incorporated sulfide or otherwise in the electrolyte as a sulfide reservoir), and further comprising an electrolyte additive selected to depress a solubility limit of the sulfide-source material. In various embodiments, the electrolyte additive (i.e., dissolved counter-ion material) may be present in a concentration of at least 1 mM, 2 mM, 3 mM, 4 mM, 5 mM, 6 mM, 7 mM, 8 mM, 9 mM, 10 mM, 20 mM, 30 mM, 40 mM, 50 mM, 60 mM, 70 mM, 80 mM, 90 mM, 100 mM, 110 mM, 120 mM, 130 mM, 140 mM, 150 mM, 160 mM, 170 mM, 180 mM, 190 mM, 200 mM, or more. In some embodiments, the electrolyte additive may comprise one or more of nickel oxide, nickel hydroxide, manganese oxide, manganese hydroxide, copper oxide, copper hydroxide, zinc oxide, zinc hydroxide, lead oxide, lead hydroxide, cadmium oxide, cadmium hydroxide, tin oxide, tin hydroxide, or oxides and/or hydroxides of other metals that form sparingly soluble metal sulfides. The above-described concentrations of dissolved counter-ion material may represent concentrations of dissolved metal species regardless of ionic oxidation state (e.g., an electrolyte may contain a concentration of dissolved ZnO in the range above, which may be present in the form of $Zn^{2+}$, zincate, or other ionic species).

In various embodiments, the battery electrolyte may have a sulfide concentration between a minimum sulfide concentration and a maximum concentration, wherein the minimum sulfide concentration in the electrolyte is at least about 0.01 µM, at least about 0.05 µM, at least about 0.1 µM, at least about 0.15 µM, at least about 0.2 µM, at least about 0.25 µM, at least about 0.3 µM, at least about 0.35 µM, at least about 0.4 µM, at least about 0.45 µM, at least about 0.5 µM, at least about 0.55 µM, at least about 0.6 µM, at least about 0.65 µM, at least about 0.7 µM, at least about 0.75 µM, at least about 0.8 µM, at least about 0.85 µM, at least about 0.9 µM, at least about 0.95 µM, or at least about 1 µM; and the maximum sulfide concentration is less than about 700 µM, no more than about 650 µM, no more than about 600 µM, no more than about 550 µM, no more than about 500 µM, no more than about 450 µM, no more than about 400 µM, no more than about 350 µM, no more than about 300 µM, no more than about 250 µM, no more than about 200 µM, no more than about 150 µM, no more than about 100 µM, no more than about 90 µM, no more than about 80 µM, no more than about 70 µM, no more than about 60 µM, no more than about 50 µM, no more than about 40 µM, no more than about 30 µM, no more than about 20 µM, no more than about 10 µM, no more than about 5 µM, no more than about 1 µM, no more than about 0.5 µM, no more than about 0.1 µM, no more than about 0.05 µM, or no more than about 0.01 µM. In some particular embodiments, the system is configured to provide a concentration of dissolved sulfide ions ($[S^{2-}]$) in a range of about 0.1 µM$\leq[S^{2-}]\leq$700 µM. In some embodiments, the system is configured to provide a concentration of dissolved sulfide ions ($[S^{2-}]$) in a range of about 0.1 µM$\leq[S^{2-}]\leq$300 µM.

Such a battery may also contain a concentration of a sulfide counter-ion that exceeds a concentration corresponding to the dissolved sulfide-source material. For example, even after partial dissolution of a sulfide-source material and consumption of some dissolved sulfide, the original quantity of the sulfide-source material may be determined by measuring a total sulfur content of the battery including sulfites and sulfates.

Thus in some embodiments, a battery may comprise an iron electrode, an electrolyte, and a solid electrolyte-soluble sulfide-source material (in the iron electrode as an additive, as incorporated sulfide and/or otherwise in the electrolyte as a sulfide reservoir), wherein the electrolyte contains a concentration of counter-ions capable of forming a solid sulfide compound with sulfide ions, and wherein a ratio of total moles of dissolved and solid counter-ions to total moles of solid and dissolved sulfur in the battery exceeds a stoichiometric ratio of counter-ions to sulfur in the sulfide-source material. In some embodiments, the sulfide-source material may be a metal sulfide other than iron sulfide and/or the counter-ion may be a metal other than iron.

Because the solubility limit of a sulfide-source material will tend to vary with temperature, a quantity of a counter-ion source material to be included in an electrolyte may be selected so as to depress solubility of sulfide to a desired degree at one or more operating temperatures, such as a minimum operating temperature, a maximum operating temperature, an average operating temperature, or any other desired design point. Therefore, any of the values above may be selected for a particular combination of sulfide-source material, counter-ion, counter-ion source material, and operating temperature. The relationship between concentration of various sulfide-source materials, counter-ion concentrations, and temperature of a particular electrolyte may be determined empirically and/or modeled based on theoretical and/or empirically-derived information.

In various embodiments, kinetic approaches can be combined with thermodynamic approaches. For example, the solubility limit of a soluble sulfide-source material in one or more of the various sulfide reservoirs described herein may be depressed by including a suitable counter-ion additive in the electrolyte.

Over time, consumption of sulfide (as described above) will decrease the concentration of sulfide in the electrolyte, thereby allowing more of the sulfide-source material to dissolve. Dissolution of additional sulfide-source material will release more of the counter-ion (in cases where the sulfide-source material is the same as the counter-ion material), which will further depress the solubility of the sulfide-source material. Therefore, it may still be desirable to limit the rete of dissolution of a solid sulfide-source material and/or a rate of consumption of sulfide by various methods as described herein.

In some embodiments, including a separator with a low diffusion coefficient may slow the rate at which sulfide is consumed at the positive electrode. Similarly, a separator that allows a minimum of oxygen bubbles to cross over the separator to interact with the negative electrode may further slow the rate of sulfide consumption. As described above, in various embodiments, a separator may be selected to have a diffusion coefficient of less than about $1\times10^{-6}$ cm$^2$/s.

Gas Recombination Devices

In some embodiments, a battery system may include one or more recombination devices configured to perform gas recombination in addition to or instead of relying on direct gas recombination on battery electrode active material.

In some embodiments, a recombination device may include a substrate supporting a catalyst. In some embodiments, a recombination device may be physically separated from a battery electrode such that a substrate of the recombination device is not in physical contact with and/or physically contiguous with a substrate supporting a battery electrode.

Figure 4:
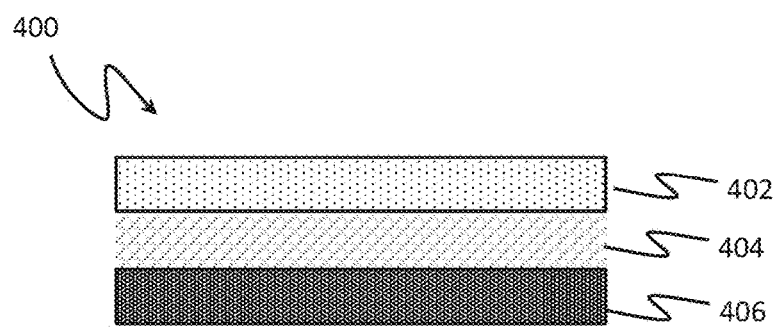
FIG. 4 is a schematic illustration showing a cross-section of a multi-layer structure that may be used as a recombination device or an auxiliary electrode.

FIG. 4 illustrates a cross-section of one example of a recombination device structure 400. The device 400 of FIG. 4 may include a hydrophobic gas diffusion layer 402 made of a hydrophobic material configured to allow gas to diffuse therethrough while substantially limiting or preventing liquid from passing through. The gas diffusion layer 402 may comprise expanded PTFE or other hydrophobic gas-diffusion materials. In some embodiments, the device may also include a current collector layer 404 made of an electrically conductive material such as a metal (e.g., nickel, copper, iron), coated metals (e.g., nickel-coated or nickel-plated steel) or inert material coated with a metal. In some embodiments, the device may include a catalyst layer 406 made of a conductive material (e.g., carbon, graphite, a metal or a metal-coated non-metal) on which a catalyst may be coated. In some embodiments, the current collector layer and catalyst layer may be combined into a single layer. In some embodiments, the layers of a recombination device may be adhered or compressed together so as to form a unitary structure.

In various embodiments, porous substrates may be advantageous in providing a large surface area on which reactions may occur. In some embodiments, an electrically conductive substrate material may be desired, while in other embodiments a non-conductive substrate may be used. Examples of conductive substrates may include graphite, woven or non-woven carbon felt, carbon fiber structures, ordered carbon structures such as graphene and other allotropes of carbon or other carbon-based structures capable of supporting a catalyst.

In some embodiments, solid, porous, fibrous, or other metal structures may be used as conductive substrates for recombination devices. For example, recombination devices may include one or more catalysts coated onto metal foam, metal mesh, metal sheets, metal foils, or sintered structures. In some cases, a substrate of one metal may be coated with a different metal to improve conductivity or to reduce undesired reactivity. Substrate metals may include nickel, iron, steel, copper, silver, nickel ferrite, cobalt ferrite, spinel-coated materials, or others.

In some embodiments, a substrate material supporting a recombination catalyst may also support a battery electrode active material. For example, in some embodiments a first region of a conductive substrate may be coated with a battery active material mixture, and a second region of the same substrate may be coated with a gas recombination catalyst. In various embodiments, the first and second regions may be overlapping or non-overlapping.

In other embodiments, a recombination device substrate may include a non-conductive material such as a polymer, ceramic, or composite material coated with a conductive metal to produce a conductive substrate with a non-conductive core. Such conductive metals may be coated onto non-conductive materials by electrodeposition, spraying, dipping, mechanical compression, or other processes.

In various embodiments, one or more catalysts may be coated onto a substrate by various processes such as electrodeposition, galvanic deposition, spraying, dipping, sintering, mechanical compression, electroless plating, sputtering, vapor deposition, hydrothermal synthesis, or other processes resulting in at least a portion of a substrate surface area carrying the catalyst material. In some embodiments, suitable processes used to apply a catalyst to a substrate may be chosen based on characteristics of the substrate and/or catalyst(s) selected. Examples of specific catalysts are described below.

For a gas to react on a recombination device, the gas must reach the recombination device via some gas pathway. Gas generated at an electrode may be dissolved into the electrolyte and may then move through the electrolyte by diffusion Generated gas may also form bubbles which may move through the electrolyte by buoyancy or other forces. Once gas bubbles float to the top of the electrolyte, the gas will tend to be released from the electrolyte into the gas headspace above the electrolyte level in the battery container.

Therefore, in some cases, creating a gas pathway may simply involve providing a recombination device with access to the headspace above the electrolyte level, either by placing at least a portion of the recombination device directly in the headspace or joining the recombination device with the headspace by a gas-transfer conduit. In various embodiments, a gas-transfer conduit may comprise various hollow structures such as tubing, hoses, pipe or channels, hydrophobic structures or other structures through which gas may flow. In other cases, gas pathways may be formed on or in objects below the electrolyte surface with hydrophobic materials or hollow conduits allowing gas within the electrolyte or the headspace to travel to a desired location below the electrolyte surface. In various embodiments, gas pathways may be formed with hydrophobic materials or hollow conduits providing gas communication from the headspace to locations below the electrolyte level.

In addition to a gas pathway, some recombination devices may also utilize electrical connections to other elements of a battery such as one or more battery electrodes, a battery container, a current collector, or other battery structures. A recombination device may be optimally configured for one or more desired chemical or electrochemical reactions. For example, recombination device structures, connections, or chemical compositions may be configured with a preference for one or more reactions. Additionally, electrical connections between the recombination device and other battery elements may be configured with a preference for one or more reactions. Similarly, ionic connections between the recombination device, the electrolyte, the battery electrodes, or other battery elements may be configured with a preference for one or more reactions.

Ionic connections (also referred to herein as "ionic pathways") may include any pathway, conduit, or medium through which ions may be exchanged between a recombination device and one or more other elements of a battery (e.g., electrolyte and/or a battery electrode). In some embodiments, a recombination device may be ionically connected to the electrolyte and/or a battery electrode by an ionically conductive path. For example, a recombination device may be in ionic communication with the electrolyte by a fluidic/ionic pathway through which ions may be conducted. In some embodiments, a recombination device may be secured at a fixed point above the electrolyte level within the battery container. In such embodiments, an ionic pathway may be a wicking structure such as one or more capillary tubes, a section of a hydrophilic wicking material (e.g., a hydrophilic separator material as described herein), a submerged section of a recombination device substrate, or other wicking structures. In other embodiments, an ionic pathway may comprise one or more conduits (e.g., tubes, pipes, hoses, channels, or other hollow structures) through which electrolyte may flow under the force of a pump, gravity, thermal siphon, diffusion, or other driving force.

Figure 5:
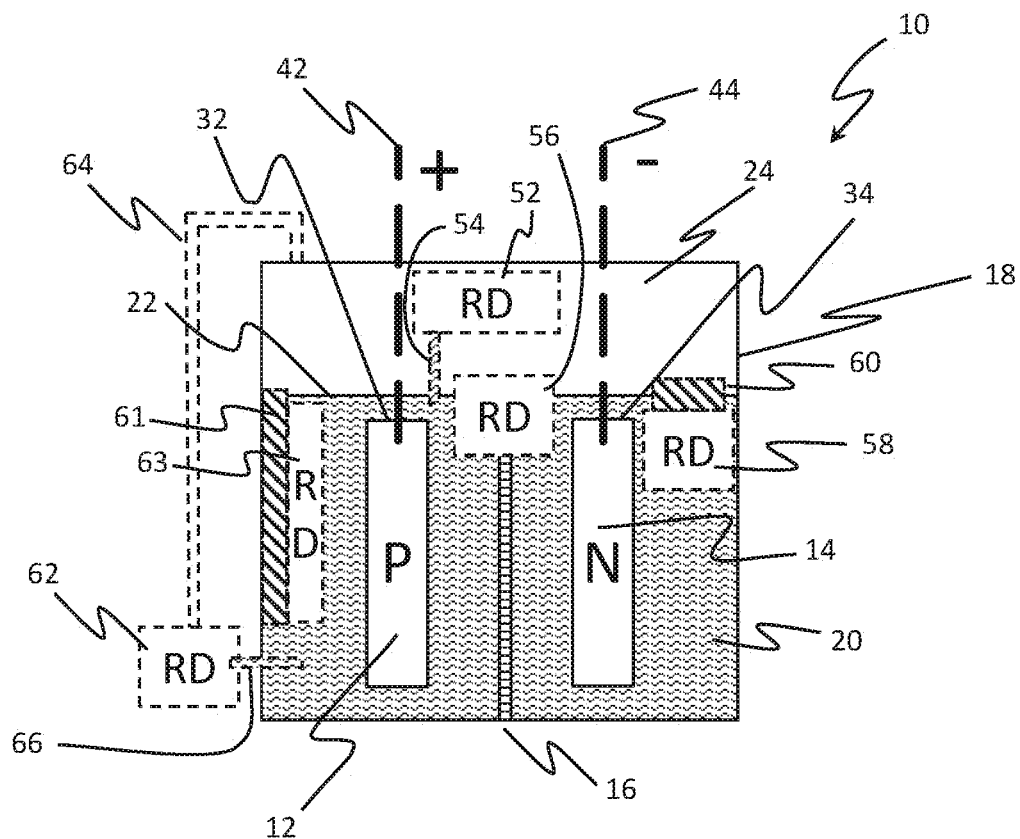
FIG. 5 is a schematic illustration of a battery showing various alternate positions of a recombination device.

FIG. 5 illustrates a battery system 10 comprising a battery container 18 containing an electrolyte 20, a positive electrode 12, a negative electrode 14, and a separator 16. FIG. 5 also illustrates multiple possible positions for a recombination device within or relative to the battery container. A recombination device in any of the illustrated positions may be configured to support one or more of oxygen reduction reactions, hydrogen oxidation reactions, hydrogen/oxygen combustion, or other reactions.

FIG. 5 illustrates multiple alternative locations inside and outside of the battery container 18 at which a recombination device may be located, along with corresponding ionic pathways and gas pathways (electronic connections are omitted in FIG. 5 for simplicity, but may include any of the electrical connection configurations described herein). For example, recombination device 52 is shown positioned entirely in a head-space 24 above the electrolyte level 22 with an ionic connection 54 to the electrolyte 20.

Another example embodiment is represented by recombination device 56 positioned such that a portion of the recombination device 56 extends below the electrolyte level 22 in order to provide an ionically conductive path. In such an arrangement, an upper portion of the recombination device 56 extending into a headspace 24 may provide a gas pathway.

In some embodiments, the recombination device 56 may be rigidly secured to the battery container 18 (or another structure) at a fixed position relative to the electrolyte level 22. In other embodiments, the recombination device 56 may be configured with a buoyant element sized to cause the recombination device 56 to float on the electrolyte surface 22, thereby providing consistent access to both the gas headspace 24 and the liquid electrolyte 20 even if the electrolyte level 22 changes relative to the battery container 18 due to the conversion of electrolyte volume to gas, due to tipping the battery container, or other changes in the electrolyte level.

In some embodiments, a recombination device may be positioned entirely below the electrolyte level. FIG. 5 shows recombination device 58 submerged below the electrolyte level 22 and including a gas pathway element 60. The gas pathway element 60 may include a hollow conduit such as one or more tubes or a hydrophobic element such as a sheet of a hydrophobic material such as polytetrafluoroethylene (PTFE) or other hydrophobic material. An alternative submerged recombination device 63 may extend longitudinally in the depth direction of the electrolyte. Such a recombination device 63 may include a gas pathway element 61 extending alongside the recombination device and providing a gas pathway to a side of the recombination device. In some embodiments a recombination device 63 may be formed as layers of gas pathway material and auxiliary active materials deposited on an interior wall of the battery container. Alternatively or in addition, a recombination device 63 may be positioned at a center of a cylindrically-wound electrode stack in a cylindrical battery.

FIG. 5 also shows recombination device 62 positioned outside of the battery container 18. The recombination device 62 is joined to the headspace 24 by a gas pathway conduit 64 extending between the recombination device 62 and the headspace 24 of the battery container 18. Gas may travel through the gas pathway conduit 64 by diffusion or other motive force. The recombination device 62 may be ionically connected to the battery 10 by an electrolyte conduit 66 extending between the recombination device 62 and the electrolyte 22 within the battery container 18. In various embodiments, gas pathway conduits and ionic pathway (electrolyte) conduits may comprise any structures described herein, such as hollow tubes, pipes, hoses, channels, conduits, hydrophobic or hydrophilic elements (respectively), or other structures.

Recombination devices may also be located in a battery based on a position relative to a battery electrode. For example, a recombination device may be pressed, welded, or otherwise attached to a portion of a battery electrode such as at a top, bottom, side, or back surface. In some embodiments, a recombination device may be separated from a battery electrode by a layer of ion permeable separator material or by a layer of an ion-impermeable material. In some embodiments, a recombination device may be formed as part of a battery electrode structure. In other embodiments, a recombination device may be welded or otherwise mechanically and electrically joined to a battery electrode such as by mechanical fasteners, clamping pressure, press-fitting, compression joining, or other methods. In some embodiments, a recombination device may be sandwiched between two or more battery electrodes and may be separated from one or both by one or more ion-permeable or ion-impermeable separators.

Auxiliary Electrodes

An "auxiliary electrode" is generally a recombination device configured primarily for supporting electrochemical gas recombination reactions. An auxiliary electrode may typically be electrically connected (or connect-able) to a battery electrode or other structure or element imparting an electric potential to the auxiliary electrode. An auxiliary electrode may be connected to a battery electrode by an electrical conductor, which may include any combination of wires, printed circuit board traces, flex connectors, electronic components (e.g., resistors, diodes, switches, capacitors, etc.), or other components capable of completing an electrical connection between the auxiliary electrode and the battery electrode or otherwise imparting an electric potential on the auxiliary electrode.

FIG. 5 illustrates a battery system 100 with an auxiliary electrode 110 electrically connected to a positive battery electrode 12 and ionically connected to the electrolyte 20 by an ionic pathway 120 and directly exposed to the headspace 24. Electrically connecting the auxiliary electrode 110 to the positive battery electrode 12 will expose the auxiliary electrode 110 to the positive electric potential of the positive electrode 12, which will vary depending on the state-of-charge and active material(s) of the positive electrode. For example, during normal operation a nickel positive electrode may typically be cycled between a half-cell voltage of about 0.1 V and about 0.6 V (depending on the oxygen evolution potential of a particular nickel electrode composition and operating temperature).

In some embodiments, an auxiliary electrode 110 connected to the positive electrode 12 may advantageously be provided with an electrocatalyst for hydrogen gas oxidation at or below the potential of the positive electrode 12. In operation, such an auxiliary electrode 110 may oxidize hydrogen gas as the gas reaches the electrocatalyst surface. Soluble species produced by the hydrogen oxidation reaction may be returned to the electrolyte via the ionic connection 112. In various embodiments, the auxiliary electrode 110 may be located in any of the positions discussed above with reference to FIG. 5 or any other suitable position and may include any of the structures described herein for providing ionic and gas pathways.

If the potential applied to the positive electrode while charging the battery is sufficiently large, then an auxiliary electrode 110 connected to the positive battery electrode 12 may undesirably generate oxygen while the battery is charged and/or while standing at open circuit potential. In order to limit or prevent such oxygen generation at the auxiliary electrode 110 during charging, the electrical connection 114 between the positive electrode 12 and the auxiliary electrode 110 may be made via an electronic component 120 configured to hold the auxiliary electrode 110 to an electric potential below the oxygen-generating potential for the electrocatalyst present on the auxiliary electrode 110 surface.

In some embodiments, an electronic component 120 may be configured to prevent unwanted electric current flow between the auxiliary electrode 110 and the positive electrode 12. For example, it may be desirable to limit or prevent current flow between a battery electrode and an auxiliary electrode when such current would tend to cause a gas evolution reaction at an auxiliary electrode. Electronic components 120 suitable for such purposes may include resistors, transistors, diodes, semiconductor devices, rectifiers, switches, or other electrical, electronic, or electromechanical devices.

In some embodiments, an electronic component 120 between an auxiliary electrode 110 and a positive electrode 12 may be configured to make the electric potential of the auxiliary electrode 110 less positive than the positive battery electrode at least during battery charging. In some embodiments, an electronic component 120 between an auxiliary electrode 110 and a positive electrode 12 may also make the electric potential of the auxiliary electrode 110 less positive than the positive battery electrode during discharging or when the battery 100 is at open-circuit.

In other embodiments, an electronic component 120 may be configured to open the circuit between the auxiliary electrode 120 and the positive electrode 12 during charging. For example, in some embodiments, the electronic component 120 may include a switch or a relay which may be controlled by a battery management system or other controller to prevent current flow between the positive electrode 12 and the auxiliary electrode 110 during charging of the battery. In some embodiments, an auxiliary electrode current may be monitored during various stages of battery operation. Higher auxiliary electrode currents may indicate a rate of gas recombination and/or gas generation at the auxiliary electrode. Based on such information, a switch between the auxiliary electrode and the positive electrode may be opened or closed in order to prevent unwanted gas generation.

In other embodiments, an electronic component 120 may be configured to prevent or limit current flow in one or both directions. For example, in some embodiments, the electronic component 120 may include a diode (e.g., a Schottky diode, silicon diode, or others) configured to prevent current flow from the auxiliary electrode 110 to the positive electrode 12 but allow current flow from the positive electrode 12 to the auxiliary electrode 110 (where a direction of current flow is opposite the flow of electrons). In other embodiments, a resistor may be used to limit current flowing in both directions. In further embodiments, combinations of two or more electronic components 120 may be used. For example, in some embodiments a diode may be used to substantially prevent current flow from the positive electrode 12 to the auxiliary electrode 110 and a resistor may be used to limit current flow from the auxiliary electrode 110 to the positive electrode 12. In further embodiments, an electronic component 120 may include an integrated circuit configured to prevent the flow of unwanted currents.

In some embodiments, one or more electrical components, such as diodes, switches, or other components, may be used to prevent an auxiliary electrode electrically connected to the positive electrode from decreasing the potential of the positive electrode to potentials at which damage to the electrode may occur. For example, many nickel positive electrodes contain cobalt compounds included to enhance conductivity of the electrode. Such cobalt compounds may be most effective when in a particular form (e.g., cobalt oxyhydroxide). If the potential of any portion of a nickel positive electrode falls below 0 volts (vs MMO), the beneficial cobalt compounds may be reduced, which may cause temporary or permanent damage to the nickel electrode. At the same time, an iron negative electrode may produce substantial quantities of hydrogen gas even at an apparent "bottom-of-charge" state (i.e., at an SOC of 0%). If excess hydrogen is oxidized on an auxiliary electrode connected to a nickel electrode at or near 0% SOC, the potential of the nickel electrode may be pulled low enough to reduce the cobalt and damage the electrode.

Therefore, in some embodiments, one or more electrical components, such as diodes, switches, or other components, may be used to stop current flow between an auxiliary hydrogen oxidation electrode and a positive nickel electrode when the potential of the positive electrode falls below a threshold half-cell voltage. In some embodiments, the threshold positive half-cell voltage may be about 0.01 V, 0.02 V, 0.03 V, 0.04 V, 0.05V, 0.06 V, 0.07 V, 0.08 V, 0.09 V, or 0.1 V.

In some embodiments, a nickel electrode connected to an auxiliary hydrogen oxidation electrode may be protected from undesirably low potentials by connecting the auxiliary electrode to the nickel electrode via an electronic component that will prevent current flow between the positive electrode and the auxiliary electrode if the potential between them is less than an absolute value sum of the hydrogen oxidation potential and the threshold voltage specified above. Thus, for example, if the hydrogen oxidation potential is taken to be −0.928 V vs MMO and a desired threshold is 0.05 V, then in order to protect the nickel electrode, the electronic component may prevent current flow if the potential difference across the electronic component is less than 0.978 V. In some embodiments, the electronic components may be one or more diodes with a forward-pass voltage approximately equal to the absolute value sum of the hydrogen oxidation potential and the threshold minimum nickel half-cell voltage. Alternatively, the electronic component may be a switch or a combination of components arranged to achieve substantially the same result.

In other embodiments, it may be similarly desirable to prevent a potential of a negative electrode from becoming too positive as a result of oxygen reduction reactions occurring at an oxygen reduction auxiliary electrode. In such embodiments, an electrical component connecting the oxygen reduction auxiliary electrode to the negative electrode may be configured to prevent the negative electrode from reaching a potential more positive than about −0.1 V.

Figure 7:
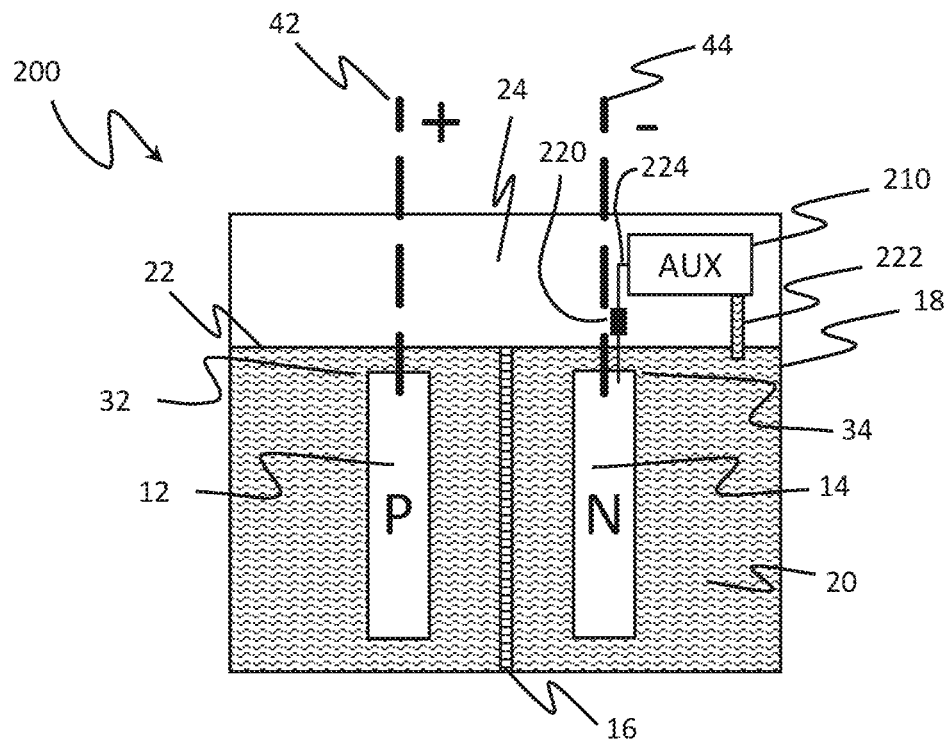
FIG. 7 is a schematic illustration of a battery including an auxiliary electrode connected to a negative battery electrode.

FIG. 7 illustrates a battery system 200 with an auxiliary electrode 210 electrically connected to a negative battery electrode 14 via a conductor 224 and an electronic component 220. Electrically connecting the auxiliary electrode 210 to the negative battery electrode 14 will expose the auxiliary electrode 210 to the electric potential of the negative electrode 14, which will vary depending on the active material and state-of-charge of the negative electrode.

The auxiliary electrode 210 is also shown ionically connected to the electrolyte via a wicking ionic pathway 222, however any other ionic pathway may also be used as described herein. In some embodiments, an auxiliary electrode 210 connected to the negative electrode may advantageously be provided with an electrocatalyst for oxygen gas reduction at or above (i.e., less negative than) the potential of the negative electrode 14. In operation, such an auxiliary electrode 210 may reduce oxygen gas as the gas reaches the electrocatalyst surface.

An oxygen reduction auxiliary electrode connected to the negative electrode will tend to depolarize the negative electrode while oxygen gas is being reduced, making the negative electrode's potential less negative during time periods when oxygen gas is present to be reduced. Oxygen gas tends to be produced by a nickel hydroxide positive electrode when the positive electrode is at a high state-of-charge. Therefore, oxygen will tend to be produced during the same stages of operation when the presence of oxygen to be reduced by an oxygen auxiliary electrode is most beneficial to retaining sulfide in a negative iron electrode. As a result, a nickel-iron battery enjoys unique benefits from the use of an oxygen reduction auxiliary electrode connected to an iron negative electrode.

If the potential applied to the negative electrode 14 while charging the battery is sufficiently negative, then an auxiliary electrode 210 connected to the negative battery electrode 14 may undesirably generate hydrogen while the charging current is applied. In order to limit or prevent such hydrogen generation at the auxiliary electrode 210 during charging, the electrical connection between the negative electrode 14 and the auxiliary electrode 210 may be made via an electronic component 220 configured to hold the auxiliary electrode 210 to an electric potential less negative than the hydrogen-generating potential for the electrocatalyst present on the auxiliary electrode 210 surface. Alternatively, an electronic component 220 may be configured to prevent unwanted electric current flow between the auxiliary electrode 210 and the negative electrode 14. Electronic components 220 suitable for such purposes may include resistors, diodes, transistors, semiconductor devices, rectifiers, switches, or other electrical, electronic, or electromechanical devices.

In some embodiments, an electronic component 220 between an auxiliary electrode 210 and a negative electrode 14 may be configured to make the electric potential of the auxiliary electrode 210 less negative than the potential of the negative electrode at least during battery charging. In some embodiments, an electronic component 220 between an auxiliary electrode 210 and a negative electrode 14 may also make the electric potential of the auxiliary electrode 210 less negative than the potential of the negative electrode during discharging or when the battery is at open-circuit.

In other embodiments, an electronic component 220 may be configured to open the circuit between the auxiliary electrode 210 and the negative electrode during charging. For example, in some embodiments, the electronic component 220 may include a switch or a relay which may be controlled by a battery management system or other controller to prevent current flow between the negative electrode 14 and the auxiliary electrode 210 during charging of the battery. In some embodiments, an auxiliary electrode current may be monitored during various stages of battery operation. Higher auxiliary electrode currents may indicate a rate of gas recombination and/or gas generation at the auxiliary electrode. Based on such information, a switch between the auxiliary electrode and the negative electrode may be opened or closed in order to prevent unwanted gas generation.

In other embodiments, an electronic component 220 may be configured to prevent or limit current flow in one or both directions. For example, in some embodiments, the electronic component 220 may include a diode (e.g., a Schottky diode, silicon diode, or others) configured to allow current to flow from the auxiliary electrode 210 to the negative electrode 14 but prevent current from flowing from the negative electrode 14 to the auxiliary electrode 210 (where the direction of current flow is opposite the direction of electron flow). In other embodiments, a resistor may be used to limit current flowing in both directions. In further embodiments, combinations of two or more electronic components 220 may be used. In further embodiments, an electronic component 220 may include an integrated circuit configured to prevent the flow of unwanted currents.

Figure 6:
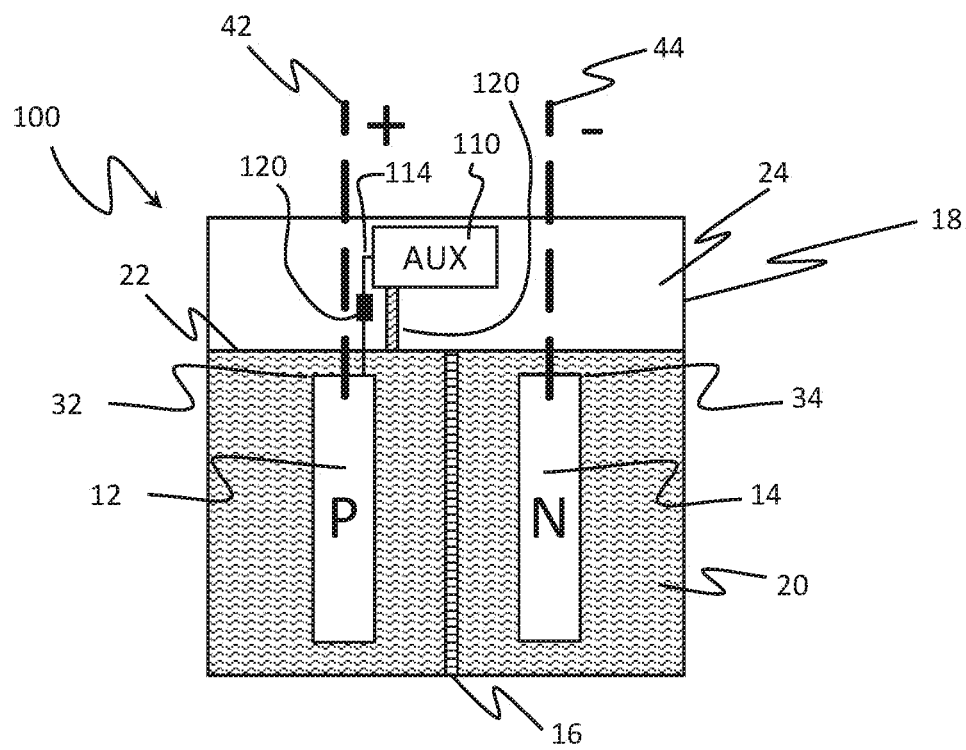
FIG. 6 is a schematic illustration of a battery including an auxiliary electrode connected to a positive battery electrode.
Figure 8:
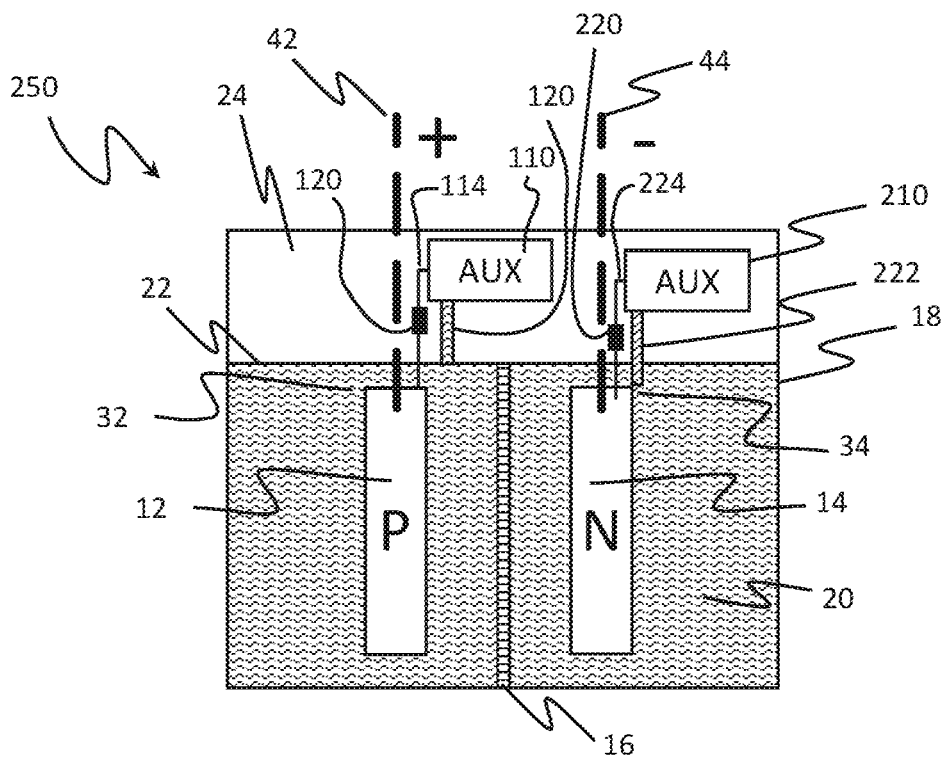
FIG. 8 is a schematic illustration of a battery including a first auxiliary electrode connected to a positive battery electrode and a second auxiliary electrode connected to a negative battery electrode.

As illustrated in FIG. 8, some embodiments of a battery system may be configured with both a first auxiliary electrode 110 connected to a positive electrode 12 as described with reference to FIG. 6 and a second auxiliary electrode 210 connected to a negative electrode 14 as described with reference to FIG. 7. In operation, such a system may be well-suited to independently recombining hydrogen with the first auxiliary electrode 110 and oxygen with the second auxiliary electrode 210.

Figure 9:
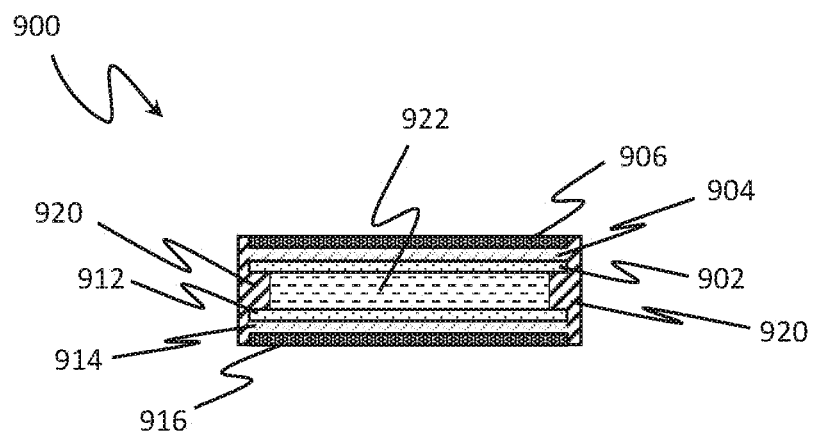
FIG. 9 is a schematic illustration of a transverse cross-section of a dual auxiliary electrode structure.
Figure 10:
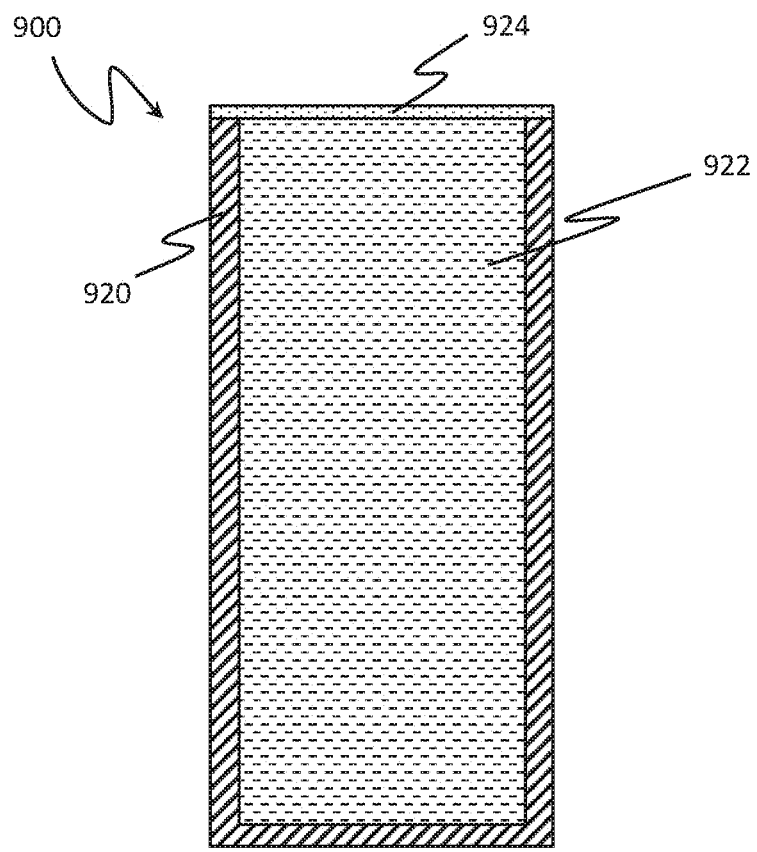
FIG. 10 is a schematic illustration of a longitudinal cross-section of a dual auxiliary electrode structure.

In some embodiments, when a battery contains two auxiliary electrodes, one connected to each battery electrode, the two auxiliary electrodes may be configured to share gas pathway and/or ionic pathway structures. FIG. 9 and FIG. 10 illustrate one example of a dual auxiliary electrode structure with a common gas pathway.

FIG. 9 illustrates a transverse cross-section of a dual auxiliary electrode device 900 comprising a first auxiliary electrode stack having a gas-diffusion layer 902, a current collector layer 904 and a catalyst layer 906 and a second auxiliary electrode stack having a gas-diffusion layer 912, a current collector layer 914 and a catalyst layer 916. The first and second auxiliary electrode stacks may be arranged such that their gas diffusion layers are nearest each other, and a space between may be filled with a gas pathway structure 922. The gas pathway structure may be any of the gas pathway structures described herein, such as an open conduit, a hydrophobic element, or other structure.

In some embodiments, the first and second auxiliary electrode stacks may be surrounded by a sealing structure 920. The sealing structure may be an electrolyte-impervious material such as a polymer that may be over-molded, adhered, welded, or otherwise integrally sealed with the auxiliary electrode stack edges so as to prevent leakage of electrolyte into the gas pathway in between the auxiliary electrode stacks. As shown in the longitudinal cross-section of FIG. 10, the sealing structure may surround the dual auxiliary electrode structure on three sides (e.g., vertical sides and bottom).

In some embodiments, the catalyst layers 906 and 916 may be exposed, allowing the dual auxiliary electrode structure 900 to be submerged in the electrolyte, leaving a top cap portion 924 exposed to the headspace in the battery container. In some embodiments, the cap portion 924 may be covered with a gas pathway structure such as a hydrophobic element.

In alternative embodiments, the dual auxiliary electrode structure 900 may be configured to be positioned in the headspace and joined to the electrolyte by an ionic pathway. For example, hydrophilic wicking elements, electrolyte conduits, or other ionic pathway structures may be secured to the catalyst layers 906, 916 allowing electrolyte to communicate ions between the electrolyte and each of the auxiliary electrode stacks.

Alternatively, the auxiliary electrode stacks may be reversed such that the gas diffusion layers 912 are positioned on the outside of the stacks and therefore on the outside of the structure, while the central space 922 may be filled with electrolyte and/or an ionic pathway structure Such a structure may be placed in a headspace, allowing the exposed gas diffusion layers access to gas in the headspace and joining the central space 922 to the electrolyte by an ionic pathway structure. In other embodiments, such a structure may be submerged in the electrolyte. Hydrophobic or other gas pathway elements may be provided to allow each of the gas diffusion layers to access gas in the headspace.

As used herein, a gas recombination auxiliary electrode's "specific activity" is a measure of the mole quantity of gas that may be recombined (hydrogen oxidized, or oxygen reduced) per unit of time (e.g., moles per second). This metric may be affected by multiple factors such as a catalytic activity of a catalyst carried on the auxiliary electrode, a quantity of the catalyst and possibly physical dimensions of the auxiliary electrode.

In some embodiments, in a battery with both an auxiliary oxygen reduction electrode and an auxiliary hydrogen oxidation electrode, the auxiliary oxygen reduction electrode may have a smaller specific activity than the hydrogen oxidation electrode if the battery is configured to allow for substantial direct oxygen reduction on the battery's negative electrode. In other words, an auxiliary electrode specific activity ratio (i.e., a ratio of the specific activity of an auxiliary oxygen electrode to the specific activity of an auxiliary hydrogen electrode) may be less than 100%. In various embodiments, the auxiliary electrode specific activity ratio may be less than about 95%, less than about 90%, less than about 80%, less than about 70%, less than about 60%, less than about 50%, less than about 40%, less than about 30%, less than about 20%, less than about 10%, less than about 5%, or less than about 1%.

Figure 11:
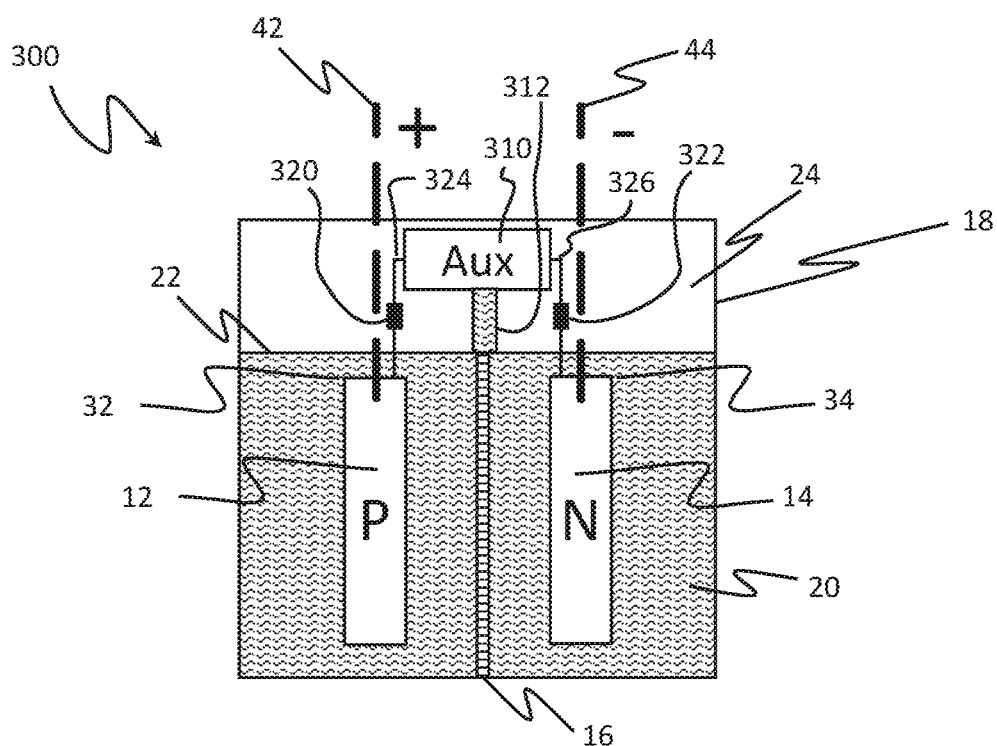
FIG. 11 is a schematic illustration of a battery including an auxiliary electrode connected to both a positive battery electrode and a negative battery electrode.

FIG. 11 illustrates a battery system 300 with an auxiliary electrode 310 electrically connected to both a positive battery electrode 12 and a negative battery electrode 14. In some embodiments, a system 300 such as that shown in FIG. 11 may include switches or other electronic components 320, 322 between the auxiliary electrode 310 and a positive electrode 12 as well as a negative electrode 14. Such electronic components 320, 322 may be connected by any suitable conductors 324, 326. Such a system 300 may be configured to selectively cause the auxiliary electrode 310 to recombine hydrogen by allowing current to flow between the positive electrode 12 and the auxiliary electrode 310 or to recombine oxygen by allowing current to flow between the negative electrode 14 and the auxiliary electrode 310.

Nearly all catalysts suitable for catalyzing hydrogen oxidation reactions may also catalyze oxygen reduction reactions to some degree. In general, such catalysts may include platinum group metals (e.g., Pt, Pd, Ru, Rh, Os, Ir) or other metals (e.g., Ag, Au, Cu, Re, Hg), which may be used individually or in various combinations. In some embodiments, the nickel-aluminum alloy known as Raney nickel (otherwise known as "skeletal catalyst" or "sponge-metal catalyst") may be used as either a hydrogen oxidation catalyst or an oxygen reduction catalyst. In some embodiments, Raney nickel doped with or coated with one or more other metals (e.g., platinum group metals or other metals) may be used to catalyze hydrogen oxidation reductions and/or oxygen reduction reactions. For example, Raney nickel doped with Mo, Fe, Ti, W, Cr, Cu, and Co may be used to catalyze hydrogen oxidation reactions. (e.g., see "Nickel supported on nitrogen-doped carbon nanotubes as hydrogen oxidation reaction catalyst in alkaline electrolyte" by Zhongbin Zhuang et. al., published in Nature Communications, Jan. 14, 2016.) The Zhuang et. al. paper also describes nickel supported on carbon nanotubes and nickel supported on nitrogen-doped carbon nanotubes as hydrogen oxidation catalysts.

Some catalyst materials are more suitable for oxygen reduction than for hydrogen oxidation. For example, various iron-containing materials may be used as catalysts for oxygen reduction, including metallic iron, maghemite ($Fe_2O_3$), magnetite ($Fe_3O_4$), iron sulfide, iron hydroxide, or others. Various silver-containing metals such as metallic silver, silver nitrate, silver oxides, or others may be used for oxygen reduction. In some embodiments, oxygen reduction catalysts may be or include almost any metal. In some embodiments, an oxygen reduction catalyst may include a conductive carbon material such as carbon felts, graphite, carbon paper, carbon black, or other forms of carbon.

In some embodiments, a hydrogen auxiliary electrode may include a hydrogen-absorbing material, such as a metal hydride, in addition to or in place of a hydrogen oxidation catalyst. An auxiliary electrode containing a metal hydride may absorb hydrogen gas as the gas is generated during charging of a battery. During discharging, such a metal hydride-containing auxiliary electrode may be electrically connected to the negative battery electrode (e.g., via an electronic component such as a switch or a diode), thereby causing discharging of the metal hydride auxiliary electrode. Alternatively, a recombination device disconnected from either battery electrode may include a metal hydride. In such a case, absorbed hydrogen may be recombined with any available oxygen by combustion.

Figure 12:
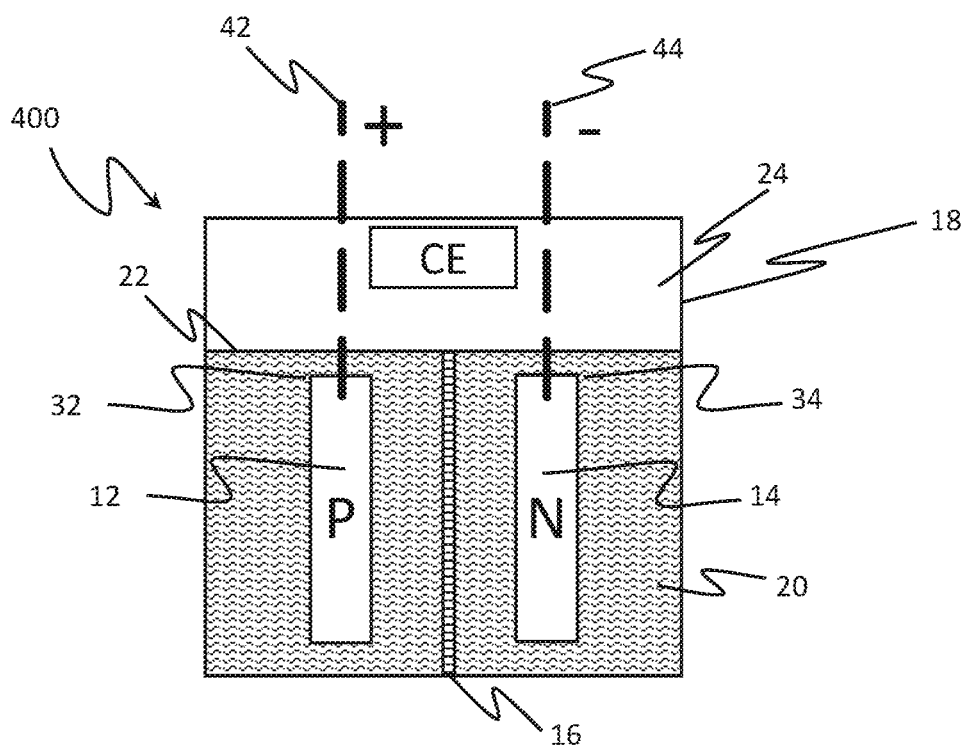
FIG. 12 is a schematic illustration of a battery including a recombination device configured for catalytic combustion of hydrogen and oxygen.

FIG. 12 illustrates a battery system with a hydrogen/oxygen combustion element. Hydrogen/oxygen combustion may be catalyzed by various materials with optimum combustion catalytic activity at various temperatures. For example, "Catalytic Combustion of Hydrogen . . . " by M. Haruta and H. Sano, published in the International Journal of Hydrogen Energy Vol. 6, No. 6, pp 601~08, in 1981 describes catalytic activity for various combustion catalysts at various temperatures.

In some embodiments, a system such as that illustrated in FIG. 12 may include a heating element coupled to the combustion recombination device. In some embodiments, a combustion recombination device may be provided in addition to one or more auxiliary electrodes or other features for encouraging direct recombination of gasses on battery electrodes.

Although the invention has been disclosed in the context of certain embodiments and examples, only the claims define the invention which may include embodiments or examples beyond the specifically disclosed embodiments to other alternative embodiments and/or uses of the invention and obvious modifications and equivalents thereof.

Statements Regarding Incorporation by Reference and Variations

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. For example, when a device is set forth disclosing a range of materials, device components, and/or device configurations, the description is intended to include specific reference of each combination and/or variation corresponding to the disclosed range.

Every combination of components described or exemplified herein can be used to practice the invention, unless otherwise stated.

Whenever a range is given in the specification, for example, a temperature range, a composition, concentration range, or any range of electrochemical performance parameters (e.g., capacity, specific activity, discharge rate, cycling, etc.) all intermediate ranges and subranges, as well as all individual values included in the ranges given are intended to be included in the disclosure. It will be understood that any subranges or individual values in a range or subrange that are included in the description herein can be excluded from the claims herein.

Various embodiments and examples list materials and compounds including various "oxide" and "hydroxide" compounds. Such recitations are intended to include all variants of such materials, including oxyhydroxides, suboxides, solid-solutions, and various polymorphs (different crystal-structure forms) of the same or similar chemical compounds.

All patents and publications mentioned in the specification are indicative of the levels of skill of those skilled in the art to which the invention pertains. References cited herein or included as an appendix indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that electronic materials, fabrication processes, device components and device configurations other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A rechargeable battery comprising:
a battery container;
an electrolyte in the battery container;
a positive electrode comprising positive active material, the positive electrode operationally connected to the electrolyte in the battery container;
an iron negative electrode comprising an iron active material, the iron negative electrode operationally connected to the electrolyte in the battery container;

a separator disposed in the electrolyte in the battery container with the separator and the electrolyte between the positive electrode and the iron negative electrode; and a sulfide-source material in a solid form configured to be electrochemically reducible, in a charge mode of the rechargeable battery, to sulfide releasable into the electrolyte in the battery container.

2. The rechargeable battery of claim 1, wherein the sulfide-source material is in the iron negative electrode.

3. The rechargeable battery of claim 1, wherein the sulfide-source material is about 0.1 wt % to 10 wt % of the iron active material.

4. The rechargeable battery of claim 1, further comprising a reservoir, wherein the sulfide-source material is disposed in the reservoir.

5. The rechargeable battery of claim 4, wherein the reservoir is outside of the iron negative electrode and the sulfide-source material in the reservoir is electrically connected to the iron negative electrode.

6. The rechargeable battery of claim 1, further comprising a sulfide-containing auxiliary electrode, wherein the sulfide-containing auxiliary electrode is electrically connected to the iron negative electrode.

7. The rechargeable battery of claim 1, wherein the sulfide-source material comprises one or more metal sulfides, one or more a sub-oxides of one or more metal sulfides, a solid solution of one or more metal sulfides and one or more oxides or hydroxides, one or more sulfosalt minerals, one or more metalloid sulfides, one or more nonmetal sulfides, or a combination thereof.

8. The rechargeable battery of claim 1, wherein the sulfide concentration in the electrolyte is about 0.01 micromoles per liter to about 700 micromoles per liter.

9. The rechargeable battery of claim 1, wherein the sulfide-source material is in contact with the electrolyte and electrically connected to the positive electrode.

10. The rechargeable battery of claim 1, wherein, in the charge mode of the rechargeable battery, sulfide is releasable from the sulfide-source material into the electrolyte via electrochemical reduction and dissolution.

11. The rechargeable battery of claim 1, further comprising a sulfide detector, wherein the sulfide detector is configured to detect sulfide concentration in the electrolyte.

12. A method of fabricating a rechargeable battery, the method comprising:

positioning a positive electrode and an iron negative electrode in contact with an electrolyte in a battery container; and contacting the iron negative electrode with a sulfide-source material in solid form, the sulfide-source material in solid form electrochemically reducible, in a charge mode of the rechargeable battery, to sulfide releasable into the electrolyte in the battery container.

13. The method of claim 12, wherein contacting the iron negative electrode with the sulfide-source material includes adding the sulfide-source material to the iron negative electrode before positioning the iron negative electrode in contact with the electrolyte in the battery container.

14. The method of claim 12, further comprising arranging a separator in the electrolyte with the separator disposed between the positive electrode and the iron negative electrode in the battery container.

15. The method of claim 12, further comprising adding a sulfide-containing solution into the electrolyte.

16. A method of operating an energy storage system, the method comprising:

charging a rechargeable battery including a solid form of a sulfide-source material, an iron electrode, and an electrode, the iron electrode including an iron active material, and the electrode including a positive active material, wherein charging the rechargeable battery electrochemically reduces the solid form of the sulfide-source material to sulfide released into an electrolyte operationally connected to the iron electrode and a positive active material; and discharging the rechargeable battery, wherein discharging the rechargeable battery electrochemically oxidizes the sulfide to sulfur.

17. The method of claim 16, wherein charging the rechargeable battery includes dissolving the sulfide in the electrolyte.

18. The method of claim 16, further comprising detecting concentration of the sulfide in the electrolyte and, based on the concentration of the sulfide detected as below a predetermined threshold, delivering a quantity of the sulfide to the electrolyte.

* * * * *